United States Patent
Vermeulen

(10) Patent No.: US 10,392,072 B2
(45) Date of Patent: Aug. 27, 2019

(54) SYSTEM AND METHOD FOR PACKING A HUMAN-POWERABLE WHEELED VEHICLE

(71) Applicant: Bert Vermeulen, Cheyenne, WY (US)

(72) Inventor: Bert Vermeulen, Cheyenne, WY (US)

( * ) Notice: Subject to any disclaimer, the term of this patent is extended or adjusted under 35 U.S.C. 154(b) by 0 days.

(21) Appl. No.: 16/239,505

(22) Filed: Jan. 3, 2019

(65) Prior Publication Data

US 2019/0135368 A1    May 9, 2019

Related U.S. Application Data

(63) Continuation-in-part of application No. 15/230,487, filed on Aug. 8, 2016, now Pat. No. 10,202,162.

(Continued)

(51) Int. Cl.
*B62K 15/00* (2006.01)
*B62K 19/32* (2006.01)
(Continued)

(52) U.S. Cl.
CPC ............ *B62K 15/006* (2013.01); *B60B 1/003* (2013.01); *B62J 1/08* (2013.01); *B62K 19/32* (2013.01);
(Continued)

(58) Field of Classification Search
CPC ... B60B 1/003; B60B 27/023; B60B 2320/10; B60B 2900/50
See application file for complete search history.

(56) References Cited

U.S. PATENT DOCUMENTS

| | | |
|---|---|---|
| 578,350 A | 3/1897 | McCain |
| 605,870 A | 6/1898 | Gubelmann |

(Continued)

FOREIGN PATENT DOCUMENTS

| | | |
|---|---|---|
| CN | 204473020 | 7/2015 |
| EP | 2628673 | 8/2013 |
| WO | 20100048723 | 5/2010 |

OTHER PUBLICATIONS

Author: Airnimal Folding Bikes Title: Airnimal Chameleon B&W Clapton Case Fold Video on www.youtube.com/watch?v=87CjA-PTsT4 Published: Jul. 11, 2013 Screenshots from this video are attached.

(Continued)

*Primary Examiner* — James A Shriver, II
*Assistant Examiner* — James J Triggs

(57) ABSTRACT

A bicycle frame system comprises a connection module that rotatably connects a front frame section to a rear frame section. The connection module comprises a hinge section and a clamp section. The hinge section is below the clamp section when the bicycle frame system is in a ridable orientation. The connection module hinge section has a horizontal axis of rotation configured for rotating a front bicycle frame section approximately 180 degrees downwards and rearwards relative to a rear bicycle same frame section to convert the bicycle frame system from a ridable configuration to a folded configuration. The connection module clamp section comprises a front clamp block, a rear clamp block and a fastening device. The fastening device is configured to secure the front clamp block to the rear clamp block when the bicycle frame system is in a ridable configuration. The interface between the front clamp block and the rear clamp block comprises at least one v-shaped feature configured to prevent the front clamp block from moving laterally relative to the rear clamp block when the front clamp block is pressed against the rear clamp block.

20 Claims, 29 Drawing Sheets

Related U.S. Application Data

(60) Provisional application No. 62/619,874, filed on Jan. 21, 2018, provisional application No. 62/299,342, filed on Feb. 24, 2016.

(51) Int. Cl.
   *B62K 19/36* (2006.01)
   *B62J 1/08* (2006.01)
   *B60B 1/00* (2006.01)
   *B62M 6/40* (2010.01)
   *B62M 9/00* (2006.01)

(52) U.S. Cl.
   CPC .............. *B62K 19/36* (2013.01); *B62M 6/40* (2013.01); *B62M 9/00* (2013.01); *B62J 2001/085* (2013.01)

(56) References Cited

U.S. PATENT DOCUMENTS

| | | | |
|---|---|---|---|
| 1,410,047 A | | 3/1922 | Williams |
| 1,511,291 A | | 10/1924 | McGrath |
| 1,593,474 A | | 7/1926 | Serrao |
| 2,297,960 A | | 10/1942 | Hood |
| 2,447,956 A | | 8/1948 | Morders |
| 2,917,816 A | | 12/1959 | Samson |
| 3,304,099 A | | 2/1967 | Jankowski |
| 3,329,444 A | | 7/1967 | Lidov |
| 3,922,018 A | | 11/1975 | Shook |
| 3,929,225 A | * | 12/1975 | Locke ............... B65D 5/5038 206/335 |
| 4,149,634 A | * | 4/1979 | Lewis, Jr. ............ B65D 85/68 206/335 |
| 4,154,327 A | | 5/1979 | Haeussinger |
| 4,182,522 A | | 1/1980 | Ritchie |
| 4,252,335 A | | 2/1981 | Brenner |
| 4,353,464 A | * | 10/1982 | Bentler .............. B65D 85/68 206/303 |
| 4,462,606 A | | 7/1984 | Hon |
| 4,756,416 A | * | 7/1988 | Johnson ............... B62J 99/00 190/107 |
| 5,052,706 A | | 10/1991 | Tsai et al. |
| 5,205,573 A | | 4/1993 | Mhedhbi |
| 5,419,619 A | | 5/1995 | Lew |
| 5,553,950 A | | 9/1996 | Pawsat et al. |
| 5,586,652 A | | 12/1996 | Smilanick |
| 5,647,643 A | | 7/1997 | Noble |
| 5,810,453 A | | 9/1998 | O'Brien |
| 5,813,770 A | | 9/1998 | Chiang |
| 5,975,551 A | | 11/1999 | Montague et al. |
| 6,030,052 A | | 2/2000 | Watarai et al. |
| 6,267,237 B1 | * | 7/2001 | McNeill ............... B65D 85/68 206/335 |
| 6,364,424 B1 | | 4/2002 | Lashlee et al. |
| 6,374,975 B1 | | 4/2002 | Schlanger |
| 6,702,312 B1 | | 3/2004 | Miksik |
| 6,886,844 B2 | | 5/2005 | Ritchey |
| 6,929,277 B2 | | 8/2005 | Chao |
| 7,125,029 B2 | | 10/2006 | Knox |
| 7,357,460 B2 | | 4/2008 | Schlanger |
| 7,490,842 B1 | | 2/2009 | Ulrich et al. |
| 7,658,450 B2 | | 2/2010 | Mercat et al. |
| 7,665,928 B2 | | 2/2010 | Winefordner et al. |
| 7,874,625 B2 | | 1/2011 | Addink |
| 7,909,412 B2 | | 3/2011 | Ashman |
| 7,942,434 B2 | | 5/2011 | Myers |
| 7,950,747 B2 | | 5/2011 | Mercat et al. |
| 8,007,052 B2 | | 8/2011 | Passarotto et al. |
| 8,052,225 B2 | | 11/2011 | Inoue et al. |
| 8,113,529 B2 | | 2/2012 | Spahr et al. |
| 8,113,593 B2 | | 2/2012 | Spahr et al. |
| 8,123,243 B2 | | 2/2012 | Ho |
| 8,141,893 B2 | | 3/2012 | Lin |
| 8,162,344 B2 | | 4/2012 | Hoogendoorn |
| 8,205,902 B2 | | 6/2012 | Ulimonen et al. |
| 8,251,460 B2 | | 8/2012 | Veux |
| 8,308,178 B2 | | 11/2012 | Hoerdum et al. |
| 8,371,659 B2 | | 2/2013 | Fitzsimons |
| 8,414,006 B2 | | 4/2013 | Souvanny |
| 8,430,414 B1 | | 4/2013 | Yap |
| 8,485,335 B2 | | 7/2013 | Schlanger |
| 8,882,124 B2 | | 11/2014 | Yap |
| 8,894,084 B1 | | 11/2014 | Yap |
| 9,266,579 B2 | | 2/2016 | Yap |
| 9,446,896 B2 | * | 9/2016 | Pelegrin ................ B62B 3/04 |
| 9,821,948 B2 | * | 11/2017 | Noer ..................... A45C 5/14 |
| 2007/0187922 A1 | | 8/2007 | Boutakis |
| 2010/0052410 A1 | | 3/2010 | Sherman et al. |
| 2011/0049966 A1 | | 3/2011 | Sartin et al. |
| 2016/0228857 A1 | | 10/2016 | Boutakis |
| 2017/0267307 A1 | | 9/2017 | Vodev |
| 2018/0251185 A1 | | 9/2018 | Vodev |

OTHER PUBLICATIONS

Author: Mark Sharon Title: Bike Review—Airnimal Chameleon Downloaded from www.daily peloton.com/displayarticle.asp?pk=12871 Published: Jun. 16, 2008.

* cited by examiner

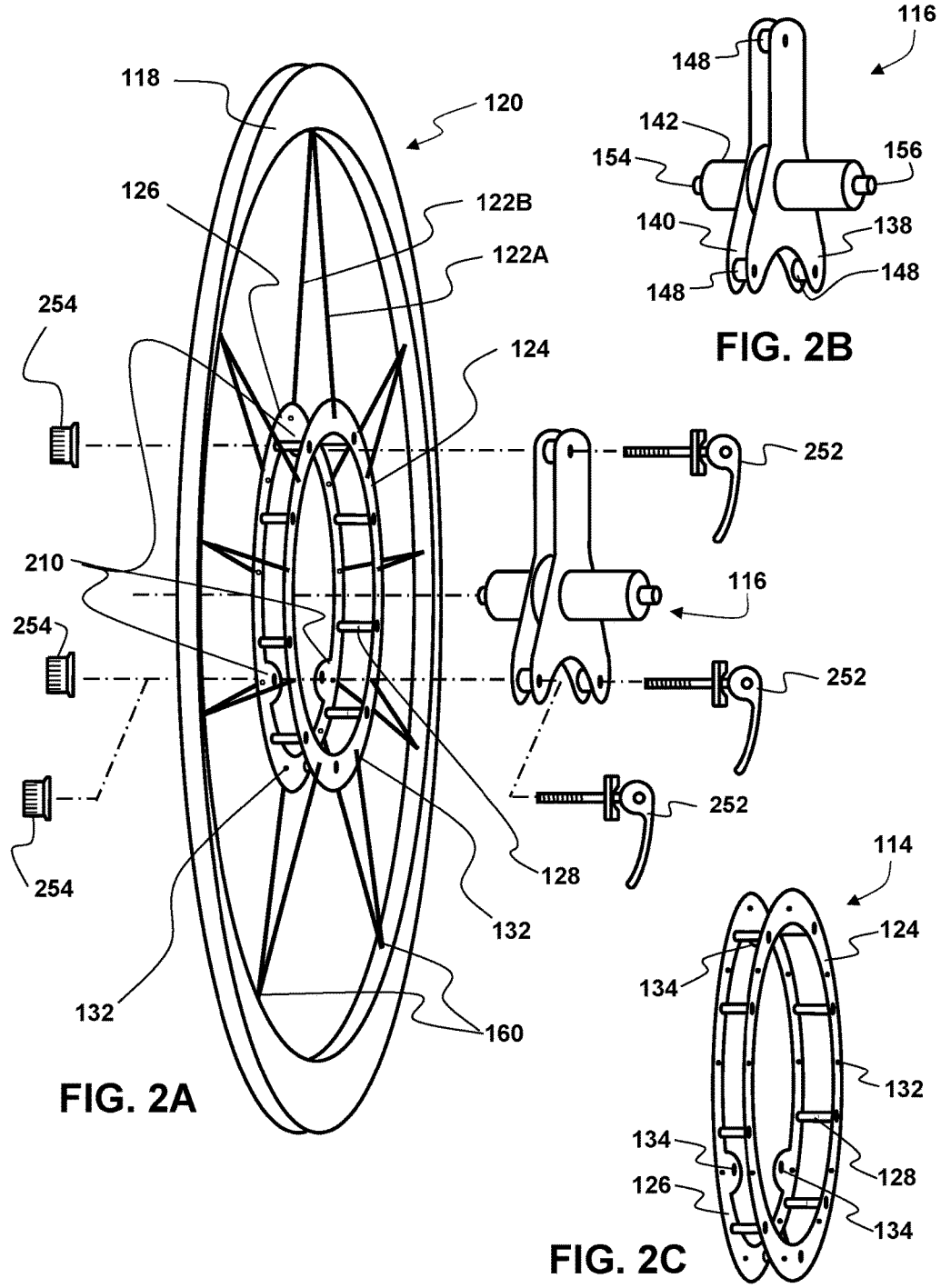

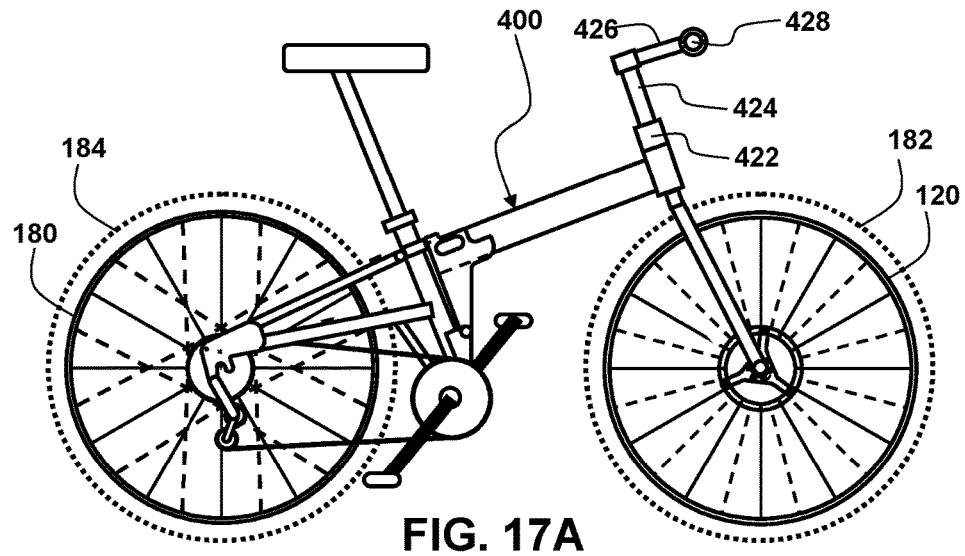
FIG. 17A
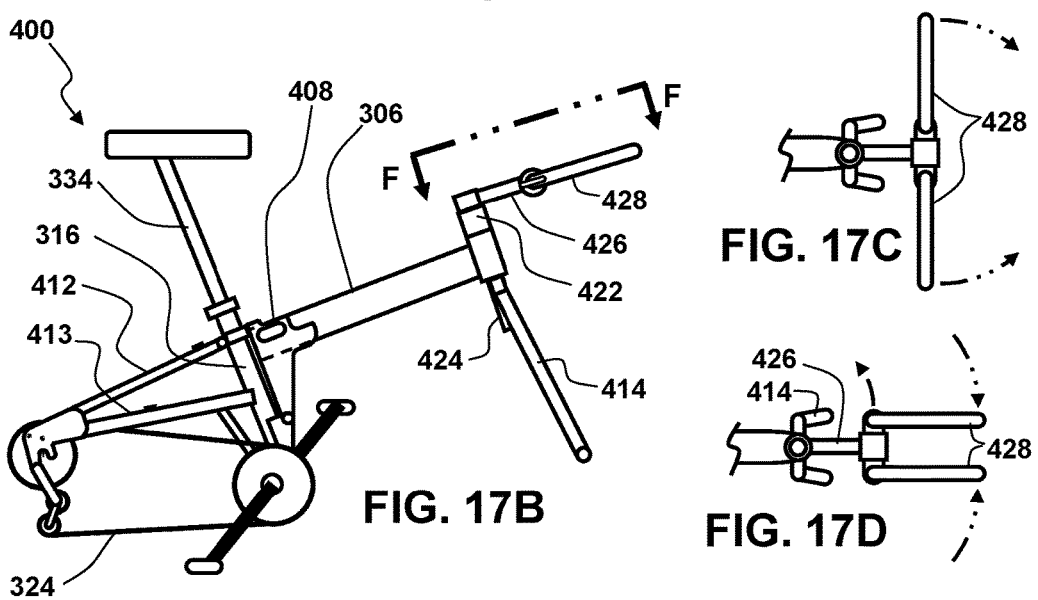
FIG. 17B
FIG. 17C
FIG. 17D
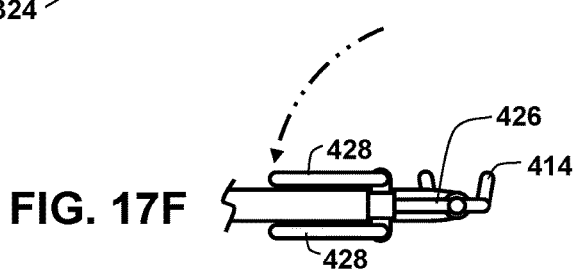
FIG. 17F
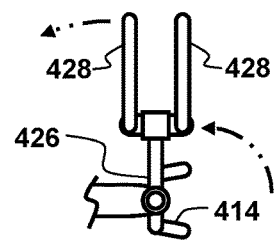
FIG. 17E

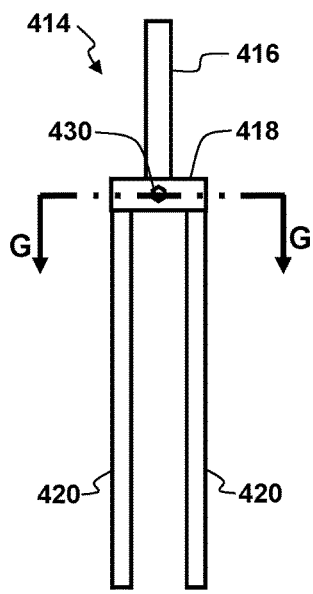
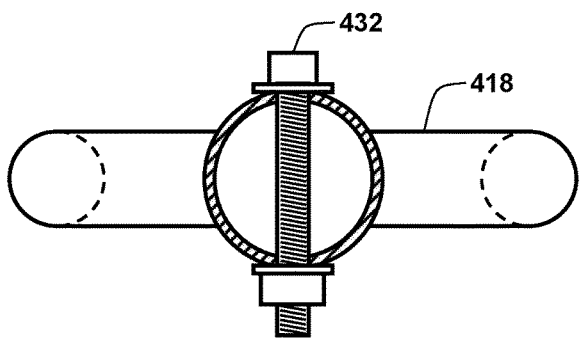
FIG. 19B
Prior Art
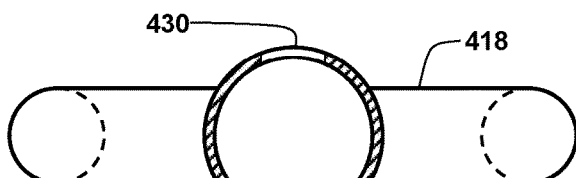
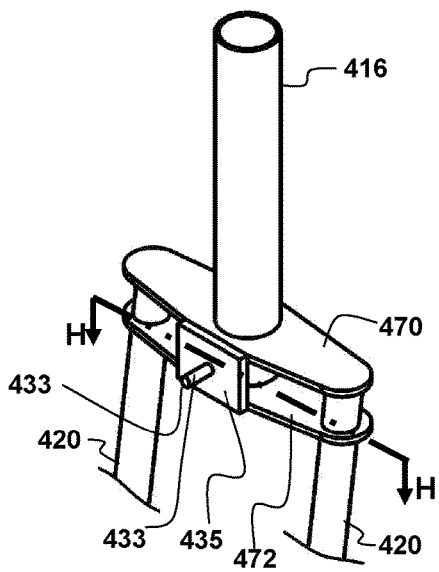
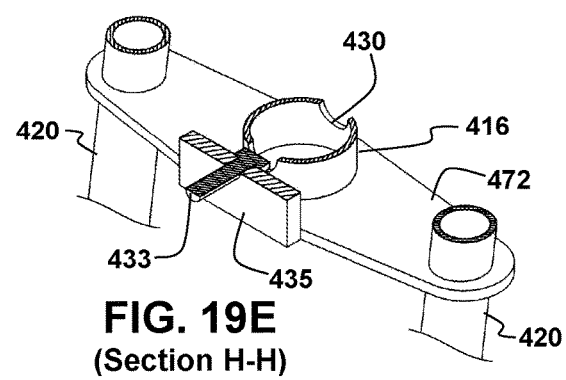

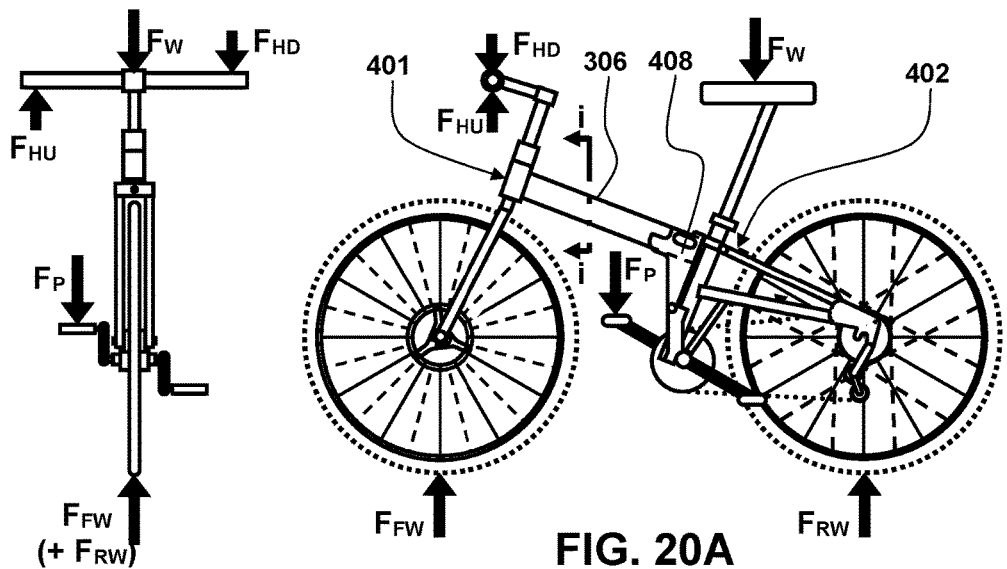
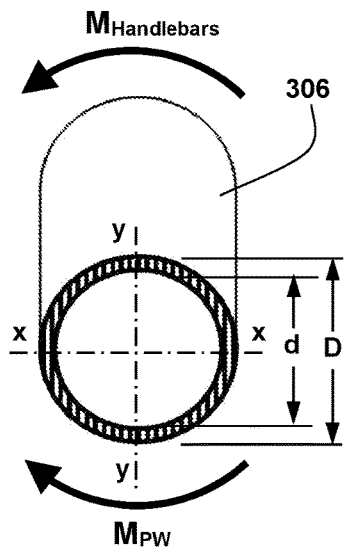
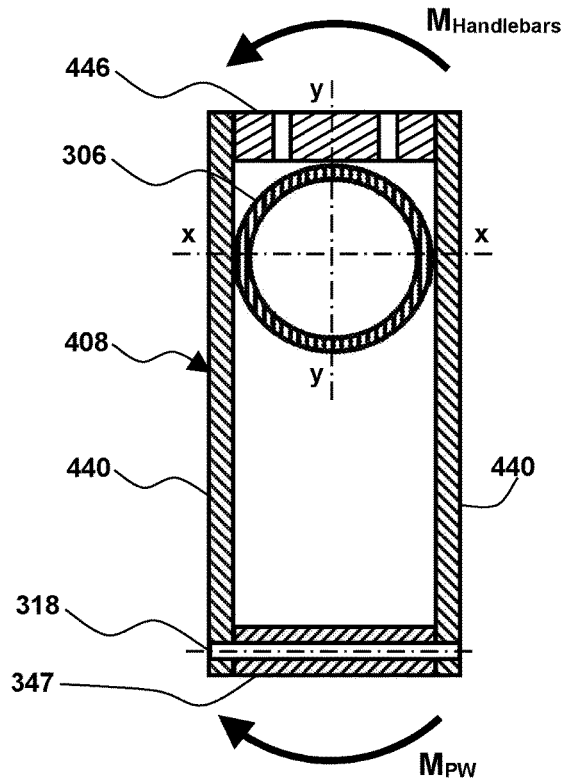
FIG. 20B
FIG. 20A
FIG. 20C
FIG. 20D

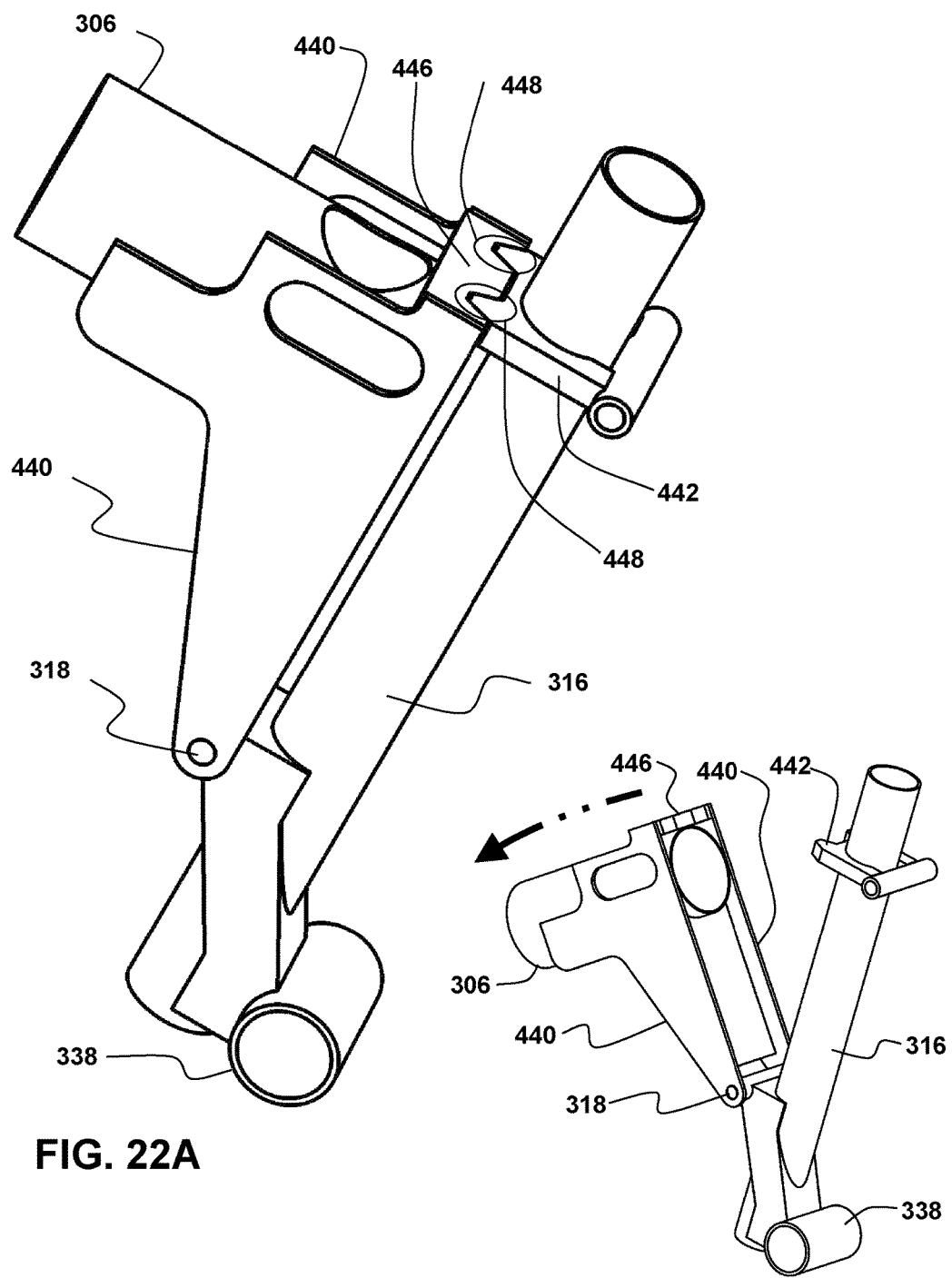

(View L-L)

SYSTEM AND METHOD FOR PACKING A HUMAN-POWERABLE WHEELED VEHICLE

This patent application claims benefit of U.S. Provisional Patent Application Ser. No. 62/619,874 filed 21 Jan. 2018, and is a continuation-in-part of U.S. patent application Ser. No. 15/230,487 filed 8 Aug. 2016, which claims benefit of U.S. Provisional Patent Application Ser. No. 62/299,342 filed 24 Feb. 2016, the entire disclosures of which are incorporated by reference herein.

BACKGROUND

This disclosure relates to systems and methods for improving the ability to pack a human-powerable wheeled vehicle when it is not being ridden, and unpack it for riding. Human-powerable wheeled vehicles can include unicycles, bicycles, tricycles, quadricycles, wheelchairs, strollers, push scooters, and powered versions of such vehicles (such as e-bikes) that use human power and other power sources, such as electric motors or gasoline engines.

To minimize weight, human-powerable vehicles typically use space frame geometries for strength and stiffness, but space frame structures occupy a large physical volume, which is undesirable for storage and transport. Wheels with spokes in tension between a hub and rim are an example of a difficult-to-pack space frame due to the conical bulge and axle in the wheel center (hub region). Two assembled wheels with conical centers do not easily pack together into a small space. Separately, however, the wheel components (spokes, rims, tires, and hubs) occupy little volume before being assembled as a wheel.

Wheeled human-powerable vehicles might need to be transported by cars, public transit (buses, trains, etc.), airplanes, boats, or other modes of transport. In such situations, it is beneficial for the bike, or similar, to be packed in a compact matter, protected from impact, and covered to protect other luggage from sharp or dirty elements of the bike. The packed bike might also need to be carried or rolled short distances in a "packed mode" in places such as an airport, bus terminal, or train station. Additionally, packed human-powerable vehicles could be stored and locked more easily than when in an unpacked "ready to ride mode".

One example is bike transport on commercial aircraft. In the past, airlines checked bicycles at no extra charge and even supplied free bicycle boxes. Now, many airlines charge for each piece of checked luggage. They charge more for oversize items (typically specified as length+width+height greater than 62 linear inches) and/or overweight items (typically more than 50 pounds). Airlines might refuse to take the human-powerable vehicle if not properly packed and are often not responsible for damage during transit. Observation of how luggage is handled shows that a packed bike must sustain impacts from all directions and angles. Luggage must be openable and searchable by airport security personnel.

Folding bike embodiments with small wheels and tires (20 inch or less) generally don't perform as well on a variety of road surfaces and terrains as bicycles with normal full-size wheels. In this document and related claims, full-size wheels are defined as wheels with a nominal outside tire diameter of 24 inches or greater and small wheels have tires nominally 20 inches in diameter or smaller. Here is a list of common small and full wheel and tire sizes:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |
| 26 inch | 585 mm (23 inches) | 559 mm (22 inches) |
| 24 inch | 533 mm (21 inches) | 507 mm (20 inches) |
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

Some bicycles with small wheels use ingenious folding to convert from a packed to a ridable bike quickly, cleanly, and without tools. Some small wheel bikes fold compactly enough to fit within the 62-linear inch size requirement and 50-pound weight limit. It is much easier to fit into 62 linear inches when the wheel is less than one third of the total length+width+height, when the nominal outside diameter of the tire is 20 inches or less.

There are full-size wheeled bikes that can pack into the 62 linear inches, but they require time, tools, expertise, and finesse to disassemble, pack, and reassemble. Referring to the bike wheel sizes listed previously, a typical road bike uses 700C wheels, with an outside tire diameter between 27 and 29 inches, and an outside rim diameter of approximately 25.5 inches. Thus, the typical target packed size for these bikes, with tires deflated, is 26×26×10 inches. It takes removing the air from the tires, many disassembly steps, detailed instructions, tools, covers to wrap each part, and patience to pack all the parts into these dimensions and prevent damage during transport.

One problem with trying to fit a bike with full-size wheels into the airline maximum of 62 linear inches is that the wheels are large in diameter and fat in the center due to the use of tension spokes in a triangular configuration, when looked at in cross section, or a conical configuration when viewed three dimensionally. The spokes typically terminate in a set of holes in one plane in the rim and terminate in two parallel planes in a circular configuration in the hub. When looked at in cross section, this looks like a triangle that is wide at the hub and narrow at the rim. When two wheels with fat centers are put into a 26×26×10 inch case, there is little room for anything else. Space saved by having the wheels stored more compactly could simplify packing the other bicycle parts. It is known to have wheels that are disassemble-able to save space, but disassemble-able wheels typically do not use spokes in tension in a triangular/conical configuration. Wheels with triangular/conical tension spokes in are desired because this space frame configuration has a high strength to weight ratio, and weight is paramount for a human-powerable vehicle.

Many bicycles that are transported as checked luggage require a structural case, which adds to total luggage weight. There is also the issue of what to do with the case when one arrives at a destination and wants to start riding. It is better if the bike is packable in a compact arrangement that needs minimal or no external transport container.

In summary, the goal is a system/method for packing a human-powerable vehicle that (a) fits the vehicle/bike in one piece of luggage that meets applicable size and weight restrictions, is (b) lightweight and performs well when ridden, (c) is quick to pack/unpack; and (d) requires minimal tools and packaging for transporting when packed. (e) Ideally, such a system/method would not need a separate structural suitcase. (0 The system/method should be as cost effective and simple to manufacture. It should be (g) safe and (h) reliable.

BRIEF DESCRIPTION OF THE DRAWINGS

The present disclosure is described in conjunction with the appended figures in which:

FIG. 2A shows a perspective view of a spoked bicycle wheel with a central annulus, a user detachable hub, and three eccentric cam quick release mechanisms to attach the annulus to the hub;

FIG. 2B shows the user detachable hub of the wheel of FIG. 2A;

FIG. 2C shows the central annulus of the wheel of FIG. 2A;

FIG. 17A an alternate embodiment bicycle that comprises an alternate folding frame with an alternate hinge and an annulus front wheel with a removable hub;

FIG. 17B shows the folding bicycle frame of FIG. 17A without the front and rear wheels and with the handlebars folded and the steerer tube extender collapsed inside the steerer tube;

FIG. 17C shows view F-F of FIG. 17B before the handlebars are folded;

FIG. 17D shows view F-F of FIG. 17B with the handlebars folded;

FIG. 17E shows view F-F of FIG. 17B with the handlebars folded and the stem rotated 90 degrees counterclockwise relative to the front fork;

FIG. 17F shows the view of 17E with the front fork, stem, and handlebars rotated an additional 90 degrees counterclockwise;

FIG. 19A shows a front fork suitable for use on a bicycle;

FIG. 19B shows a prior art example of section G-G of FIG. 19A;

FIG. 19C shows an embodiment of the section G-G of FIG. 19A that has a mounting bolt that does not block the passage of a collapsible steerer tube extender;

FIG. 19D shows a perspective view of the crown region of an alternate front fork that uses two parallel plates to create the crown;

FIG. 19E shows section H-H of FIG. 19B;

FIG. 20A shows examples of some of the forces on a typical bicycle, such as the bicycle shown in FIG. 17A;

FIG. 20B shows a front view of the bicycle of FIG. 20A;

FIG. 20C shows section i-i of FIG. 20B to illustrate the torsional forces on the front section of a bicycle frame when a rider is standing on the pedals;

FIG. 20D shows a forward-looking view of the connection module between the front frame section and the rear frame section that is also defined as view J-J in FIG. 21A;

FIG. 22A shows a perspective view of some of the main elements of the hinge shown in FIG. 21A;

FIG. 22B shows the hinge of FIG. 21A when the front section has been rotated approximately 30 degrees clockwise;

Figure 1A:
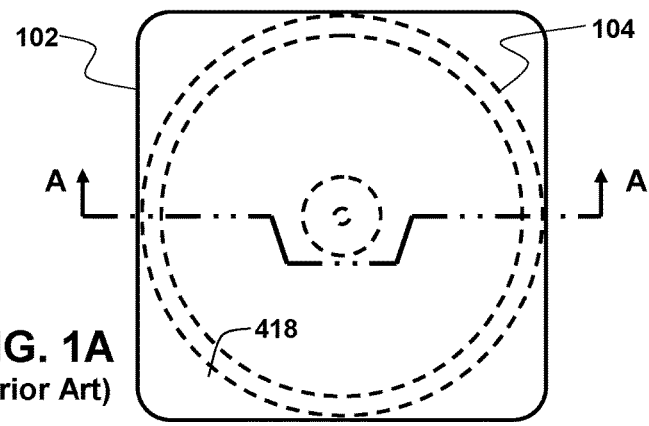
FIG. 1A shows an axial view of two spoked 700C bicycle wheels in a 26×26×10 inch container.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different materials, manufacturing processes, fastening systems, configurational arrangements, and components may be substituted.

1. Definitions.

In one embodiment, the system and/or method is for a wheeled human-powerable vehicle. For purposes of this document and the appended claims, a wheeled human-powerable vehicle is defined as any vehicle having wheels that is configured for a human to add or exclusively provide locomotive power. Examples include bicycles, motor-assisted bicycles (such as mopeds, e-bikes, etc.), wheelchairs, tricycles, unicycles, quadricycles, tandems, push scooters, etc.

In this disclosure and the appended claims, the term bicycle (or bike) is used to describe a human powerable vehicle having two main wheels that is configured to transport a human. The term bicycle includes tandems, recumbents, bicycles with training wheels, and any other combination of a plurality (at least two) wheels, with any attachment between them, or no other components or attachment between them. Thus, a bicycle also comprises any pair of wheels, with or without any other components.

In one embodiment, the system and/or method being documented comprise a foldable human-powerable vehicle. A foldable human-powerable vehicle can be any human power-able vehicle comprising a frame that comprises at least two sections and a hinge or connected pivot point wherein a first frame section can be rotated about the pivot point or hinge relative to a second frame section and secured when the human powerable vehicle is configured for transporting a human. The folding human-powerable vehicle can be of any other shape or configuration using any other components capable of being understood by anyone skilled in the art.

In one embodiment, the system and/or method being documented can comprise an annulus, annular module, or ring-shaped module. For purposes of this disclosure and the appended claims, an annulus (or annular module) shall include any ring-shaped structure having a central region in the form of opening or aperture that facilitates the nesting of components partially or completely inside of one another. An annulus can be monolithic. An annulus can be assembled from multiple components. An annulus can be substantially flat with all features lying in one flat plane having a thickness many times smaller than the outside diameter of the annulus. An annulus can be thick in its axial direction. An annulus can be composed of elements that create attachment points that are planar (or co-planar) without the annulus necessarily occupying all spaces in the volume or plane connecting those points. An annulus can be cup-shaped with one side that is not open or only partially open. An annulus can have a completely open center throughout its entire shape.

In one embodiment, the system and/or method being documented comprise an annular wheel. A wheel can be any circular component that is intended to rotate about a central axis. A wheel can comprise a bearing. For purposes of this disclosure and the appended claims, a wheel does not necessarily need to have a bearing or central hub. A wheel can also be a circular component to which an axle, a bearing, or a hub is to be attached. Thus, a wheel can be annular, with a central opening or aperture that facilitates the nesting of components partially or completely inside of one another. A wheel can be monolithic. A wheel can be assembled from multiple components. A wheel can use spokes. The spokes can be in tension. A wheel can be of any other shape or configuration using any other components capable of being understood by anyone skilled in the art.

2. Compact Storage of Multiple Wheels.

Figure 1B:
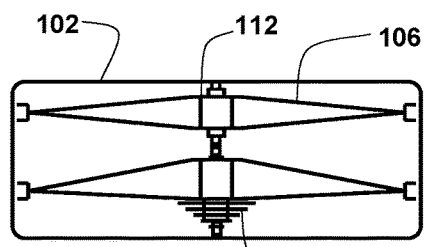
FIG. 1B shows section A-A of FIG. 1A for two prior art spoked 700C bicycle wheels.
Figure 1C:
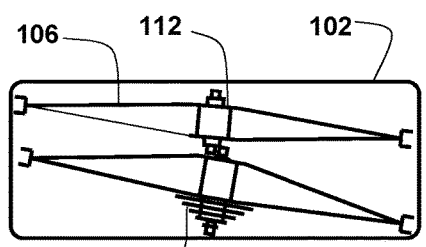
FIG. 1C shows section A-A of FIG. 1A for two prior art spoked 700C bicycle wheels when the wheels are angled slightly to reduce total stack height.
Figure 1D:
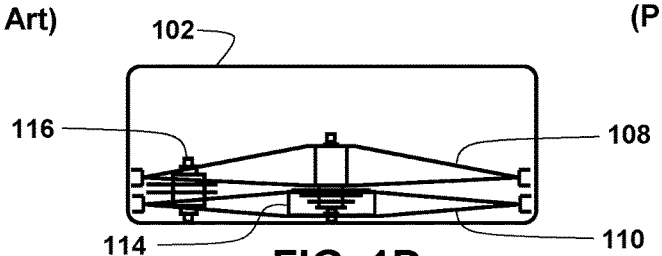
FIG. 1D shows section A-A of FIG. 1A when the prior art spoked 700C front wheel has been replaced with a spoked wheel incorporating a central annulus with an aperture that allows the axle of the rear wheel to nest inside the aperture.
Figure 1E:
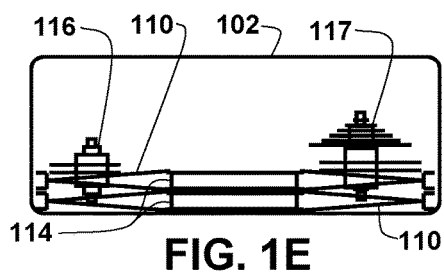
FIG. 1E shows section A-A of FIG. 1A when the prior art spoked 700C front wheel and the prior art spoked 700C rear wheel have both been replaced with spoked wheels incorporating central annuli and removable hubs and both wheels are placed adjacent to one another in a 26×26×10 inch container.
Figure 1F:
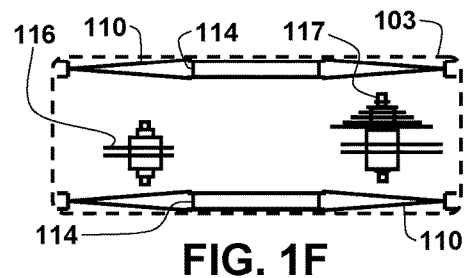
FIG. 1F shows section A-A of FIG. 1A when the prior art spoked 700C front wheel and the prior art spoked 700C rear wheel have both been replaced with spoked wheels incorporating central annuli and removable hubs and both wheels are placed on opposite sides of a 26×26×10 inch physical volume.

FIG. 1D, FIG. 1E, and FIG. 1F illustrate elements of three configurations and methods that can be employed in embodiments of the present invention. To understand these configurations and methods, it is best to start with the prior art. FIG. 1A shows an axial view of one or more bicycle wheels 104 in a container 102. In this example, the bicycle wheels 104 are spoked and have the dimensions of standard 700C or 29-inch wheels. This means that the wheels 104 have rims with an outside diameter of approximately 25.5 inches (648 mm). The container 102 has been sized to meet the airline checked luggage requirement of 62 linear inches (1575 mm). Given a 25.5-inch (648 mm) standard outside diameter of 700C bicycle rims, the fact that the rims will most likely have tires on them (which could be deflated), and the fact that the container walls will have a thickness that must be within the total dimensions, the minimum length and the minimum width of the container will be approximately 26 inches. Subtracting 26+26=52 inches from the 62-linear inch size limit, the container can have a maximum height of about 10 inches. Therefore, the container shown at 102 in FIGS. 1A, 1B, 1C, 1D, and 1E is 26×26×10 inches. In the prior art, the typical container used for transporting bicycles in this way could be made of a hard-shell plastic in a clamshell configuration, or it could be a soft-shell bag, or it could be a container made of a combination of hard and soft components.

FIG. 1B, which is a side view of section A-A of FIG. 1A, illustrates the next issue when trying to pack a bicycle into a maximum 62 linear inch airline size container using the systems and methods known in the prior art. Referring to FIG. 1B, a prior art spoked 700C front wheel is shown at 106 and a prior art spoked 700C rear wheel is shown at 108. The standard dropout spacing for a front wheel is 100 mm. The axle typically extends an additional 5 mm per side beyond this 100 mm so the wheel can fit into the front dropouts, making a total axle length of 110 mm (4.3 inches) for a front wheel. The narrowest standard dropout spacing for a rear wheel is 130 mm for a road bike. It is 135 mm for some road bikes and many mountain bikes. The rear wheel also typically has 5 mm of additional axle length on each side in order to fit into the dropouts for a total axle length of 140 mm (5.5 inches). In FIG. 1B, the two wheels 106 and 108 are axially aligned and the total height of the two stacked wheels is therefore 110 mm+140 mm=250 mm, which is approximately 9.8 inches. Thus, the stack height of the two hubs and the two axles almost exactly takes up the entire interior height of the 10-inch high container 102 once the wall thickness of the container is subtracted from 10 inches. Other bicycle parts (such as the frame, handle bars, pedals, seat, etc.) must fit into the remaining space or must be placed into a second piece of luggage, which could cost extra. The remaining space in a container 102 in the prior art systems and methods for packing a bicycle are minimal and broken up into multiple small regions. Tilting the wheels as shown in FIG. 1C does not give much additional space because it is not possible to tilt the wheels to a very great angle and stay within the 26×26×10 inch physical volume. Thus, many compromises must be made, it takes a considerable time and experimentation to try to get the bike to fit at all, and many people give up on this packing method as a solution. Furthermore, fitting the bike wheels, frame, and components into the container in this way can result in damage as parts rub against each other. To prevent damage caused by rubbing, each part is typically individually wrapped in a protective material, which requires additional time, items, space, expense, and weight.

FIG. 1D illustrates a configuration and method that simplifies compact packing of a bicycle of the same size. The container 102 and rear wheel 108 shown in FIG. 1D are the same as the prior art illustrated in FIG. 1A, FIG. 1B, and FIG. 1C. The configuration of the spoked front wheel, shown at 110 in FIG. 1D, has been changed by replacing the central hub assembly, shown at 112 in FIG. 1B and FIG. 1C with an annulus (or annular module or ring-shaped module), shown at 114 in FIG. 1D, and a user removable hub (or other removable module for connecting the annulus wheel to the rest of the bicycle) shown at 116. The annulus 114 has a concentric central aperture region. This central aperture region of the annulus allows at least part of the thick central hub (and axle) of the rear wheel 108 to nest inside the front wheel 110. As shown in FIG. 1D, the entire space in the container 102 above (or to the side, depending upon how one looks at it) the rear wheel 108 then becomes clear and available for packing other parts of the bicycle. The rear wheel 108 in FIG. 1D sits at the same position in the container 102 as for the prior art (FIG. 1B and FIG. 1C). Thus, the wheel configuration with a removable hub greatly facilitates the packing of a bicycle. The two wheels with the removable hub shown in FIG. 1D represent a simple embodiment of a packable bicycle that fits into 62 linear inches. Advantages of the front wheel embodiment shown in FIG. 1D can include:

(a) more compact storage of the bicycle (especially if this is a bicycle using full-size wheels);
(b) potential for storing two bicycles with traditional mountain bike wheels, that are smaller than 700C wheels, into a 62-linear inch size package;
(c) improved potential (due to having more space) for rigidly (i.e. immovably and securely) attaching bicycle parts together to eliminate the need for wrapping each bicycle part prior to packing; and (d) more room for the other bicycle components allows for more soft padding on the outside of the packed bicycle, which makes it easier to eliminate the weight, cost, and transportation of a hard-shell suitcase.

The two wheels illustrated in FIG. 1D do not necessarily need to be a front wheel with a central annulus 110, a removable hub 116, and a rear wheel with a non-removable hub 108. The rear wheel could have a removable hub. The front wheel could have a fixed hub. The two wheels could be two front wheels. The two wheels could be two rear wheels. The two wheels could be two wheels from a vehicle that has more than two wheels. The two wheels could be for two different vehicles. The two wheels could both have removable hubs. One or both of the two wheels could have removable centers that are not hubs, they could be removable axle assemblies, for example, with the bearings being in the front wheels and the central annulus being inside the races of the bearings. To illustrate examples of such embodiments, FIG. 1E and FIG. 1F show a configuration in which the front wheel and the rear wheel 110 both comprise an annulus 114 with detachable hubs, 116 and 117. The user-detachable front hub is shown at 116 and the user-detachable rear hub is shown at 117. This front hub 116 and rear hub 117 could be placed anywhere in the space available, such as embedded partially in the spoked wheels, as shown in FIG. 1E or completely in the volume reserved for the bicycle frame, as shown in FIG. 1F. This flexibility in where the two hubs 116 and 117 are placed helps to maximize the efficiency of using the available space.

In the configuration shown in FIG. 1E, the two wheels with central annuli 110 are adjacent to each other in the 26×26×10 inch container, 102. In the configuration of FIG. 1F, the two wheels 110 are on opposite sides of a flexible 26×26×10 inch bag 103. Placement of the two annular spoked wheels 110 in the configuration shown in FIG. 1F can have the following advantages:

(a) any small protrusions of the bike frame components can extend through the spoke region of the wheels 110 and the entire packed bicycle can still fit within the overall 10-inch height;

(b) the sides of the annular spoked wheels 110 can be part of the protective structure for the packed bicycle on the 26×26 inch top and bottom surfaces of the volume;

(c) the rims (typically with rubber tires on them) can protect the 26×10 inch front, rear, right side, and left side surfaces of the volume as shown in FIG. 1F; and (d) by using the wheels as part of the protective structure, the storage device 103 can be have fewer or no rigid (or hard) components, such as the flexible 26×26×10 inch bag, shown at 103. A storage device 103 with few or no hard components will also pack more easily when not used to store the bicycle.

3. Wheel with Central Annulus

FIG. 2A shows a perspective view of a spoked wheel 120, and a user detachable hub 116. The hub 116 shown in FIG. 2A could also be called a removable front wheel center module. The wheel 120 and hub 116 could be used to facilitate the packing of a bicycle, as was shown and described with reference to FIG. 1D, FIG. 1E, and FIG. 1F. The spoked wheel 120 can be of any size and shape capable of being understood by anyone skilled in the art. Common human powerable vehicle spoked wheel sizes can include 700C/29 inch, 650B/27.5 inch, 26 inch, 24 inch, 20 inch, and 16 inch as were described earlier in this document. The spoked wheel 120 comprises a rim, shown at 118, an inner annulus (or inner annular module or ring-shaped module) 124 and/or 126, and a plurality of spokes, shown at 122A and 122B that radiate outwards from the inner annulus to connect the annulus to the rim. The rim 118 is circular and is located concentrically to the central axis of the wheel 120. It should be noted that the rim 118 could be of any other size capable of being understood by anyone skilled in the art. The rim used on a wheel of a human-powerable vehicle can be made of any material capable of being understood by anyone skilled in the art. Examples of rim materials include aluminum, steel, titanium, wood (such as birch, spruce, oak, etc.), carbon fiber reinforced composite, glass fiber reinforced composite, glass, and plastic. The rims can be fabricated using any process capable of being understood by anyone skilled in the art including the use of extrusion, machining, casting, molding, bending, stamping, autoclaving, heating, vacuum forming, injection molding, riveting, and welding.

The spoked wheel 120 shown in FIG. 2A has 18 spokes. Other common spoke counts can include 3, 4, 5, 6, 8, 10, 12, 16, 18, 20, 24, 28, 32, 36, 40, 48, 72, 96, and 144 spokes. The spoke count can be any quantity capable of being understood by anyone skilled in the art. The inner annulus includes spoke-to-annulus attachment points, shown at 132. These spoke-to-annulus attachment points 132 are configured for spokes, 122A and 122B, that radiate outwards from the inner annulus. In the embodiment shown, the spoke-to-annulus attachment points 132 are in a circular configuration on two offset parallel planes separated by spacers 128. In the embodiment shown, the spacers 128 comprise a plurality of threaded tubular elements, having internal threads.

FIG. 2C provides a view of just the central annulus 114 of the wheel that was shown at 120 in FIG. 2A. The circular configuration of the spoke-to-annulus attachment points 132 is concentric to the center of the wheel 120. In the embodiment shown, the spoke-to-annulus attachment points 132 are axial through holes. In the embodiment shown, the two offset (non co-planar) parallel planes are in the form of two annular (or ring shaped) disks, 124 (first annular disk) and 126 (second annular disk), and are separated by the annular disk spacers 128. These annular disks 124 and 126 could also be called rings or annuli. In the embodiment shown, the annular disks, 124 and 126, are located concentrically to the central axis of the wheel.

Referring to FIG. 2A, in the embodiment shown, the spokes, 122A and 122B, are configured to be in tension. In the embodiment shown, the spokes, 122A and 122B, are in a generally triangular configuration if the wheel was looked at in a section view, with the two planes of spoke-to-annulus attachment points 132 being offset. The spokes, 122A and 122B, are connected to the rim 118 at rim spoke attachment points, shown at 160. In the embodiment shown, the rim spoke attachment points 160 are in a common plane, in a circular configuration, and concentric to the axis of the wheel. The resulting configuration of the spokes, 122A and 122B, can also be described as approximating two cones having their apexes in the center of rotation of the wheel. It is also possible for the rim spoke attachment points 160 to be located in multiple offset parallel planes. For example, it is possible to attach the spokes from the first annular disk 124 to a plane on the rim that is offset and parallel to the plane on the rim where the spokes from the second annular disk 126 are attached. In the embodiment shown, the rim spoke attachment points 160 are radial through holes in the rim 118. The placement of the spokes, 122A and 122B, from the spoke-to-annulus attachment points 132 to the rim 118 can be in any configuration capable of being understood by anyone skilled in the art. The type of spokes, 122A and 122B, used can be any type of spoke capable of being understood by anyone skilled in the art. A typical example is spokes having shafts that comprise stainless steel (an alloy of iron, nickel, and other materials) and nipples (used to tension the spokes by rotation) that comprise brass.

Figure 12A:
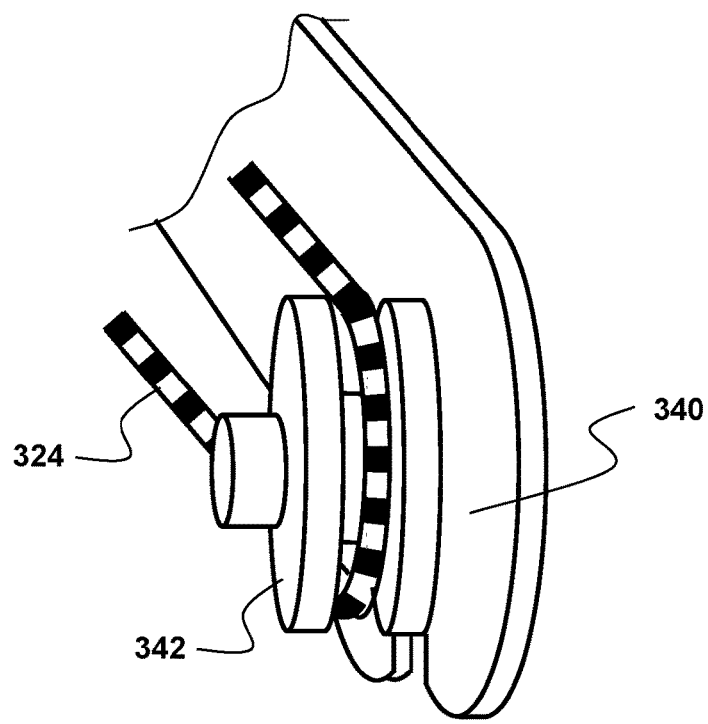
FIG. 12A shows a chain keeper that can be used to guide the chain around the rear dropout when the rear wheel has been removed, such as the configurations shown in FIG. 10B, FIG. 11A, FIG. 11B, and FIG. 11C.
Figure 12B:
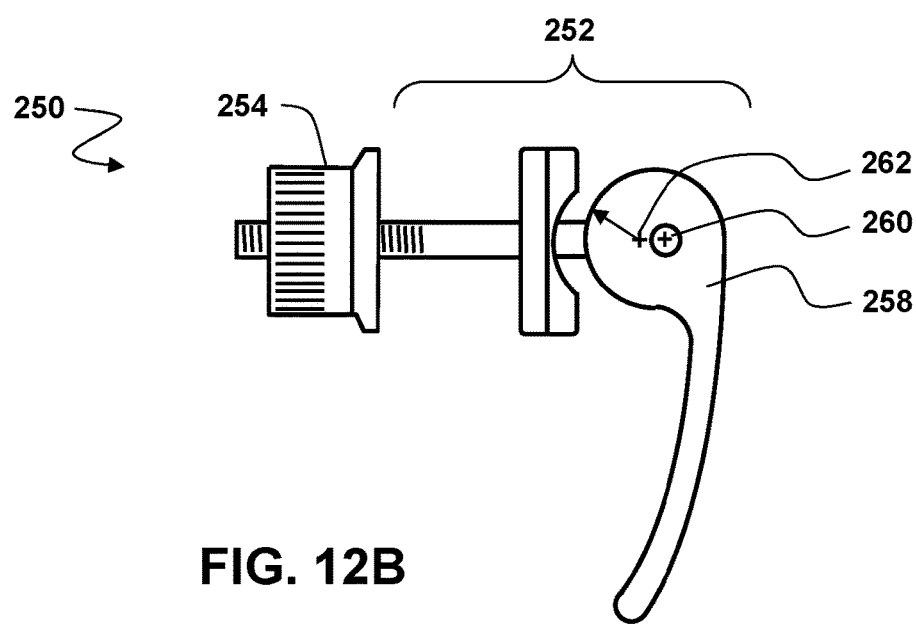
FIG. 12B illustrates a quick release cam mechanism suitable for use with embodiments of the present invention.

Further referring to FIG. 2A, the embodiment of the user detachable hub shown at 116 has three fingers that extend radially. The three fingers comprise hub attachment points. The user detachable hub 116 can be attached to the wheel 120 by a user without significantly affecting spoke tension as will be described in the sections that follow. The system shown in FIG. 2A uses three eccentric cam quick release devices, comprising eccentric cam quick release mechanisms, shown at 252, and hand tightenable nuts, shown at 254, that are also shown in FIG. 12B and described with reference to FIG. 12B.

The annulus module 114 in FIG. 2C can also be called an inner annulus, an inner annular module, or a ring-shaped module. The annulus 114 shown in this embodiment comprises two parallel annular disks, shown at 124 and 126, separated by nine disk spacers, shown at 128. The disk spacers 128 can be attached to the annular disks, 124 and 126, by disk-spacer assembly bolts that engage internal threads in the disk spacers 128. The annular disks, 124 and 126, comprise spoke-to-annulus attachment points, shown at 132. The spoke-to-annulus attachment points 132 are configured for spokes that will radiate outward from the annulus 114. The spoke-to-annulus attachment points 132 are in a circular configuration. In the embodiment shown, the spoke-to-annulus attachment points 132 are axial thru holes designed for spokes with j-bends. The spoke-to-annulus attachment points 132 can be any type of attachment point capable of being understood by anyone skilled in the art including radial through holes. The embodiment of the annulus 114 shown has 9 spoke attachment points per disk, for a total of 18 spoke-to-annulus attachment points 132. There can be any number of spoke-to-annulus attachment points 132 per annular disk above a minimum of 2 and the number of spoke-to-annulus attachment points 132 does not need to be the same for both annular disks. The annulus 114 also includes three hub attachment points shown at 134.

One important benefit of having an annulus is that the center of the wheel is open. This provides the opportunity for part of a second wheel to nest inside of this annulus to reduce overall stack height for multiple wheels. An analysis of various wheels and hubs has identified the following diameters as being typical for the centers of wheels that one might want to nest inside the annulus:

| Diameter of a hub in various locations | Typical diameter |
| --- | --- |
| Outside diameter on non-flange side for a rear wheel that does not have disk brakes taken 1 inch from end of axle | 1 inch (25 mm) |
| Outside diameter of a disk brake flange | 2 inches (50 mm) |
| Outside diameter of an 18-tooth cog | 4 inches (100 mm) |
| Outside diameter of a 36-tooth cog | 6 inches (150 mm) |
| Outside diameter of a 42-tooth cog | 7 inches (175 mm) |
| Outside diameter of a 48-tooth cog | 8 inches (200 mm) |
| Outside diameter of a disk brake | 8 inches (200 mm) |

Given the information above, it is beneficial to have the aperture of the annulus be as large as possible, and 1 inch (25 mm), 2 inches (50 mm), 4 inches (100 mm), 6 inches (150 mm), 7 inches (175 mm), and 8 inches (200 mm) are good targets to shoot for.

FIG. 2B provides more detail of an embodiment of a user detachable hub at 116, which was also shown in FIG. 2A. The detachable hub 116 comprises two flat spiders, shown at 138 and 140 that are attached to a hub body, shown at 142. Each spider has three fingers that extend outwards to annulus attachment points. There are three finger spacers, shown at 148, which ensure that the fingers are in the correct positions and can be compressed when placed into the annulus 114 in FIG. 2C. The detachable hub also comprises a central axle, which has two frame attachment regions, one on each end, shown at 154 and 156. These frame attachment regions, 154 and 156, will fit into the dropouts on a bicycle frame. If this is a hub for a front wheel, the frame attachment regions, 154 and 156 will fit into the dropouts on the front fork of the bicycle frame. If this is a hub for a rear wheel, the frame attachment regions will fit into the dropouts on the rear triangle of the frame, which are typically either part of the chain stays, the seat stays, or of an integrated rear triangle that comprises both seat stays and chain stays. The detachable hub 116 also comprises bearings (typically 2 sets), which are typically inside the hub body and allow the hub body 142 to rotate about the axle. The remaining parts and configuration possibilities of the detachable hub can be similar to other bicycle hubs and capable of being understood by anyone skilled in the art. For example, the central axle 152 shown is a hollow cylinder that is designed for attachment to a bicycle frame using a skewer. The bearings shown are cartridge bearings, but open unsealed bearings could also be used.

Figure 3A:
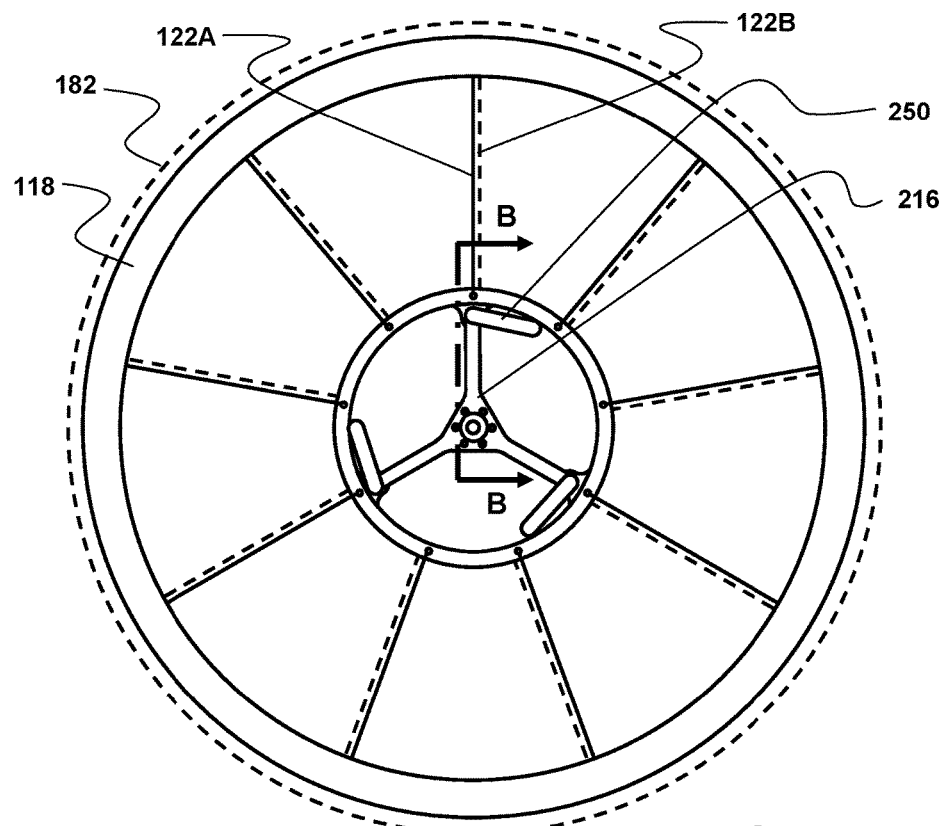
FIG. 3A shows an axial view of the wheel of FIG. 2A.
Figure 3B:
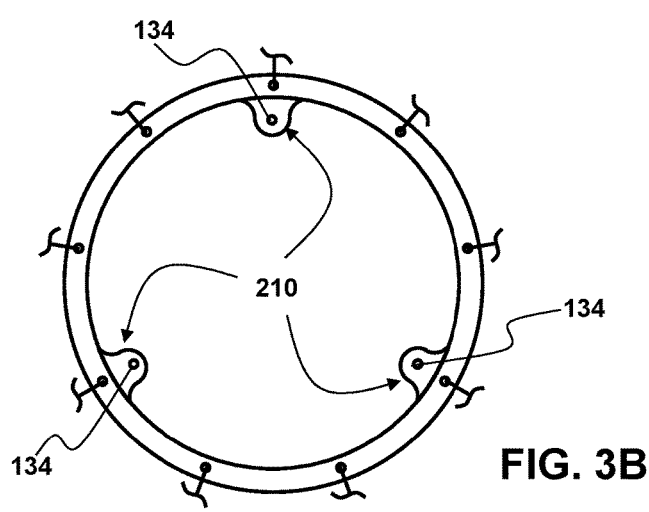
FIG. 3B shows an axial view of the central section of the wheel of FIG. 3A with the hub removed.

FIG. 3A shows an axial view of the assembled wheel of FIG. 2A. FIG. 3B shows an axial view of the central section of this wheel with the hub (116 in FIG. 2A) and quick release devices (250 in FIG. 2A) removed. A tire is shown as a dotted line at 182. The rim is shown at 118. For clarity, the near spokes 122A coming from the closest (front) annular disk (124 in FIG. 2A and FIG. 2C) are shown as solid lines and the far spokes 122B coming from the second (rear) disk (126 in FIG. 2A and FIG. 2C) are shown as dotted lines. Annulus-to-hub mounting tabs are shown at 210 in FIG. 3B and are located on the rear disk (126 in FIG. 2A and FIG. 2C). The three hub attachment points are shown at 134.

Figure 4:
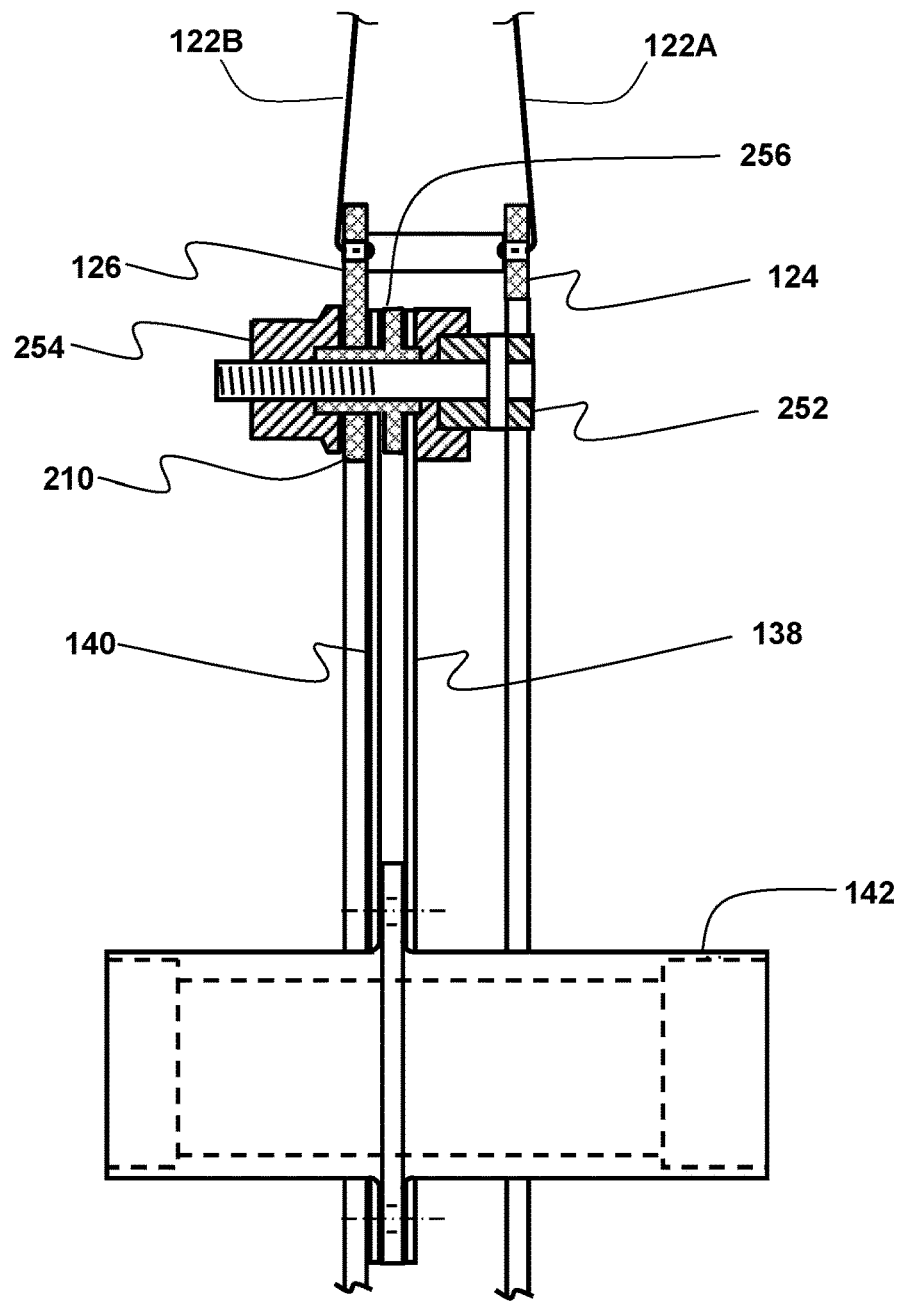
FIG. 4 shows section B-B of FIG. 3A.

FIG. 4 shows section B-B of FIG. 3A; including a hub body 142, a first flat spider 138, a second flat spider 140, the first disk 124, the second disk 126 that includes the annulus-to-hub mounting tab 210, an eccentric quick release mechanism 252, a hand tightenable nut 254, and two spokes 122A and 122B. Also shown is an attachment bushing 256 that can be used to secure the first flat spider 138 and the second flat spider 140 to each other and provide a hollow shaft that fits into the annulus-to-hub mounting tab 210.

4. Alternate Annular Wheel Embodiments

Figures 5A, 5B, 5C:
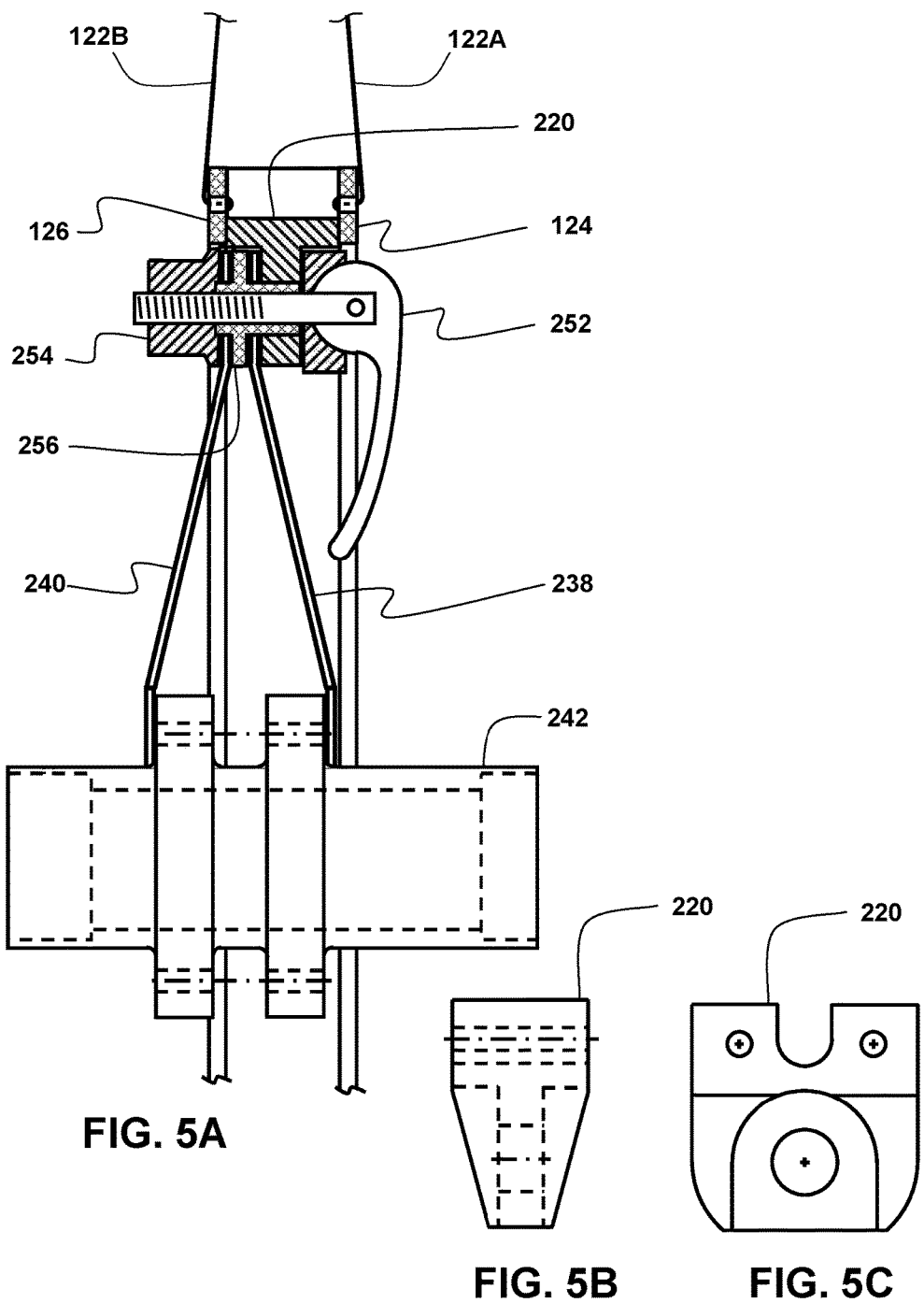
FIG. 5A shows an alternate embodiment of a spider-to-annulus attachment system (section B-B of FIG. 3A) that can be substituted for the system shown in FIG. 4.
FIG. 5B shows a first view (in the same orientation as FIG. 5A) of the mounting block that can be used with the embodiment in FIG. 5A.
FIG. 5C shows a second view of the mounting block of FIG. 5B.

FIG. 5A shows section B-B of FIG. 3A for an alternate embodiment of a spider and annulus attachment system that can be substituted for the system shown in FIG. 4. In FIG. 5A, the spokes are shown at 122A and 122B, the eccentric quick release mechanism is turned 90 degrees and is shown at 252. The hand tightenable nut is shown at 254. The two disks 124 are identical and have no annulus-to-hub mounting tabs (210 in FIG. 3A and FIG. 4). Instead, an annulus-to-hub mounting block 220 spaces the disks 124 and provides an attachment point for the spiders. In the embodiment shown in FIG. 5A, the first spider 238 and second spider 240 are further apart at the point where they are attached to an alternate hub body 242 than they are at the point where they are attached at the rings 124 through the annulus-to-hub mounting block 220. By having the rings be closer together at the point where the spiders attach, the number of spacers needed is reduced and the overall structure for the wheel can be made flatter. Using spiders that have a triangular configuration allows the spiders to be made of substantially thinner material and yet the overall structure provides high axial stiffness because the angled beams in the spiders would need to change in length for the rings to move axially relative to the hub. Further referring to FIG. 5A, the spiders, 238 and 240, can be bolted to flanges on the alternate hub shell 242 (also known as an alternate hub body), which has the remaining hub components such as bearings mounted in it. At their distal points, each pair of fingers of a spider is separated and held by the attachment bushing 256. The attachment bushings 256 mount into the annulus-to-hub mounting blocks 220, that are shown in FIG. 5B and FIG. 5C, and can be clamped in the annulus-to-hub mounting blocks 220 using hand-actuated cam fasteners that each comprise an eccentric cam quick release device 252 and hand tightenable nut 254. The rings 124 can be spaced apart and held in this spacing by the annulus-to-hub mounting blocks 220. There can also be ring (or annular disk) spacers (such as those shown at 128 in FIG. 3C) to separate the two rings 124. The attachment bushing 256 was shown with reference to FIG. 4. This attachment bushing(s) 256 can serve the following purposes. (1) The bushing(s) can be made of a hard material, such as steel that better facilitates the transmission of force from the narrow spiders to the rings. (2) The bushing(s) can have flanges that space the spiders apart. When the both spiders are on the same side of the location where they are attached to the rings (either the mounting tabs in FIG. 3B and FIG. 4 or the annulus-to-hub-mounting block 220 in FIG. 5A) the packing and unpacking of the human-powered vehicle is simplified because the hub+spiders can be loaded axially directly into the rings 124.

The rings 124 that have been illustrated could simply be cut from sheet metal (such as ⅛" thick flat 6061-T3 aluminum plate) and this cutting operation could be performed using a water jet, laser cutter, plasma cutter, hole saw, milling machine, or lathe using techniques capable of being understood by anyone skilled in the art. The rings 124 could be anodized after they have been made to size.

Alignment of the rim and tire to the center of rotation of the wheel at its axle is one of the technical challenges in configuring, designing, fabricating, and using a bicycle wheel. This alignment is more difficult if the wheel comprises a hub that is detachable from the other wheel components, such as the embodiments described herein—where misalignments can occur at the interface between the annulus and the detachable hub. There are two alignments necessary:

(1) Concentricity (also known as radial alignment, runout, or eccentricity), which can be defined as the distance the axis of rotation of the wheel moves up and down as the wheel rolls on a flat surface; and
(2) Axial alignment, which can be defined as the distance the rim of the wheel wobbles in a direction parallel to the axis of rotation as the wheel rotates 360 degrees.

Figure 6A:
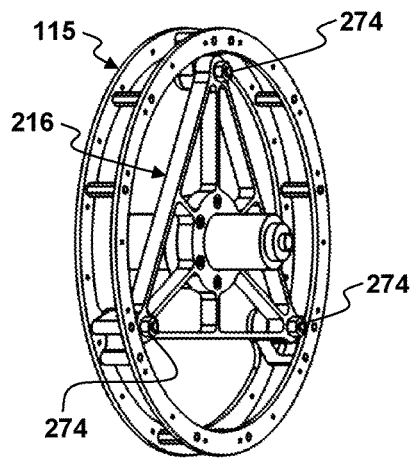
FIG. 6A shows a perspective view of another assembly comprising central annulus, a user detachable hub, and three lug nuts to attach the annulus to the hub.
Figure 6B:
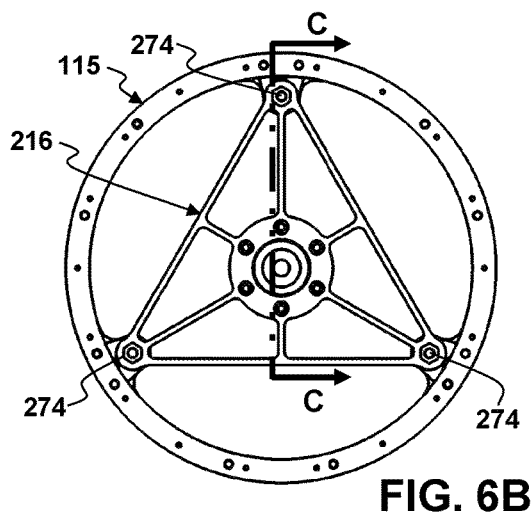
FIG. 6B shows an end view of the assembly of FIG. 6A.
Figure 6C:
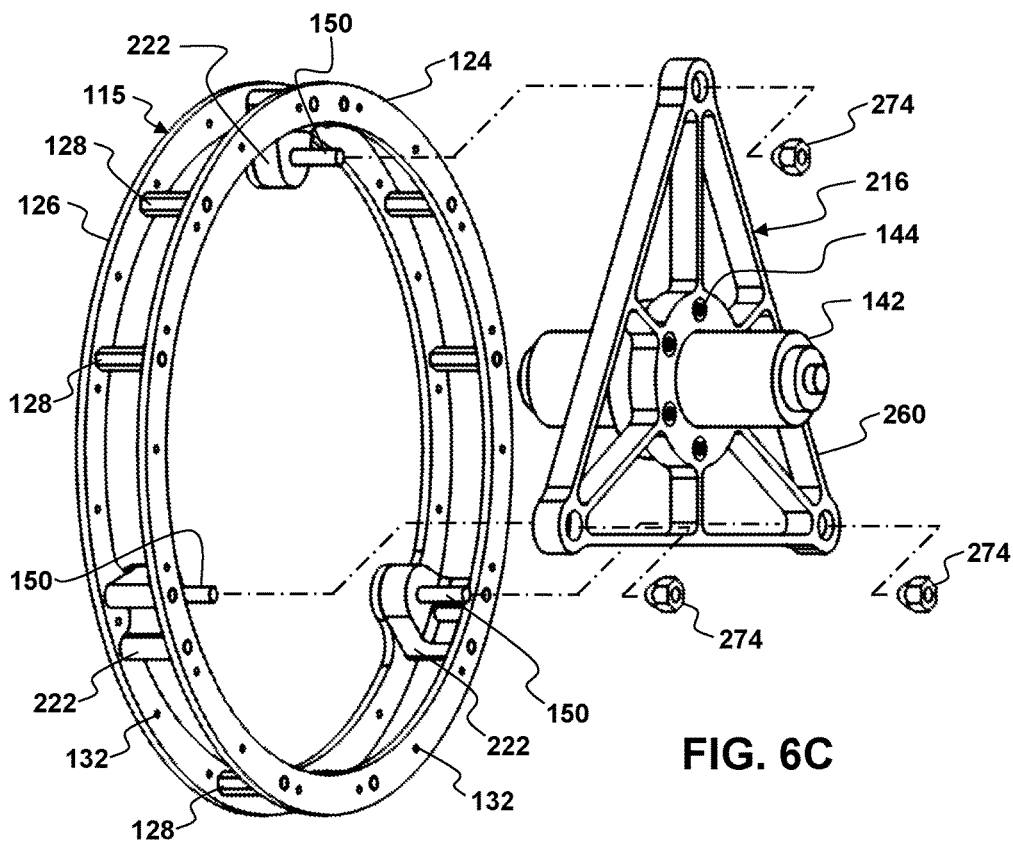
FIG. 6C shows an exploded view of the assembly of FIG. 6A.
Figure 7A:
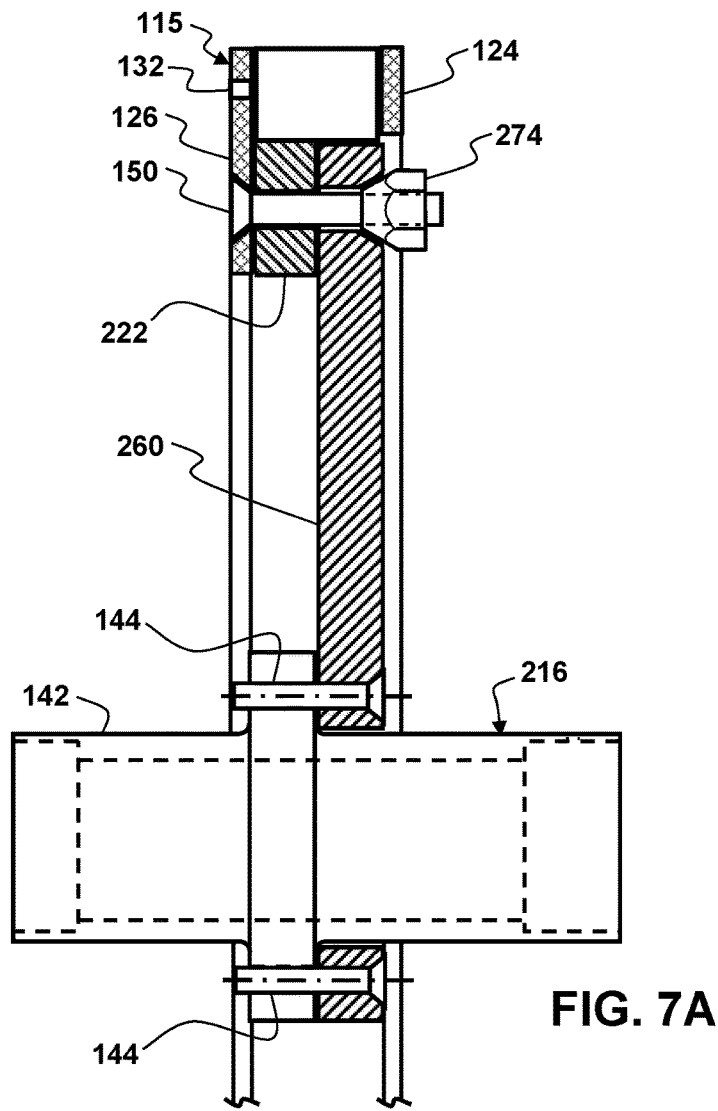
FIG. 7A shows section C-C of FIG. 6B.

In the embodiments described herein, axial alignment can be facilitated by ensuring that the (a) the spider (or other part of the detachable hub) has a flat surface that is perpendicular to the axis of rotation of the hub in the region of engagement with the annulus; (b) that the annulus has a flat surface that is parallel with the rim in the region of engagement with the spider (or other hub part); and (c) that the spider (or other hub part) surface is pressed against the annulus surface. In the embodiments described herein, radial alignment can be facilitated by using a conical feature to press the annulus to the spider (or other hub part). FIGS. 6A to 7D illustrate an embodiment that uses these principles to facilitate radial and axial alignment. More specifically: FIG. 6A shows a perspective view of another assembly comprising an alternate annulus module 115, an alternate user detachable hub module 216, and three lug nuts 274 with conical features that secure the alternate annulus 115 to the alternate hub 216. FIG. 6B shows an end view of the assembly of FIG. 6A with the alternate annulus module 115, the alternate hub module 216, and the three lug nuts 274. FIG. 6C shows an exploded view of the assembly of FIG. 6A with the alternate annulus module 115, the alternate hub module 216, and the three lug nuts 274. FIG. 7A shows section C-C of FIG. 6B, and this section view also illustrates the alternate annulus module 115, the alternate hub module 216, and one lug nut 274.

Further referring to FIG. 6C and FIG. 7A, the alternate annulus module 115 comprises a first annular ring 124 and a second annular ring 126, which can be similar to the rings that were described previously. The alternate annulus module 115 is configured for 36 spokes and there are 18 spoke holes (also referred to as spoke to annulus attachment points) on each ring, examples of which are indicated at 132. The spoke holes on both rings are on the same circular diameter, but the spoke holes on one ring are rotated 10 degrees from the spoke holes on the other ring so there is one spoke hole every 10 degrees with the spoke holes alternating between rings. The second annular ring in this embodiment has three mounting tabs similar to what was shown at 210 in FIG. 4 and the first annular ring in this embodiment does not have mounting tabs, which is also the same as for the embodiment shown in FIG. 4. The alternate annulus module 115 comprises six disk spacers, examples of which are indicted at 128, and three alternate annulus-to-hub mounting blocks, shown at 222. There are three hub-to-annulus attachment bolts 150 that have a tapered engagement surfaces that fit chamfers in the mounting tabs of the first annular ring 126. These hub-to-annulus attachment bolts 150 are threaded into the alternate annulus to hub mounting blocks 222.

Continuing with the description of FIG. 6C and FIG. 7A, the alternate hub module 216 comprises a single thick spider, shown at 260, that is attached to a hub body 142, similar to what has been shown previously, using six spider attachment bolts, examples of which are shown at 144. The single thick spider 260 can be fabricated from sheet metal that is waterjet cut, laser cut, or cut in some other way capable of being understood by anyone skilled in the art. This produces a component that is highly functional for this application and yet low cost to manufacture. The lug nuts 274 are threaded onto the hub to annulus attachment bolts 150 and tightened so that the conical surfaces of the lug nuts 274 engage with conical chamfers in the single thick spider 260 to provide a secure engagement that minimizes eccentricity and angular misalignment as described previously.

Figure 7B:
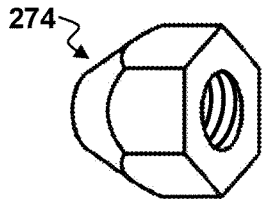
FIG. 7B provides a close-up perspective view of a lug nut suitable for the assembly shown in FIG. 6A to FIG. 7A.
Figure 7C:
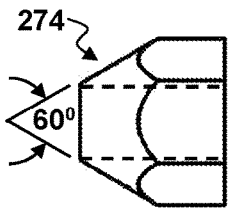
FIG. 7C is a side view of the lug nut of FIG. 7B.
Figure 7D:
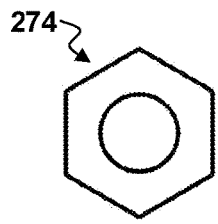
FIG. 7D is an end view of the lug nut of FIG. 7B.

The geometry of the lug nuts 274 is shown in greater detail in FIG. 7B (isometric view), FIG. 7C (side view), and FIG. 7D (end view). In one embodiment, the included angle of the conical section of the lug nut is 60 degrees, as shown in FIG. 7C. This angle has been determined to optimize the axial clamping force and radial alignment force to provide the best alignment of the spoked wheel (such as 120 in FIG. 2A) with the axis of rotation of the hub.

Figure 8:
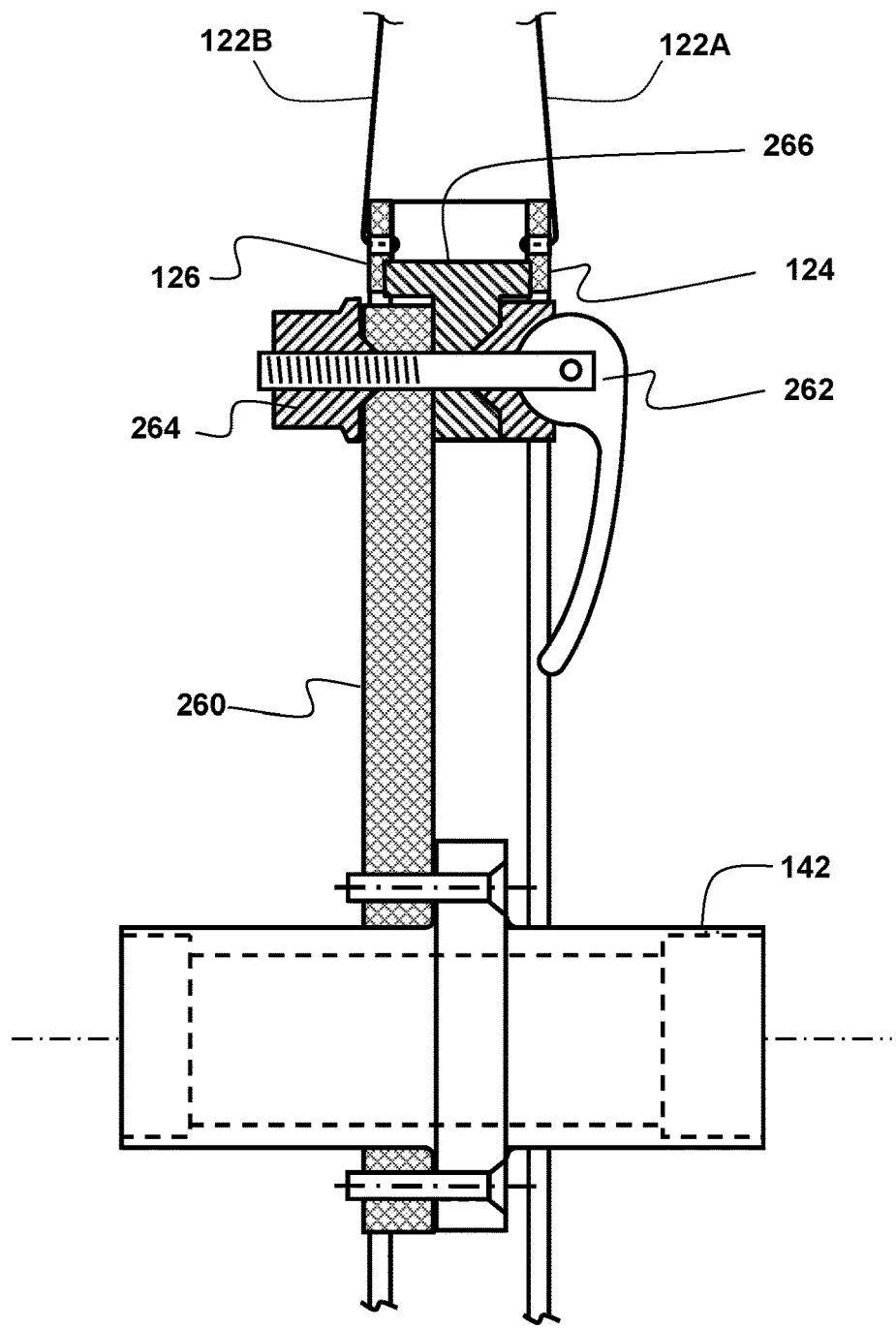
FIG. 8 is a section view of an embodiment that incorporates the conical lug nut principles of the embodiment shown in FIG. 6A to FIG. 7D with the eccentric cam quick release mechanisms of the embodiments shown in FIG. 2A through FIG. 5C.

FIG. 8 shows a section view of an annulus module and hub module that incorporates configuration elements from multiple embodiments that have been described in this document. This configuration addresses the following technical requirements:

(a) Lateral deflection of the rim as a result of lateral forces on the rim is reduced by because a single thick spider 260 can be stiffer than a pair of spiders, such as the spider pair, 138 and 140 in FIG. 4, or the alternate spider pair 238 and 240 in FIG. 5A;

(b) Having the flat surface of the single thick spider 260 rest directly against the flat surface of the mounting block 266 for this configuration, minimizes wobble of the rim of the wheel; and (c) The use of a hand-tightenable nut with conical attachment interface, shown at 264, to clamp accurately to the single thick spider 260, and the use of an eccentric cam quick release mechanism with conical interface, shown at 262, to clamp accurately to a mounting block with conical feature, shown at 266, combines the ability to repeatably locate the hub concentrically to the rim, even as components wear, that was also shown in the embodiment of FIG. 6A to FIG. 7D, with the cam-actuated tool-free fastener that was shown in the embodiments of FIG. 2A to FIG. 5C.

The embodiment shown in FIG. 8 can be implemented using the same first annular ring 124 and second annular ring 126 that were shown with reference to FIG. 2A, FIG. 4, and FIG. 5A. The near spokes 122A and far spokes 122B could also be implemented in the same way as in previous figures. The hub body 142 shown for the embodiment in FIG. 8 can also be very similar to the hub body 142 that was shown in the other embodiments.

More broadly, it should be noted that embodiments of the wheels used with the present invention can comprise any combination or set of permutations of the elements and features illustrated and/or described in this document, including, but not limited to:

the use of any number of fasteners (such as lug nuts and/or eccentric cam quick release devices) to attach an annular module to a hub module, not just the 3 shown in these embodiments;

using annulus-to-hub mounting tabs (210 in FIG. 3B and FIG. 4) instead of or in addition to mounting blocks (220 in FIG. 5A, FIG. 5B, and FIG. 5C);

using a matching pair of conical features on interface between the single thick spider, 260 in FIG. 8 and the mounting block, 266 in FIG. 8, in addition to or instead of some of the other conical features shown in FIG. 8;

a configuration of the annulus in which straight spokes instead of j-bend spokes are used and therefore the inner attachment points of the spokes are through holes in a hollow cylinder located on two parallel planes that are perpendicular to the central axis of the wheel;

the annulus can have an orientation feature that visually or physically helps the user to identify the correct orientation of the annulus relative to the detachable hub when the annulus and the detachable hub are to be attached to each other (orientation in this disclosure means which end of the axle of the hub is most proximate to which of the parallel annular disks);

the annulus can have a rotation feature that visually or physically helps the user to identify the correct rotation of the annulus to the detachable hub when the annulus and the detachable hub are to be attached to each other (orientation in this disclosure means rotation of the annulus relative to the hub about their common central axis);

the detachable hub can have a rotation feature that visually or physically helps the user to identify the correct rotation of the detachable hub relative to the annulus when the detachable hub and the annulus are to be attached to each other; and/or a wheel configuration that has no central hub. Instead, there could be a ring-shaped inner annulus (to which the spokes are attached) that further comprises one or more bearings that have a large central opening. One race of this bearing or bearings could be attached to the annulus. The other race could be attached to a ring-shaped element that does not rotate when the wheel rotates and this ring-shaped element could be attached to one arm of a front "fork" that then attaches to the rest of the bike frame in a way that is very similar to the "Lefty" fork made by Cannondale. Thus, the wheel and fork would always have a large diameter aperture that allows a real wheel to nest inside of the center of a front wheel.

5. Spoke Lacing Patterns.

Figure 9A:
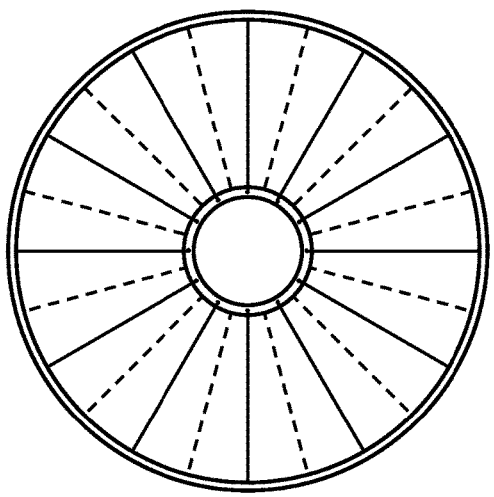
FIG. 9A shows radial spoking between an annulus and a rim.
Figure 9B:
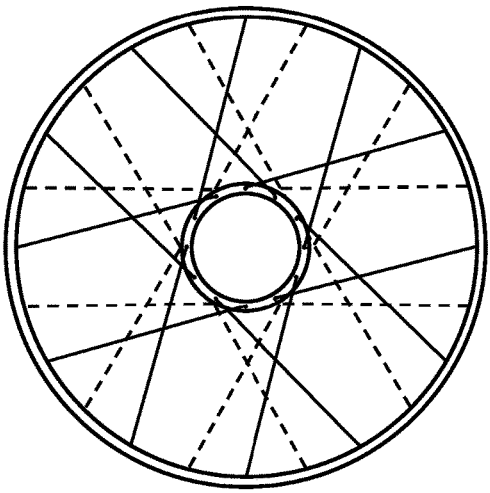
FIG. 9B shows tangential spoking from an annulus to a rim.
Figure 9C:
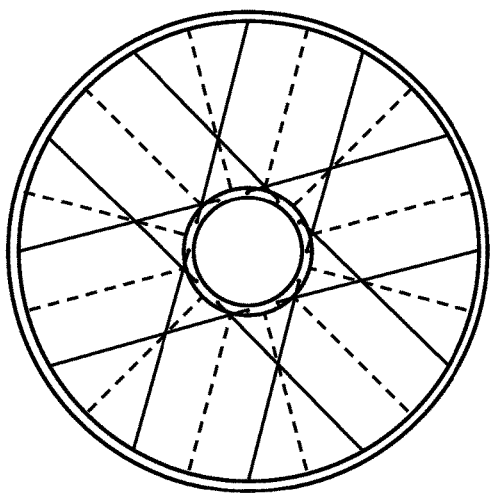
FIG. 9C shows a combination of radial and tangential spoking between an annulus and a rim.

FIG. 9A, FIG. 9B, and FIG. 9C show examples of spoke lacing patterns that can be used with embodiments of the present invention. For ease of understanding the spokes that reach the near plane of the annulus for these wheels are shown as solid lines and the spokes that reach the far plane of the annulus are shown as dotted lines. FIG. 9A shows an embodiment in which both the near plane and the far plane spokes are laced radially. FIG. 9B shows an embodiment in which both the near plane and the far plane spokes are laced tangentially. FIG. 9C shows an embodiment in which the spokes in the two planes are laced differently from each other. In the configuration show in FIG. 9C, the near plane spokes are tangentially laced and the far plane spokes are radially laced. There can be advantages and disadvantages to each of the types of spoke lacing patterns shown in FIG. 9A, FIG. 9B, and FIG. 9C. For example, the radial-radial pattern shown in FIG. 9A is often used for front wheels on bicycles with rim brakes because these wheels transmit no tangential force and this configuration maximizes the radial and axial loads that can be carried. Rear wheels are used to drive the bike forward and therefore must transmit torque (i.e. tangential force) from the hub to the rim and the tires, so a tangential-tangential spoke pattern such as that shown in FIG. 9B is most often used. A mixed tangential-radial pattern, such as that shown in FIG. 9C can be beneficial in some situations.

6. Foldable Compact Bicycle and Bicycle Frame Embodiment

Prior art bicycles designed for compact storage and transport generally fall into the following non-exclusive categories:

GROUP A comprises bicycles such as the embodiments shown in U.S. Pat. No. 4,426,606 (Hon) and U.S. Pat. No. 5.975,551 (Montague) that (1) have a single fold about a substantially vertical axis at a point located forward of the seat tube (Hon) or proximate to the seat tube (Montague), (2) do not remove the rear wheel when folding, and (3) have a folded size in at least one direction that is larger than diameter the of the wheels and typically also wider than 10 inches because nothing has been done to optimize the placement of the central hubs of the wheels;

GROUP B comprises bicycles such as U.S. Pat. No. 4,182,522 (Ritchie) that (1) fold the rear of the frame down and under about a horizontal axis located behind the seat tube, (2) do not remove the rear wheel when folding, (3) fold the front tube about a vertical axis, and (4) do not remove the front wheel while creating a folded size that can be smaller than the airline 62 linear inch limit when small wheels are used; and GROUP C comprises bicycles such as U.S. Pat. No. 5,586,652 (Smilanick) that have a frame that disassembles after the front and rear wheels have been removed to allow the front frame section, rear frame section, and the two wheels of a bicycle with full size wheels to be separately packed into a 26×26×10 inch case that meets the airline requirements for full-size luggage not subject to a baggage surcharge.

Important differences between the present invention and the above groups of bicycles are illustrated in the table below:

|  | Group A | Group B | Group C | Invention |
|---|---|---|---|---|
| Frame fold axis | Vertical | Horizontal and vertical | Disassembled not folded | Horizontal |
| Fits 26 × 26 × 10 | No | Yes | Yes | Yes |
| Full size wheels | Some models | No | Yes | Yes |
| Wheels removed | Typically not | No | Yes | Yes |

The table above shows that embodiments of the present invention are similar to Group C in that a bicycle using full size wheels can fit into the 62-linear inch size (typically 26×26×10 inches if 700C wheels are used). Embodiments of the present invention differ from Group C in that embodiments of the present invention are based on a frame that can be folded, while bicycles in Group C have frames that are disassembled, not folded. The disadvantages of disassembling a bicycle frame can include:

(a) Assembly and disassembly can require special fasteners and/or tools;
(b) The cables that run from the front of the bike (typically on or near the handlebars) to the rear of the bike (for the derailleur and rear brakes, for example) typically need to be disconnected to pack the separable bicycle parts;
(c) The separable parts might need to be wrapped to keep them from rubbing against each other and causing damage;
(d) It might require detailed instructions, practice, and finesse to place each separable part in the case; and
(e) The entire process of disassembly and packing the bicycle is likely to take significantly more time than if at least the main bicycle frame sections could be folded together instead of needing to be detached from each other.

For the above reasons, it is highly desirable to fold as many parts of the bicycle instead of disassembling and packaging these parts.

Figure 10A:
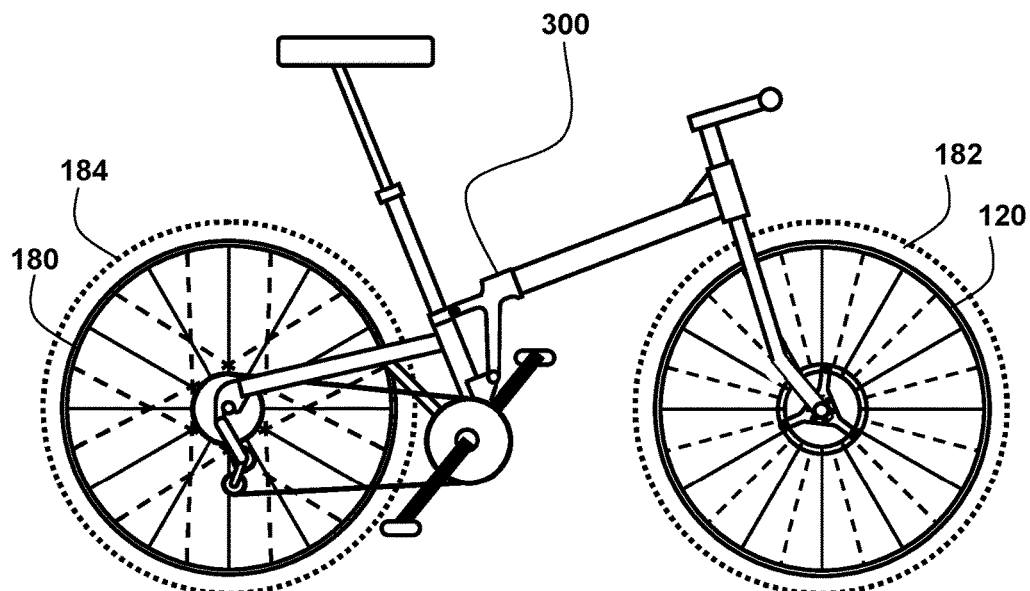
FIG. 10A shows a bicycle that comprises a folding frame and an annulus front wheel with a removable hub.
Figure 10B:
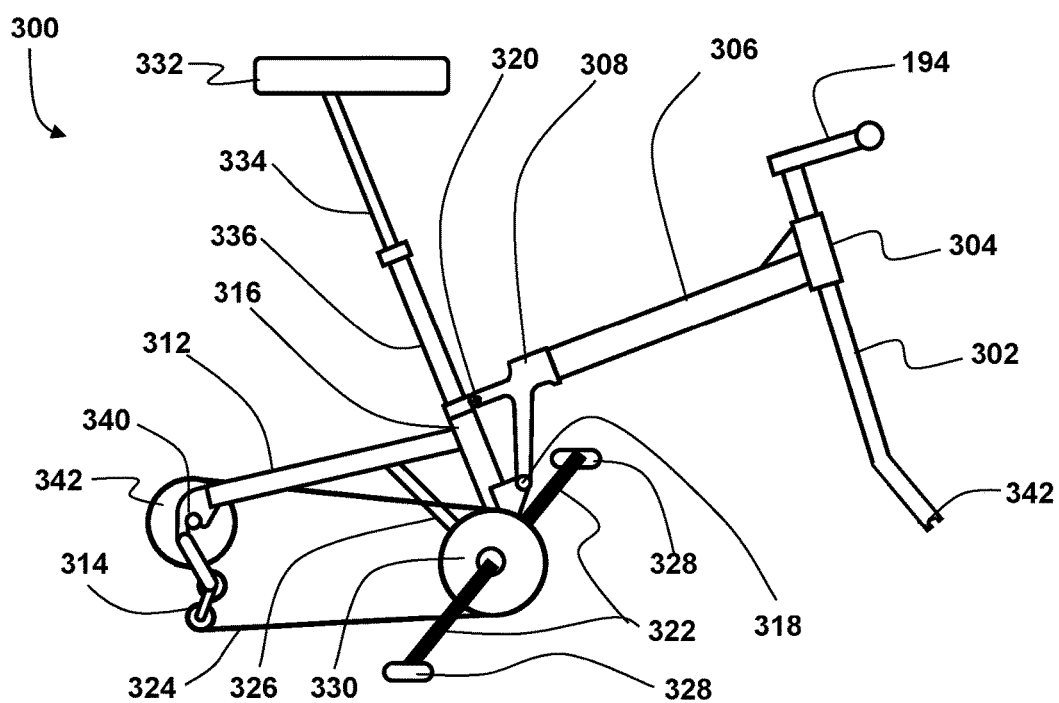
FIG. 10B shows the folding bicycle frame of FIG. 10A without the front and rear wheels.

FIG. 10A illustrates the main components of an embodiment of a human-powerable bicycle that uses a folding frame and full-size wheels. The system shown in FIG. 10A is in its unpacked or "ride" mode. This system includes a folding bicycle frame 300, a spoked first wheel 120 that is also a front wheel, a first tire on the first wheel 182, a second wheel 180 that is also a rear wheel, and a second tire 184 on the second wheel. FIG. 10B shows the folding bicycle frame of FIG. 10A without the wheels and tires. The folding bicycle frame 300 can have a front frame section. The front frame section can include a front tube 306, which could also be called a top tube, a front frame tube, or a down tube. A head tube 304 can be permanently attached one end of the front tube 306 and a connection module 308 (which could also be called hinge module, fold module, adapter module, or folding joint) can be permanently attached to the other end of the front tube 306. The connection module 308 can comprise a front fame pivot element and a front frame fastening element. The front frame section can include a front handlebar module 194, that is attached to a front fork 302, that rotates inside the head tube 304. The front fork 302 can be configured for holding the front wheel in a pair of front dropouts 344.

Further referring to FIG. 10B, the folding bicycle frame 300 can have a rear frame section that attaches to the front frame section. The rear frame section shown in FIG. 10B has two rear stays 312, one located on the drive side (drive side rear stay) of the rear wheel and one located on the non-drive side (non-drive side rear stay) of the rear wheel when the bicycle is in ride mode, the configuration that was shown in FIG. 10A. On bicycles, the drive side is typically the right (or starboard) side and the non-drive side is typically the left (or port) side of the bicycle when viewed from the rear looking forward. The drive side is the side that the chain (or drive belt) is on. It is also the side of the wheel that will have the cog for engaging a chain or drive belt 324. The two rear stays 312 can also be called seat stays and in the configuration shown they perform some of the function normally performed by chain stays on a bicycle. Each of the two rear stays 312 in FIG. 10B have a rear dropout 340 at one end of the rear stay 312. The rear dropouts 340 are configured for holding a side of the center (e.g. central axle) of the rear wheel (180 in FIG. 10A). The drive-side rear stay 312 can have a rear derailleur 314 mounted near its dropout. The end of the rear stays 312 opposite of the dropouts 340 are fixedly, immovably, and permanently attached to a main seat tube 316 (which can also be called a rear frame section seat tube). The rear stays 312 and main seat tube 316 can be rotatably connected to the connection module 308 of the front section at a folding frame pivot axis 318 through the use of a rear frame pivot element that is permanently attached to the other rear frame section components, and is rotatably connected to a front frame pivot element of the connection module 308 on the front frame section. In one embodiment, a shaft and bushings are used to create the pivot or hinge.

The main seat tube 316 (and other parts of the rear frame section) can be rigidly and detachably attached to the front frame section using a rear frame fastening element 320 that is attached to the rear frame seat tube 316. This rigid connection can also be called an immovable connection. The rear frame fastening element 320 can be attached to a front frame fastening element (shown at 362 in FIG. 11A). In one embodiment, the rear frame fastening element 320 is a collar around the main seat tube, the front frame fastening element comprises holes in the connection module 308, and the rigid and detachable connection is made through the use of an eccentric cam quick release device such as that shown at 250 in FIG. 12B.

Further referring to FIG. 10B, the rear frame section can also have cranks 322 (one on each side) that are connected to the main seat tube 316 through a crankshaft and bottom bracket housing that are not visible in FIG. 10B. The bottom bracket housing is fixedly, permanently, and immovably attached to the main seat tube 316. To further clarify, the bike frame shown in FIG. 10B can have the following attributes:

(a) The frame has a front frame section and a rear frame section;
(b) The front frame section comprises a front frame tube having a head tube attached at one end and a connection module attached at the other end;
(c) The head tube is configured for rotatable attachment to a front fork;
(d) A front wheel can be mounted into the dropouts of the front fork and this front wheel could be one with a removable center section so that the front wheel fits compactly over the center of a rear wheel when the removable center section has been removed;

(e) The front fork is also configured for the attachment of a front handlebar;

(f) The front frame section has two points of engagement with the rear section, a pivot connection and a user detachable rigid (immovable) attachment connection;

(g) The user detachable connection on the front frame section is used when the bicycle is unfolded and placed into "ride" mode;

(h) The rear frame section comprises a rear frame seat tube, a bottom bracket housing, a drive side rear stay and a non-drive side rear stay, all of which are rigidly, securely, immovably, and permanently attached to each other;

(i) The pivot connection allows the front frame section to pivot relative to the rear frame section about a horizontal axis that is located in front of the seat tube; and (j) The rigid attachment connection attaches the front frame section to the rear frame section at a point proximate to the seat post clamp.

Further referring to FIG. 10A, the rear stays 312 on each side of the rear section of the bicycle frame 300 are in an elevated chain stay configuration, which means that the bicycle chain 324 (or a belt, such as a toothed rubber belt) can be removed from the bicycle frame 300 without the loop of the bicycle chain 324 (or belt) needing to be opened or the frame needing to be opened or disassembled. This can be accomplished by having a pair of chain stays 326 (one on each side) that connect between the bottom bracket housing and a point on the rear stays 312 that is above the bicycle chain 324 (or belt). Additional components shown in FIG. 13A include pedals 328 that are connected to the cranks and could be user removable without needing any tools, a front chain ring 330 that connects the cranks 322 to the bicycle chain 324 (or belt), a seat 332, a seat post 334 that is connected to the seat 332, and a telescoping seat tube 336 that connects the seat post 334 to the main seat tube 316.

Figure 11A:
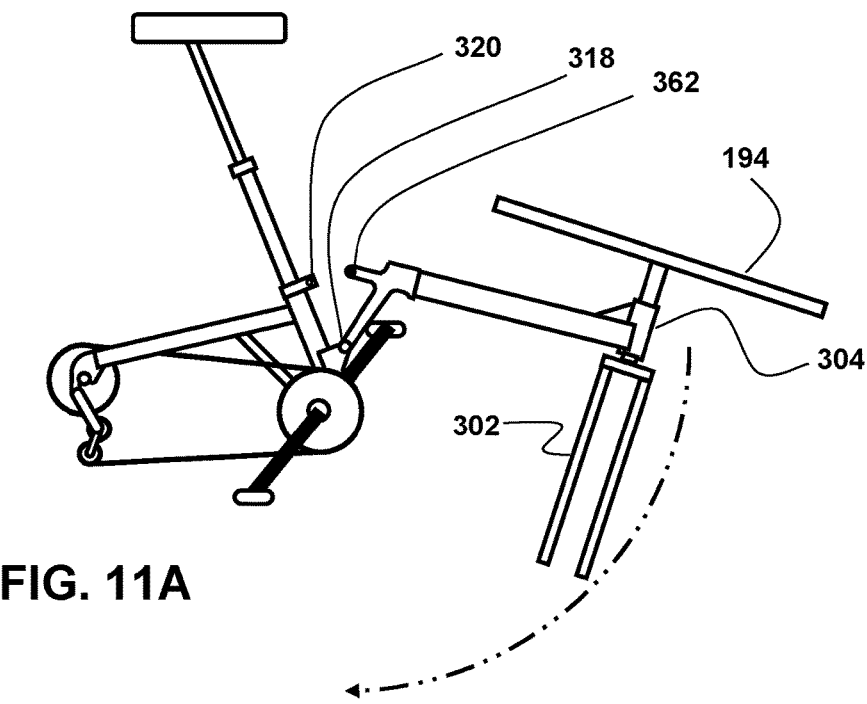
FIG. 11A shows the configuration of FIG. 10B with the front frame section rotated 30 degrees about the frame hinge point and the front fork and handlebars rotated 90 degrees.
Figure 11B:
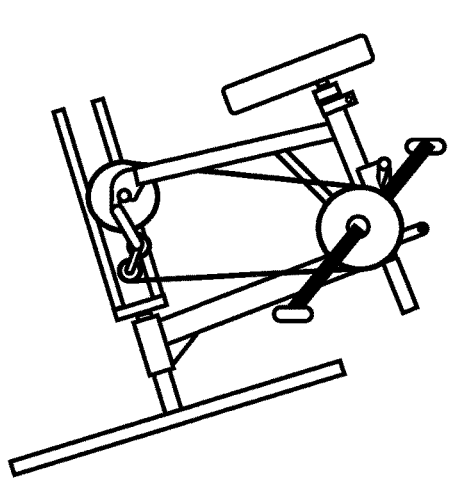
FIG. 11B shows the configuration of FIG. 11A with the front frame section now rotated approximately 180 degrees from the original position that was shown in FIG. 10B and the seat, seat post, and telescoping seat tube moved axially inside each other into compact configurations.
Figure 11C:
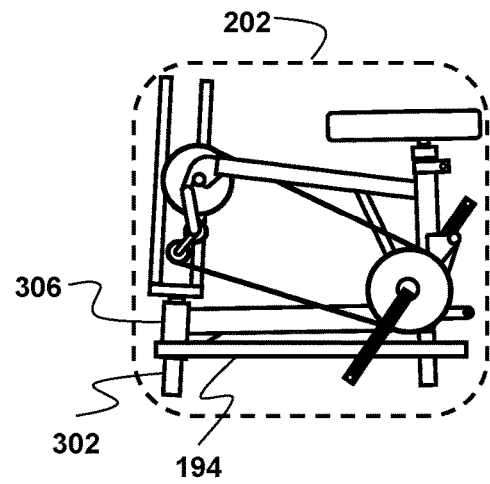
FIG. 11C shows the configuration of FIG. 11B placed into a 26×26 inch physical volume with the pedals removed and the handlebars stowed adjacent to the front tube.

FIG. 11A, FIG. 11B, and FIG. 11C illustrate how the frame that was shown in FIG. 10B can be manipulated to pack it into a small size. The first step, shown in FIG. 11A is to detach the rear frame fastening element 320. This allows the front frame section (comprising the head tube 304, front tube 306, and connection module 308 in FIG. 10A) to rotate clockwise about an axis that is (a) located at the folding frame pivot axis 318 (b) is perpendicular to the plane of the frame and the plane of the rear wheels, and (c) could also be defined as being parallel to the axis of rotation of the rear wheels and the axis of rotation of the crankshaft in the central axis of the hollow cylindrical bottom bracket housing. In FIG. 11A the front frame section has been rotated about 30 degrees from its original "ride" position. The front fork 302 has also been rotated about 90 degrees in the head tube 304 to more clearly reveal the front handlebar module 194. In FIG. 11B, the front frame section has been rotated approximately 180 degrees relative to the rear frame section, which means that that the parts of the front fork module 302 are between the rear stays (312 in FIG. 10B) and proximate to the rear dropouts. In FIG. 11B, the seat post and telescoping seat tube that were shown in FIG. 10B have also been nested together. When the seat post and/or the telescoping seat tube are moved as low as possible, the seat post and/or telescoping seat tube can extend downwards beyond the bottom of the main seat tube to a region below the bottom bracket housing. In FIG. 11C the pedals have been removed from the cranks and the front handlebar module 194 has been removed from the front fork 302 and packed adjacent to the front tube 306. Because the front handlebar module 194 has a substantially straight section, it can easily and compactly be strapped to the front tube 306. In one embodiment, a mounting unit for a bicycle pump can be re-purposed for securely holding the front handlebar module 194 when the frame is packed. After the steps described above, the entire folded bicycle frame fits within a 26×26 inch size, shown at 202. Using this configuration and folding technique it is possible to fit an entire bicycle frame into a size smaller than 26×26 inches, such as 24×24 inches, 24×22 inches, and/or 22×22 inches. The third dimension (thickness) of any of these folded frames can be approximately 6 inches (the width of the rear dropouts), less than 7 inches, less than 8 inches, less than 9 inches, or less than 10 inches.

When the rear wheel is removed from the frame, as shown in FIG. 10B, FIG. 11A, FIG. 11B, and FIG. 11C, the bicycle chain, 324 in FIG. 10B, (or belt) is no longer connected to the rear wheel and can lay loosely in the region of the rear dropout 340, which can result in damage during transit. To remedy this risk of damage, the rear wheel cog that held the chain or belt can be replaced by a chain keeper 342 that mounts into the drive side rear dropout 340 as shown in FIG. 12A and thereby guides the bicycle chain 324 (or belt). A chain keeper 342 typically comprises a toothless spool-shaped pulley that provides a slot that guides the chain (or belt) around an arc of approximately 180 degrees. The chain keeper 342 can be attached to the rear dropout using any detachable attachment method, such as mechanical hardware in the form of a bolt that goes through the pulley and nut that secures the pulley to the dropout 340.

In one embodiment, the bolt and nut described with reference to the chain keeper in FIG. 12A can be replaced by an eccentric cam quick release device 250 shown in FIG. 12B. An eccentric cam quick release device 250 typically consists of a hand tightenable nut 254 that is screwed onto an eccentric cam quick release mechanism 252. Such devices 250 with M5 (5 mm) threads are typically used as quick release devices for holding bicycle wheels into dropouts and such devices 250 using M6 (6 mm) threads are typically used for clamping a seat post into a main seat tube on a bicycle. In embodiments of the present invention, such eccentric quick release devices can also be used as the user detachable upper attachment element 320 as shown in FIG. 10B, as a method for attaching a hub 116 to a wheel as illustrated in FIG. 2A, to secure the chain keeper 342 to the rear dropout, as shown in FIG. 12A; to secure a seat post into a main seat tube or a telescoping seat tube; to secure a telescoping seat tube into a main seat tube; to attach wheel to a frame; to attach a rack to frame; to attach handlebars to a front fork; and/or to attach a something to a rack. Operation of the eccentric cam quick release mechanism 252 in FIG. 12B can best be understood by observing that the eccentric cam, shown at 258 has an eccentric cam center of rotation 260 that is offset from the center of curvature of the eccentric cam surface, which has been shown at 262 as a radius arrow.

Figure 13:
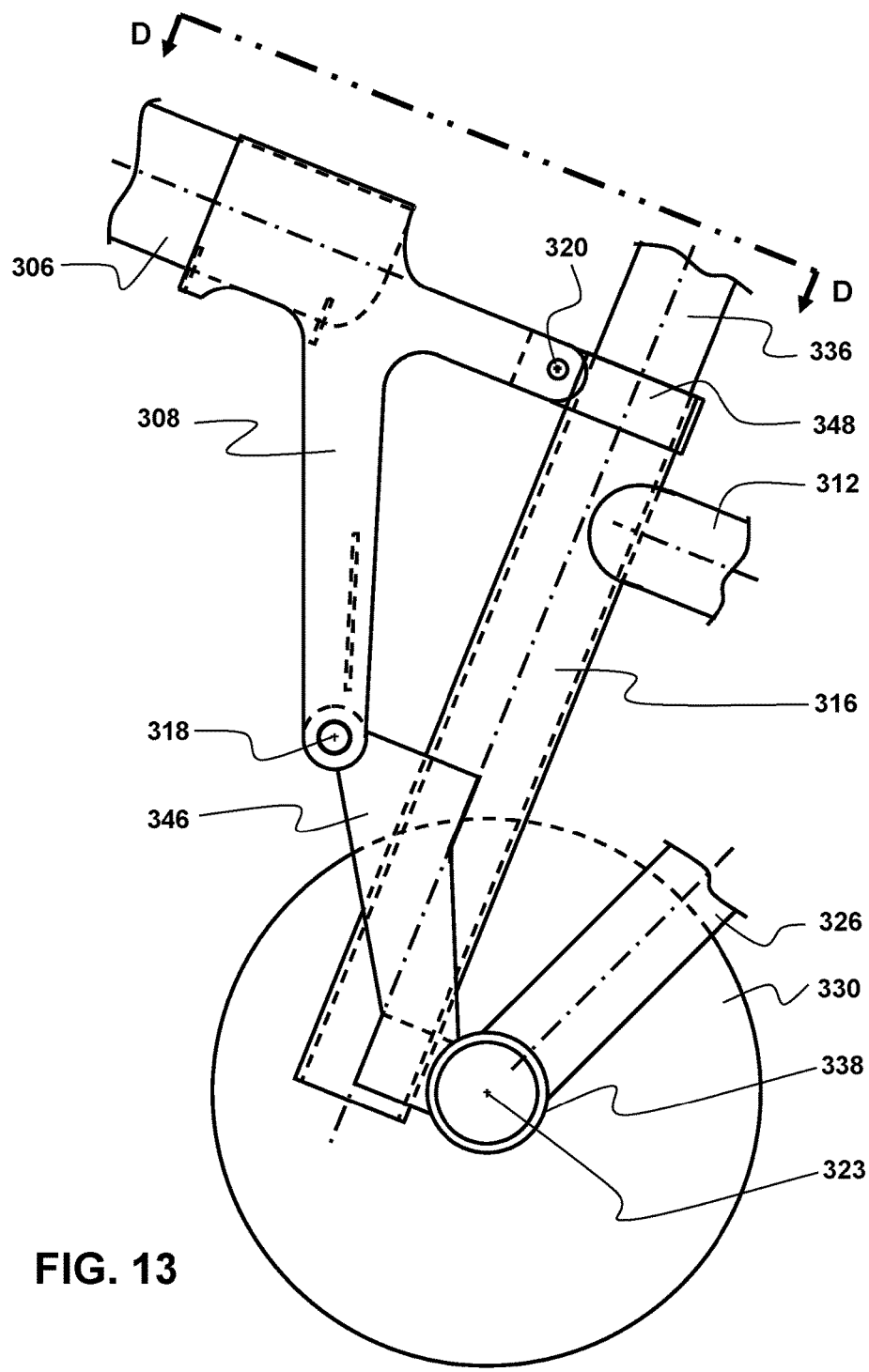
FIG. 13 shows a detailed side view of the hinge system for the folding frame of FIG. 10B when the frame is in a ride configuration.
Figure 14:
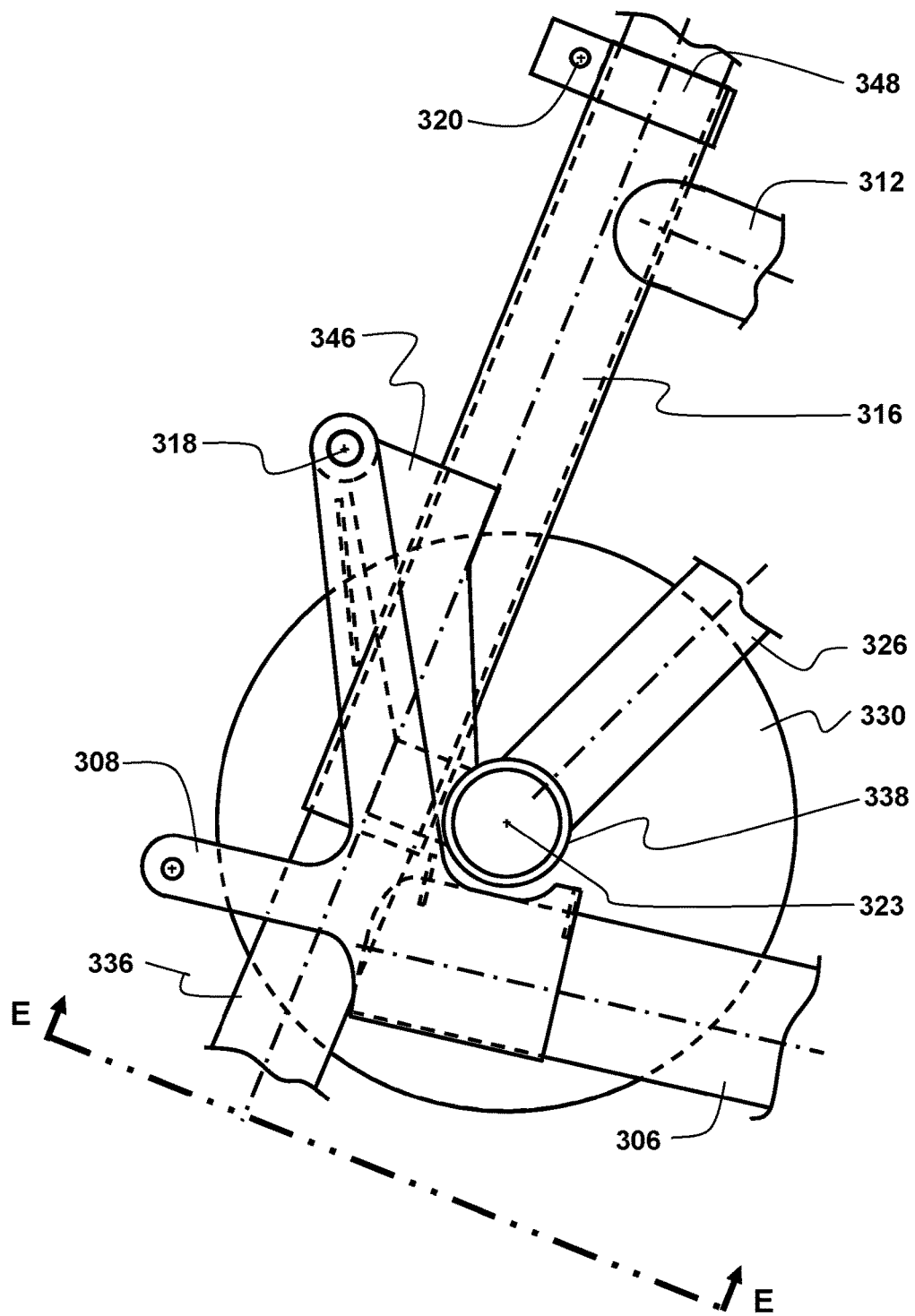
FIG. 14 shows a detailed view of the hinge system for the folding frame of FIG. 11B, and FIG. 11C in when the frame is in a packed configuration.

FIG. 13, FIG. 14, FIG. 15A and FIG. 15B provide more detail of how the front frame section of the embodiment shown in FIG. 10B, FIG. 11A, FIG. 11B, and FIG. 11C rotates relative to the rear frame section. More specifically, FIG. 13 and FIG. 14 show detailed views of the hinge assembly region when viewed from the non-drive (port) side of the bicycle frame, with parts not essential to understanding the hinging mechanism removed. Thus, the front section of the frame is to the left and the rear section of the frame is to the right, exactly opposite of the views shown in FIG. 10B, FIG. 11A, FIG. 11B, and FIG. 11C. All of the rear frame section components, except the telescoping seat tube, are in the same locations in FIG. 13 and FIG. 14. These rear frame section components include:
  (a) the bottom bracket housing 338, which can more generally be described as a human power input device housing or a crankshaft housing, and is used to facilitate the conversion of human forces on the pedals 328 in FIG. 10A through the cranks, 322 in FIG. 10B, that rotate about a crank rotation point 323;
  (b) the front chain ring 330;
  (c) the chain stays 326;
  (d) the rear stays 312;
  (e) the main seat tube 316;
  (f) the telescoping seat tube 336;
  (g) the pivot adapter bracket 346 that rigidly, fixedly, and permanently connect the lower pivot element 318 to the main seat tube 316 and human power input device housing (or bottom bracket housing) 338; and
  (h) the main seat tube clamp 348 that serves as part of the user detachable upper attachment element 320 and clamps the telescoping seat tube 336 into the main seat tube 316.

In FIG. 13 the front frame section is in "ride" mode. This means that the rear frame fastening element 320 detachably secures the front frame section (and more specifically the connection module 308) to the rear frame section (and more specifically the main seat tube clamp 348). This attachment between the front frame section and the rear frame section at the rear frame fastening element 320 could be made using the eccentric cam quick release device 250 that was shown in FIG. 12B. When the frame is in "ride" mode the connection module 308 (which is part of the front frame section) is connected at both the folding frame pivot axis 318 and at the rear frame fastening element 320. The front tube is shown at 306. FIG. 13 also shows geometric relationships for the components for this folding bike frame embodiment, such as:
  (a) the folding frame pivot axis 318 is located above the bottom bracket shell (human power input device housing) 338 and forward of the main seat tube 316;
  (b) the rear frame fastening element 320 is located forward of the main seat tube 316 and above the folding frame pivot axis 318; and
  (c) the bottom section of the main seat tube 316 is located forward of the bottom bracket shell 338.

In FIG. 14 the folding frame is in "packed" mode with the front frame section rotated (counterclockwise in this view) by about 180 degrees (189 degrees to be exact) from the "ride" mode configuration that was shown in FIG. 13. This rotation of the front frame section can be understood by observing that the connection module 308 in FIG. 14 is almost exactly upside down from where it was in FIG. 13 and the front tube 306 in FIG. 14 is pointing toward the rear. One important aspect of the geometric relationship and configuration of the components of the embodiment of the folding bike frame shown in FIG. 14 is that when the front frame section has been rotated into a packed mode, the telescoping seat tube 336 and or the seat post 334 can extend out through the bottom of the main seat tube 316 and fit through an opening (or aperture) in the connection module 308. This opening or aperture in the connection module can be seen in FIG. 14 as the space where the telescoping seat post 336 extends below the main seat tube 316 and between the ears of the connection module 308.

Figure 15A:
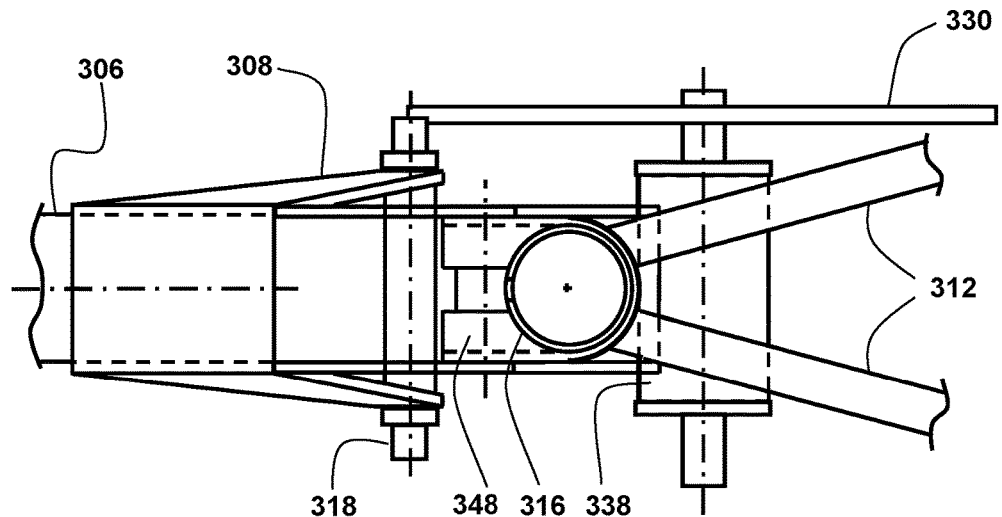
FIG. 15A shows view D-D of FIG. 13.
Figure 15B:
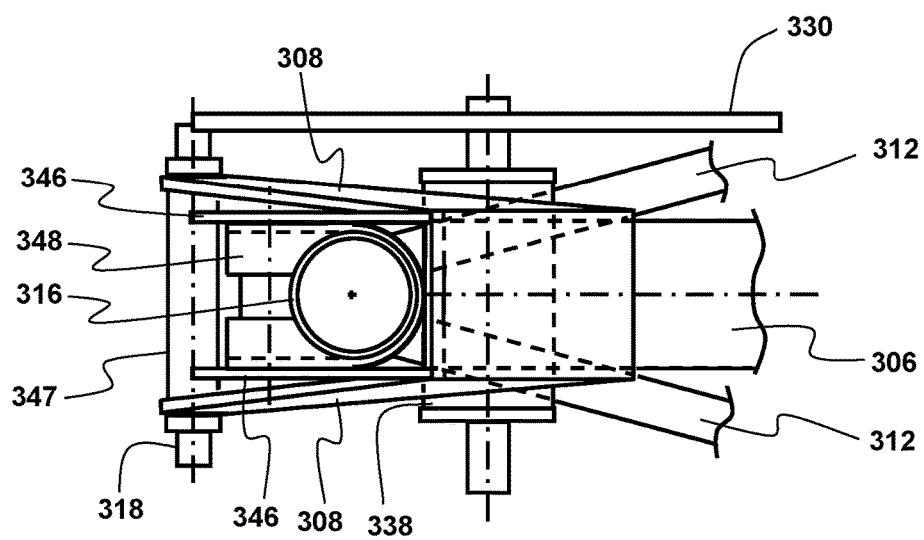
FIG. 15B shows view E-E of FIG. 14.

FIG. 15A provides a top view (view D-D of FIG. 13) of many of the components in "ride" mode that were shown in FIG. 13. FIG. 15B provides a bottom view (view E-E of FIG. 14) of the components in "packed mode" that were shown in FIG. 14. The components shown in FIG. 15A and FIG. 15B include the following rear frame components:
  (a) the bottom bracket housing (which can also be called a crankshaft housing or human power input device housing) 338;
  (b) the front chain ring 330;
  (c) the rear stays 312;
  (d) the main seat tube 316;
  (e) the main seat tube clamp 348; and
  (f) the lower pivot element 318;
and the following front frame components:
  (g) the hinge module 308; and
  (h) the front tube 306.

Note that in FIG. 15A and in FIG. 15B, the chain stays, that connect the bottom bracket housing to the seat stays (also called rear stays) are not shown. These would be difficult to show in these views. Also not shown, for the same reason, is the telescoping seat tube. FIG. 15B shows the pivot adapter brackets 346, but FIG. 15A does not, for the same reason. FIG. 15B also shows a pivot shaft housing 347 that connects the pivot adapter brackets 346 to each other and to a pivot shaft (or pivot point) 318 that goes through the pivot shaft housing 347.

Figure 16A:
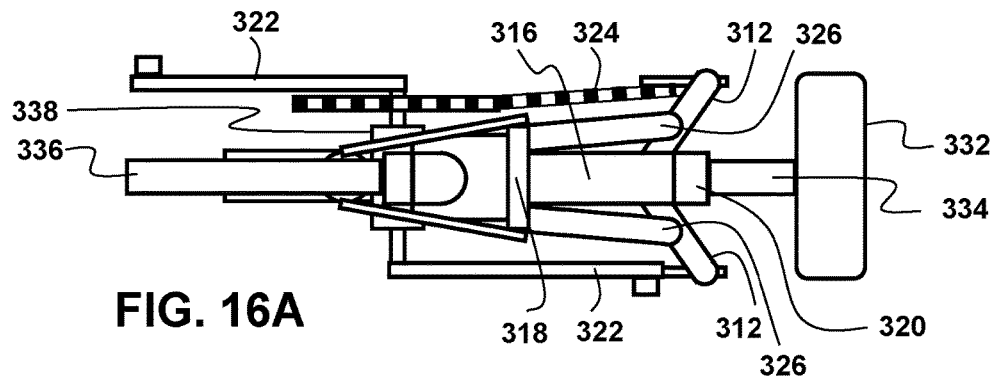
FIG. 16A shows a side view of the folded bicycle frame of FIG. 11C.
Figure 16B:
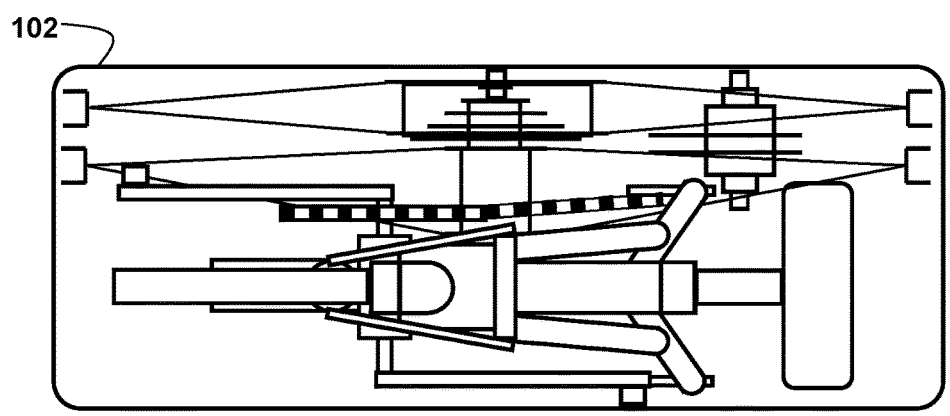
FIG. 16B shows the folded bicycle frame of FIG. 16A and the front and rear wheels of FIG. 10A packed into a 26×26×10 inch physical volume similar to the configuration that was shown in FIG. 1D.
Figure 16C:
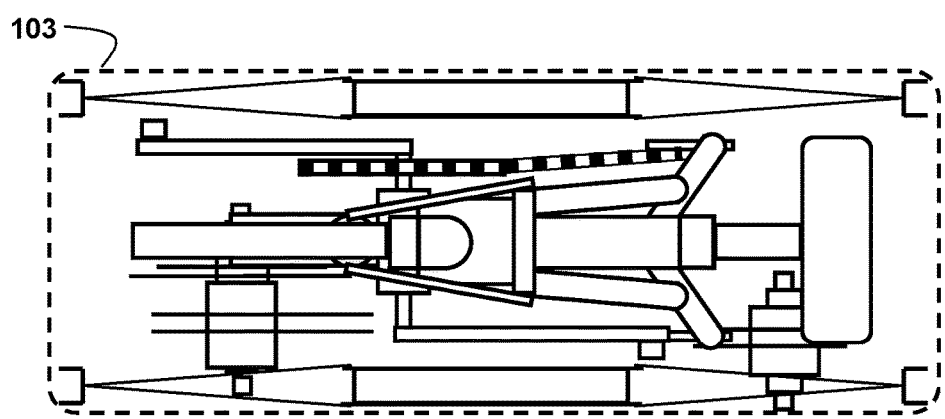
FIG. 16C shows the folded bicycle frame of FIG. 16A and the front and rear wheels of FIG. 1E packed into a 26×26×10 inch physical volume similar to the configuration that was shown in FIG. 1F.

FIG. 16A shows a side view (which could also be called an end view) of the folded bicycle frame of FIG. 11C. FIG. 16B adds the front and rear wheels of FIG. 10A, and packs the entire bicycle, including the wheels, into the 26×26×10 inch container 102 of the configuration that was shown in FIG. 1D. FIG. 16C packs everything into the flexible 26×26×10 inch bag 103 of the configuration that was shown in FIG. 1F. To help in understanding these illustrations:
  (a) the seat is shown at 332;
  (b) the rear stays are shown at 312;
  (c) the bicycle chain is shown at 324;
  (d) the chain stays are shown at 326;
  (e) the cranks are shown at 322;
  (f) the bottom bracket housing (crankshaft housing) is shown at 338;
  (g) the telescoping seat tube is shown at 336 as it extends below the bottom bracket housing;
  (h) the lower pivot element is shown at 318;
  (i) the user detachable upper attachment element is shown at 320; and
  (j) the main seat tube is shown at 316.

7. Alternate Foldable Compact Bicycle and Bicycle Frame

FIG. 17A shows an alternate embodiment of a foldable compact bicycle. This alternate system includes an alternate folding bicycle frame 400, a spoked first wheel 120 that is also a front wheel, a first tire on the first wheel 182, a second wheel 180 that is also a rear wheel, and a second tire 184 on the second wheel.

FIG. 17B shows the alternate embodiment folding bicycle frame of FIG. 17A without the wheels and tires. Some of the ways in which the alternate embodiment folding bicycle frame 400 differs from the embodiment shown at 300 in FIG. 10B include:
  (a) There is no telescoping seat tube (336 in FIG. 10B). Instead the main seat tube 316 is longer and it interfaces directly with the seat post 334. This is possible in the configuration shown in FIG. 17A and FIG. 17B because the seat tube 316 is longer than in the configuration shown in FIG. 10A and FIG. 10B.
  (b) Instead of a single pair of rear stays or seat stays (312 in FIG. 10B), the alternate embodiment has a pair of upper rear stays (which can also be called upper seat stays) 412 and a pair of lower rear stays (which can also be called lower seat stays) 413. Note that both the upper rear stays 412 and the lower rear stays 413 in the embodiment shown in FIG. 17B are elevated stays (i.e. the rear stays are designed to be above the chain or belt 324.

(c) The structure of the folding joint for the folding bicycle frame is different. More specifically, the alternate embodiment hinge module, 408 in FIG. 17B, is significantly different from the hinge module 308, shown in FIG. 10B, FIG. 13, FIG. 14, FIG. 15A, and FIG. 15B as will be explained later in this document. This alternate hinge module 408 can also comprise a different way of securing (or clamping) the front frame section and rear frame section when the alternate folding frame is in ride mode.

(d) The front handlebar module that was shown at 194 in FIG. 10B, is significantly different in the embodiments shown in FIG. 17A and FIG. 17B. One difference is the use of a tool-free handlebar height and rotation module 422. The tool-free handlebar height and rotation module shown in FIG. 17B has two functions: (a) it can allow a user to adjust the height of the handlebars; and (b) it can allow the user to rotate the handlebars by 90 degrees. In one embodiment, the tool-free height and rotation module 422 is a Speedlifter Twist product available from by.shulz GMBH of Saarbrucken, Germany. It is also possible to implement the two functions of the tool-free handlebar height and rotation module in two different sub-modules. For example, the Montague Octagon Steerer Tube Extender can be used to adjust the height of the handlebars in a tool-free way. The Dahon D4D Flatpak Stem can be used to rotate the handlebars 90 degrees relative to the forks in a tool-free way.

(e) The alternate embodiment front forks 414 shown in FIG. 17B have been configured to allow a steerer tube extender 424 to telescope inside the center of the steerer tube (416 in FIG. 19B and FIG. 19D) that is part of the front fork 414. Thus, the steerer tube extender 424 can be at least partially below the bottom of the steerer tube when the handlebars are moved to their lowest point, as shown at 424 in FIG. 17B. The steerer tube extender 424 can be at least partially visible between the tool free handlebar adjustment element 422 and the stem 426 when the handlebars are raised, as shown in FIG. 17A.

(f) The alternate system comprises foldable handlebars 428 in FIG. 17A and FIG. 17B.

Referring in greater detail to the foldable handlebars 428, these are shown unfolded in a side view in FIG. 17A. The foldable handlebars 428 are shown folded in a side view in FIG. 17B. The foldable handlebars 428 are further illustrated in FIG. 17C, FIG. 17D, FIG. 17E, and FIG. 17F, which are based on view F-F of FIG. 17B (a top view of the handlebars, stem, and fork). In FIG. 17C, the foldable handlebars 428 are unfolded and in a "normal ride" mode. The rest of the bike is also in a "normal ride" mode. In FIG. 17F, the foldable handlebars 428 are folded and the rest of the bike is also in a "packed mode". The steps to get from a "ride mode" to a "packed mode" can generally be implemented in any order and comprise the following:

(a) Removing the front wheel and the rear wheel as shown by comparing FIG. 17A, which has the wheels on the rideable bicycle, with FIG. 17B, which shows a frame 400 without the wheels.

(b) Moving the handlebars 428 and stem 426 down by telescoping the steerer tube extender 424 inside the steerer tube (416 in FIG. 19B and FIG. 19D) that is part of the front fork 414 in FIG. 17B. This can be seen by comparing FIG. 17A with FIG. 17B.

(c) Folding the handlebars 428 together, which can be seen by comparing FIG. 17C with FIG. 17D.

(d) Rotating the stem 426 and handlebars 428 relative to the front fork 414, which can be seen by comparing FIG. 17D with FIG. 17E. In the embodiment shown, this is a rotation of approximately 90 degrees about the central axis of the steerer tube.

(e) Rotating the fork 414, stem 426, and handlebars 428 together, which can be seen by comparing FIG. 17E with FIG. 17F. In the embodiment shown, this is a rotation of approximately 90 degrees about the central axis of the steerer tube. This rotation is done in the same direction as the rotation of the stem and handlebars relative to the front fork, making for a total rotation of the stem and handlebars of approximately 180 degrees, which orients the ends of the foldable handlebars 428 to point towards the rear of the bike.

The foldable handlebars 428 used in the embodiment shown in FIG. 17A to FIG. 17E can be any handlebars similar to the ones shown in this document. There is utility in having foldable handlebars 428 that fold away from the stem 426 as this will allow both the stem 426 and the handlebars 428 to be pointed in the same direction away from the axis of the steerer tube. This minimizes the packed size of the frame 400 when the foldable handlebars 428 and stem 426 are rotated a total of 180 degrees to face the rear of the bike. One example of folding handlebars 428 that can used in embodiments of the present invention are the handlebars made by Smaller International of Taiwan. A another example is the folding aero bar system made by Morf Technologies. The aero bar system further comprises bar ends that stay parallel with each other when the handlebars are folded, which provides for additional hand positions for riding. The Morf Technologies folding handlebars can convert from a first ride mode in which the bars are perpendicular to the direction of travel to a second ride mode or "aero bar" mode in which the bars and bar ends are aligned with the direction of travel. The conversion from "perpendicular" mode to "aero bar" mode can be done while the bike is being ridden, which can be an additional functional benefit.

Figure 18A:
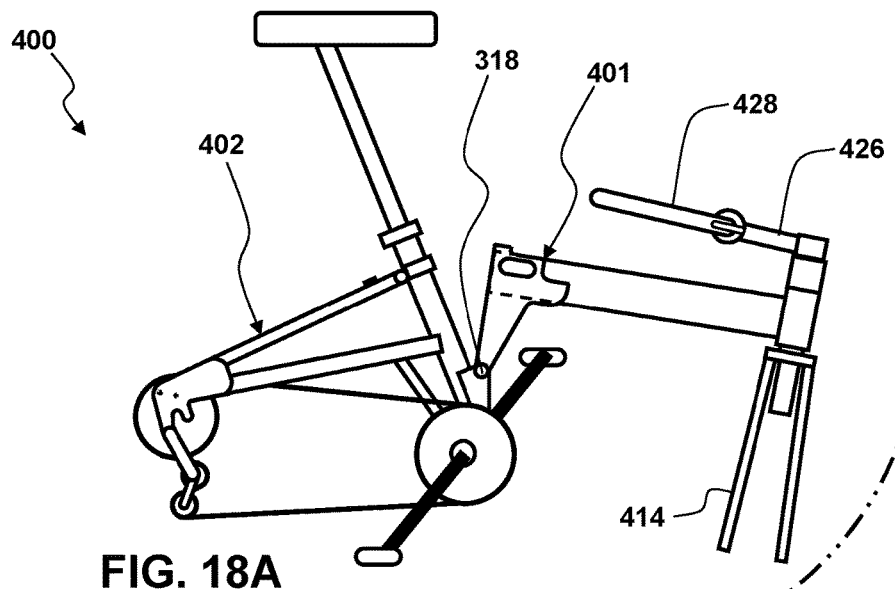
FIG. 18A shows the configuration of FIG. 17B with the front fork, stem, and handlebars in the position shown in FIG. 17F and with the front frame section rotated about 30 degrees relative to the rear frame section at a frame hinge (or pivot) point.
Figure 18B:
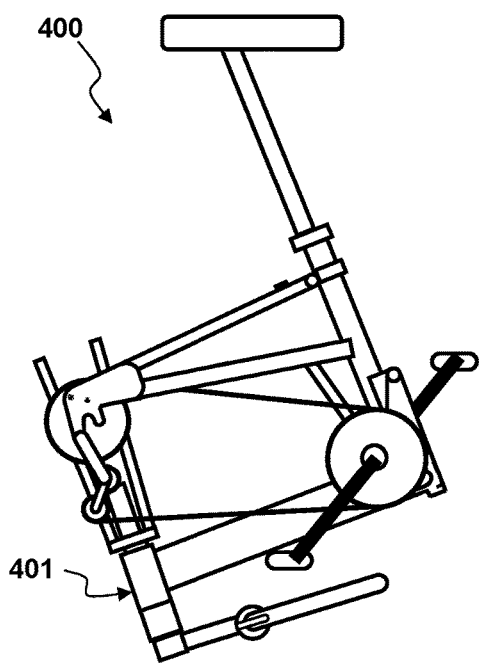
FIG. 18B shows the configuration of FIG. 18A with the front frame section now rotated 180 degrees from the original position that was shown in FIG. 17B.
Figure 18C:
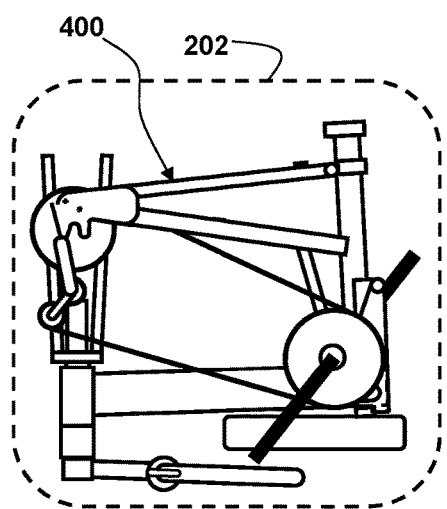
FIG. 18C shows the configuration of FIG. 18B with the seat and seat post inserted into the opposite (bottom) end of the seat tube, the pedals removed, and the resulting assembly placed into a 26×26 inch volume.

FIG. 18A, FIG. 18B, and FIG. 18C illustrate how the alternate folding bicycle frame can further be folded to fit in as small as possible of a packed volume. FIG. 18A shows the configuration of FIG. 17B with the front fork 414, stem, and handlebars in the position shown in FIG. 17F and with the front frame section 401 rotated about 30 degrees relative to the rear frame section 402 at the frame hinge point 318 (or folding frame pivot axis). FIG. 18B shows the configuration of FIG. 18A with the front frame section now rotated 180 degrees from the original position that was shown in FIG. 17B. FIG. 18C shows the configuration of FIG. 18B with the seat and seat post inserted into the opposite (bottom) end of the seat tube, the pedals removed, and the resulting assembly placed into a 26×26 inch volume 202.

8. Fork with Clearance for Steerer Tube Extender

FIG. 19A shows a generic front fork 414 for a bicycle and identifies the main elements of a typical bicycle front fork: a steerer tube 416; a fork crown 418; and fork blades 420. The fork crown 418 typically has a fork crown through hole 430 that can be used for attaching rim brakes and fenders to the front fork 414.

FIG. 19B shows section G-G of FIG. 19A for a prior art fork crown 418. In the prior art, the fork crown through hole 430 was designed for a through bolt 432 to be used for attachment of frame parts (brakes, fenders, etc.) to the front fork. However, the fact that the through bolt 432 extends across the center of the steerer tube would prevent the use of a telescoping steerer tube extender (424 in FIG. 17B) that extend through the center of the steerer tube from the top of the steerer tube to a region below the through hole 430.

FIG. 19C shows section G-G of FIG. 19A with an embodiment that addresses the interference issue between the steerer tube extender (424 in FIG. 17B) and the through bolt 432. In the embodiment shown in FIG. 19C, the front fork further comprises a mounting bracket 434 that is attached to the front or rear of the fork crown 418. There is an alternate bolt 433 attached to the mounting bracket 434 and that can be used for the same purposes as the through bolt 432 prior art embodiment shown in FIG. 19B. The alternate bolt 433 can be accessed for insertion and tightening through the fork crown hole 430, which could now be larger in diameter than in the prior art to allow the bolt head to fit through.

FIG. 19D shows a perspective view of the crown region of an alternate front fork that uses two parallel plates to create the crown. Like the other embodiments shown, this alternate front fork also has a steerer tube 416 and fork blades 420. The fork crown comprises two plates: an upper fork crown plate 470 and a lower fork crown plate 472. There is a mounting plate 435 attached to the upper plate 470 and lower plate 472 and the alternate bolt 433 goes through only this mounting plate. FIG. 19E shows section H-H of FIG. 19D, to illustrate the location of the fork crown through hole 430, the alternate bolt 433, the lower fork crown plate 472, and the mounting plate 435. Also shown is a cross section of the steerer tube 416 and the fork blades 420.

9. Folding Joint with Improved Rigidity

Structural rigidity (also known as stiffness) and strength are technical challenges in designing and fabricating lightweight bicycle frames. The challenges are even greater for folding frames than for non-folding frames. The region of the bicycle frame proximate to the pedals and cranks is one of the most critical for bicycle frame stiffness as there are many loads that come together in this region to cause the frame to flex and twist in a complex 3-dimensional fashion. This challenge is compounded in folding frames of the type described in this document because the folding connection between the front frame section and the rear frame section occurs in the highly loaded region proximate to the pedals and cranks. Two of the most functionally critical and noticeable deflections on a bicycle frame can be:

(a) Twisting (torsion) of the bike frame. This will be discussed in greater detail in the paragraphs that follow.
(b) For bikes that use a toothed drive belt, deflection of the rear dropouts as a result of tension in the upper section of the toothed belt between the front sprocket (connected to the crank) and the rear sprocket (connected to the rear wheel) which can cause the toothed belt to skip. The configuration of the rear stays, chain stay, and other components of the rear dropouts that are shown and described in conjunction with the elevated chain stay configurations of FIG. 10A, FIG. 17A, and other sections of this document are critical to ensuring that there is sufficient rigidity to withstand these belt forces. A belt tensioner or other means for ensuring that there is no slack in the bottom section of the toothed belt is also important for ensuring that a belt drive system of this type performs as needed.

FIG. 20A, FIG. 20B, FIG. 20C, and FIG. 20D, provide a description of some of the forces on a bicycle frame that cause torsion and some of the structural elements, features, and configurations used in embodiments of the present invention to provide a torsionally stiff and lightweight folding bicycle frame. FIG. 20A shows a side view of the bicycle of FIG. 17A with some of the main vertical forces that could be applied by a rider. FIG. 20A has been turned around from what was shown in FIG. 17A so it is oriented to match the orientation of the details shown in FIG. 21A through 23C, FIG. 25A, and FIG. 26B. FIG. 20B is a front view of the bicycle of FIG. 20A showing the same vertical forces. From physics, we know that forces that are aligned in one axis cancel each other out (principle of transmissibility) and forces that are opposite to one another but offset by a perpendicular distance create a moment equal the applied forces multiplied by the perpendicular distance between them. A moment that occurs in a first plane that is resisted by an equal and opposite moment in second plane parallel to the first plane creates torsion, a twisting force, in the structural elements between the first plane and the second plane.

In FIG. 20A, $F_W$ represents the weight of the bike rider when seated. This is resisted by $F_{FW}$, the reaction force upwards on the front wheel, and $F_{RW}$, the reaction force upwards on the rear wheel. As shown in FIG. 20B, these three forces are in the same plane (the vertical plane of the bicycle wheels when going straight), and therefore create no torsion. If the rider is pedaling, there will be a force $F_P$ applied to the pedals and this force $F_P$ is not aligned with the central plane of the bicycle. In the worst case, the rider is standing and the entire weight of the bike rider is applied as $F_P$ on the right pedal of the bicycle (and $F_W$ will be zero). FIG. 20B, shows that $F_P$ is not aligned in the same plane as $F_{FW}$ and $F_{RW}$ and this creates a moment, which will be shown at $M_{PW}$ (moment between pedal and wheels) in FIG. 20C and FIG. 20D. In order to balance this moment, the rider who is standing on the pedals pushes up on one side of the handlebars and down on the other side of the handlebars as shown at $F_{HU}$ and $F_{HD}$ (handlebar up and handlebar down), which creates the moment shown as $M_{Handlebars}$ in FIG. 20C and FIG. 20D. Because $M_{PW}$ is not in the same plane as $M_{Handlebars}$, the front tube, 306 in FIG. 20A, and connection module, 408 in FIG. 20A, (also called the alternate hinge module) between the front frame section and rear frame section are subjected to a twisting (torsion) force which can noticeably distort the shape of the bicycle frame and create other issues (breakage, squeaking, etc.).

Referring in more detail to FIG. 20C, which is section i-i of FIG. 20A looking forwards, the clockwise twisting force from the pedals to the wheels $M_{PW}$ is resisted by a counterclockwise twisting force on the handlebars $M_{Handlebars}$, and this twisting force (torsion) is transmitted through the front tube 306, causing the front tube to twist about its central axis, the point shown at the intersection of line segment x-x and line segment y-y. For a hollow cylindrical tube such as the front tube, the torsional stiffness (rate of twist) per unit of length of the tube can be calculated using the following equations:

$K/L=(E)(J)$ $J=\pi(D^4-d^4)/32$ $t=(D-d)/2$

Where:

K/L=rate of twist of the tube (K) per unit of length (L)
E=modulus of elasticity of the tube material
J=polar moment of inertia for the cross section
D=outside diameter of the cylindrical tube
d=inside diameter of the cylindrical tube
t=wall thickness for the cylindrical tube Based on the above equations, there are four primary ways to increase torsional stiffness of the front tube 306, and therefore make the bike frame stiffer and more resistant to twisting forces:

(a) Shorten the front tube;
(b) Increase the outside diameter;
(c) Increase the wall thickness (or decrease "d" while keeping "D" the same); and/or
(d) Use a stiffer tube material. Steel is 2× stiffer than titanium, but also 2× heavier. Steel is 3× stiffer than aluminum, but also 3× heavier.

Given that the front tube cannot be shortened and the material has been chosen for other reasons, the main parameters that can be changed are tube diameter (D) and wall thickness (t). However, increasing wall thickness increases the weight of the tube. For these reasons, the front tube should be as large in diameter as is feasible within other constraints. More specifically, from this discussion and equations presented, it should be clear that doubling the height of something in the direction that opposes a torsional load results in a 16× improvement in stiffness. However, it also results in a 4× increase in weight and mass. Doubling the outside diameter and halving the wall thickness, gives a 4× improvement in stiffness with no increase in weight. The same principles can be applied to cross sections that are not circular, don't have the same wall thickness all the way around and have walls that may not be solid at all points along the length of the structure that must transmit torsion. These principles can be summarized as follows:

(a) Increasing the outside dimensions (the equivalent of "D" in the equations above) has an enormous beneficial effect on torsional stiffness. This should be the first priority in optimizing the structure.
(b) Increasing the wall thickness of any part of the structure increases torsional stiffness.
(c) Holes in the walls of any part of the structure (i.e. regions with zero thickness) results in a significant reduction in stiffness for the structure.

Figure 24A:
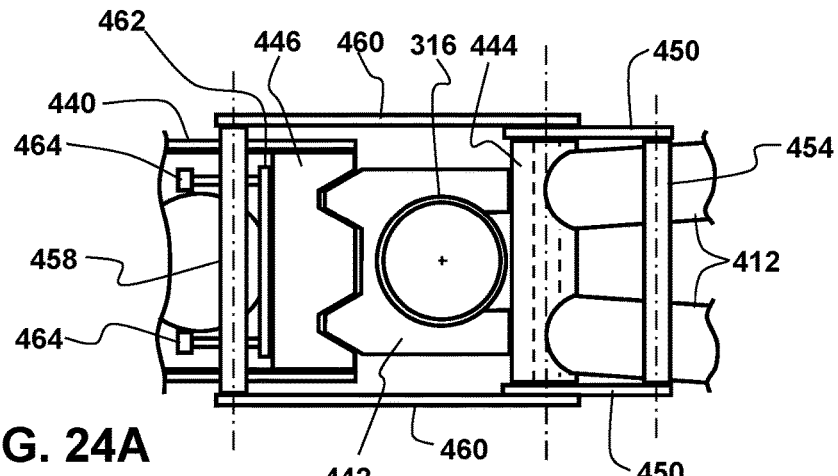
FIG. 24A shows view L-L of FIG. 23B.
Figure 26A:
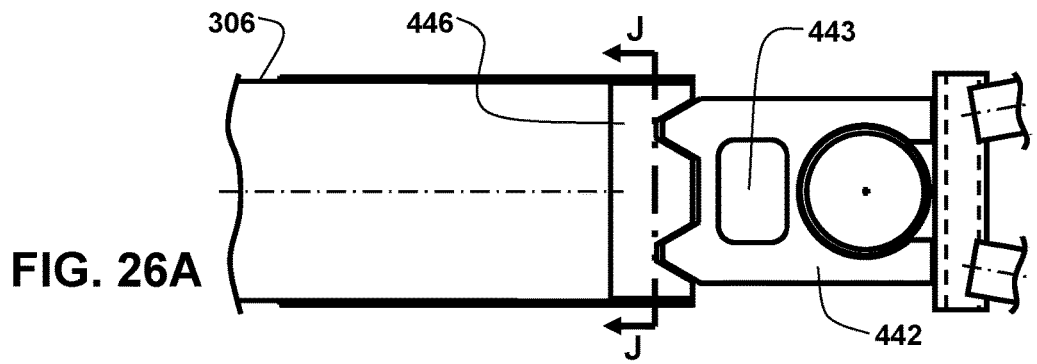
FIG. 26A shows a top view of an alternate embodiment of the clamp section of the hinge shown in FIG. 21A.

Based on these principles for optimizing torsional stiffness, the best ways to increase the torsional stiffness of a bicycle frame is to increase the enclosed cross-sectional area and height and width of various elements of the system, especially those that are most flexible, regardless of whether those cross-sections are round or any other shape. FIG. 20D illustrates some of the things that have been incorporated to make the bicycle frame as stiff and lightweight as possible. FIG. 20D is an angled forward-looking section view of the connection module 408 at the interface between the front section and rear section of hinge module. Since the view in FIG. 20D is angled differently than section i-i of FIG. 20C, only the end section of the front tube 306 is visible. Specifically, FIG. 20D shows section J-J in FIG. 21A. This is also illustrated from the top as section J-J in FIG. 24B and FIG. 26A. Referring to FIG. 20D, the same clockwise torsional load created by $M_{PW}$ (twist of the pedals relative to the wheels) which must be resisted by a counterclockwise twisting force on the handlebars $M_{Handlebars}$, must be transmitted through the connection module 408. More specifically, torsional (twisting) forces are transmitted in the connection module 408 between the front frame section (401 in FIG. 18A and FIG. 20A) and the rear frame section (402 in FIG. 18A and FIG. 20A) through two interfaces:

(a) The interface between the front frame clamp block (front jaw), shown at 446 in FIG. 20D, FIG. 22A, and FIG. 24A, and the rear frame clamp block (rear jaw), shown at 442 in FIG. 22A and FIG. 24A; and
(b) The folding frame pivot axis or hinge shown at 318 in FIG. 22 and also shown in FIG. 18A and FIG. 21A through FIG. 22B.

The items that have been incorporated to make the interface between the front frame clamp block (front jaw) 446 and rear frame clamp block (rear jaw) 442 stiff, and therefore resistant to torsional forces, can include:

(a) Making the front frame clamp block 446 as thick (vertical dimension in FIG. 20D) as possible. In FIG. 20D, it can be seen that the front frame clamp block 446 is more than 2× thicker than the wall thickness of the front tube 306. The front frame clamp block 446 could be made more than 3×, more than 4×, or more than 5× thicker than the wall thickness of the front tube.
(b) Making the front frame clamp block 446 at least as wide (horizontal dimension in FIG. 20D) as the outer diameter of the front tube 306. It can also be observed from FIG. 20D that the front frame clamp block 446 is rectangular and has a width is at least 2×, at least 3×, and/or at least 4× its thickness. Similarly, from the drawings that show the front clamp block 446 and the rear clamp block 442, it is possible to see that the rear clamp block is also rectangular and also has a similar ratio between its width (horizontal dimension when looked at in a ridable orientation) and thickness (vertical dimension when looked in a ridable orientation). This ratio of width to thickness best matches the function of the clamp blocks (clamp jaws) to act as part of the structure that resists torsional (twisting) loads on the bicycle frame.
(c) Providing one or more vertically-oriented v-shaped features in the interface between the front jaw 446 and rear jaw 442, as can most clearly be seen at 448 in FIG. 22A. These v-shaped features have the shape of the letter "V" with flat bottoms. The pair of angled side surfaces of the v-shaped features resist lateral movement (i.e. horizontal movement perpendicular to the direction of engagement between the front jaw and rear jaw) when the front and rear jaws are pressed together. This lateral movement that is prevented can also be described as being movement parallel to the axis of rotation of the front frame section relative to the rear frame section (which is also parallel to the axis of rotation of the crankshaft and the axis of rotation of the rear wheel). The v-shaped features can also be seen from various perspectives as part of the front jaw 446 and rear jaw 442 in FIG. 22B, FIG. 24A, FIG. 24B, and FIG. 26A. When looking at these drawings, it is also noteworthy that the front jaw 446 and rear jaw 442 comprise rectangular blocks having a width at least 2×, 3×, 4×, or 5× their thickness.

The items that have been incorporated to make the folding frame pivot axis (or hinge, or pivot shaft) 318 region stiff, and therefore resistant to torsional forces, can include:

(a) Making the pivot shaft housing 347, shown in FIG. 15B and FIG. 20D, and associated pivot shaft bracket(s), shown at 346 in FIG. 13 and FIG. 15B, as large and therefore stiff as possible. In the embodiment shown, the pivot shaft housing 347 has a wall thickness at least the same as the wall thickness of the front tube 306. The wall thickness of the pivot shaft housing 347 could also be more than 2x, 3x, or 4x the wall thickness of the front tube 306 if additional stiffness is desired.
(b) Using a pivot shaft 318 that has as large as possible of a diameter. In the embodiment shown, the pivot shaft 318 has a diameter at least that of the wall thickness of the front tube 306. The diameter of the pivot shaft 318 could also be more than 2x, 3x, or 4x the wall thickness of the front tube 306 if additional stiffness is desired.
(c) Providing a tight fit between the pivot shaft 318 and the pivot shaft housing 347.
(d) Providing a tight fit between the pivot shaft 318 and the front tube brackets 440.
(e) Making the distance from the central axis of the pivot shaft 318 to the central axis of the front tube 306, as shown at the intersection of the x-x and y-y lines as great as possible to provide the maximum leverage.

Figures 21A, 21B:
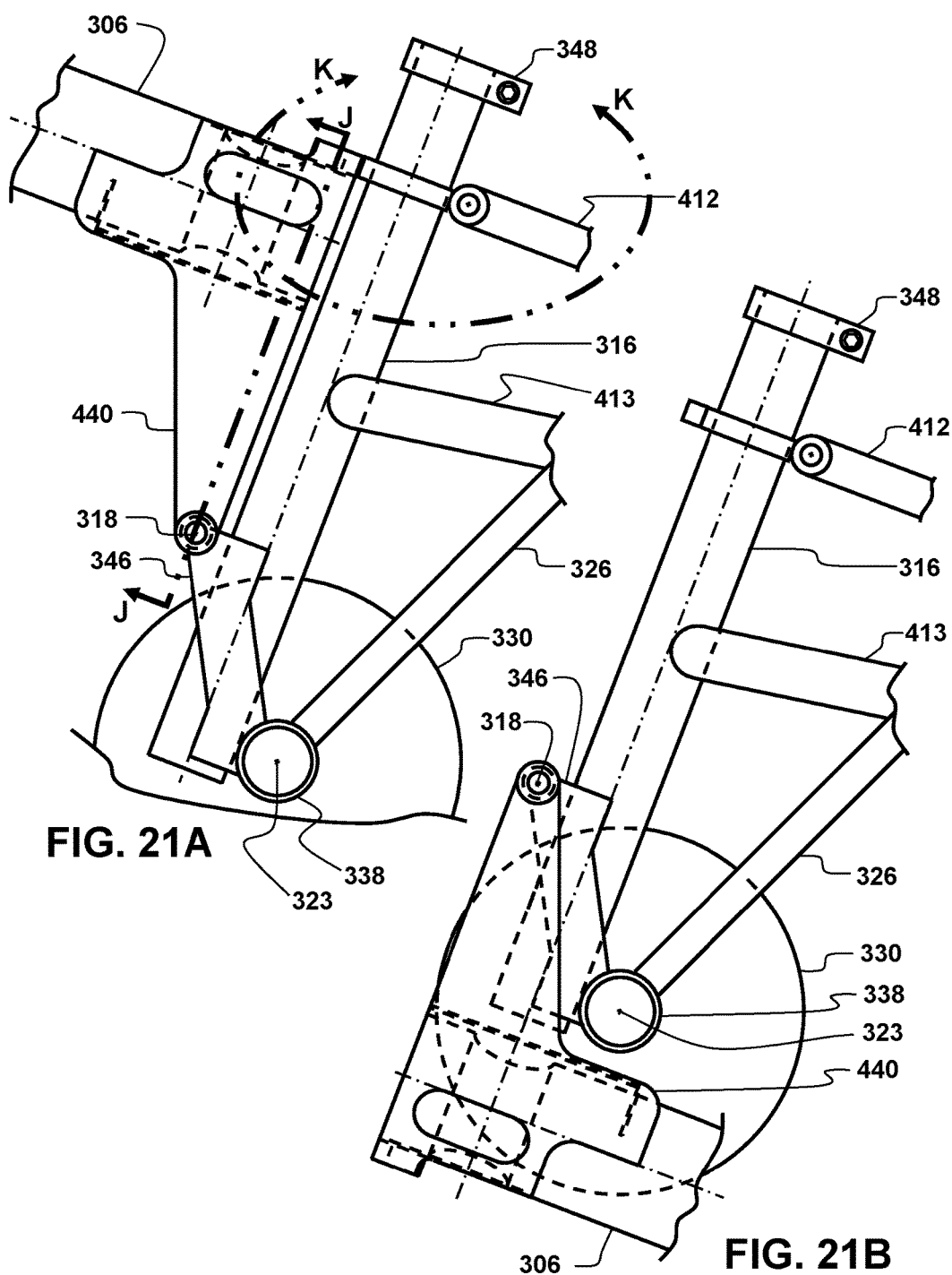
FIG. 21A shows a side view of a part of the alternate frame of FIG. 17B when the alternate hinge is in a ride configuration.
FIG. 21B shows a side view of the part of the alternate frame of FIG. 21A in a folded configuration.

The items that have been incorporated to make the connection between the pivot axis (or hinge, or pivot shaft) 318 region and front tube 306 stiff, and therefore resistant to torsional forces, can include:
(a) Making the thickness (horizontal dimension) of the front frame brackets 440 as great as possible. In the embodiment shown in FIG. 20D the front frame brackets are at least 1.5 thicker than the thickness of the front tube 306 walls . For greater stiffness, the front frame brackets could be more than 2x, 3x, 4x, or 5x the thickness of the front tube 306 walls.
(b) Making the width of the front frame brackets 440 (approximately horizontal dimension of the front frame brackets 440 as shown in FIG. 21A) as great as possible. As shown in FIG. 21A, the front frame brackets 440 are tapered to be narrower that their bottoms and wider in the region where they connect to the front tube 306. As can be seen in FIG. 21A, the front frame brackets 440 are wider than the diameter of the front tube 306 in the region where the front frame brackets 440 attach to the front tube. If even greater stiffness is desired, the front frame brackets could be more than 2x, more than 3x, or more than 4x wider than the front tube 306 diameter in this region.

The items that have been incorporated to make the connection between the front frame clamp block (front jaw) 446 and front tube 306 stiff, and therefore resistant to torsional forces, can include:
(a) Having the vertical engagement surface between the front jaw 446 and front frame brackets 440 be as large as possible.
(b) Providing a direct attachment point between the front jaw 446 and the front tube 306 as shown at the point of the top tube 306 that touches the front jaw in FIG. 20D.

Applying these principles for optimizing stiffness and the features described above, the hinge and clamp designs in the illustrated in FIG. 21A through FIG. 26B are specifically designed to maximize stiffness for a given amount of a material. The configuration illustrated in these drawings also simplifies manufacturability and the ease (and therefore speed) for a user to fold and unfold a bicycle frame of the type described in this document.

FIG. 21A shows a side view of a part of the alternate frame of FIG. 17B when the alternate hinge module is in a ride configuration. FIG. 21B shows the same components as FIG. 21A when the alternate hinge is in a folded configuration. The following rear frame components are shown in the same locations in FIG. 21A and FIG. 21B:
(a) the bottom bracket housing (human power input device housing) 338;
(b) the front chain ring 330;
(c) the chain stays 326;
(d) the upper rear stays 412;
(e) the lower rear stays 413;
(f) the main seat tube 316;
(g) the lower pivot adapter brackets 346 that rigidly, fixedly, and permanently connect the lower pivot element 318 to the main seat tube 316 and human power input device housing (bottom bracket housing) 338; and
(h) the main seat tube clamp 348 that clamps the seat post, 334 in FIG. 17B, into the seat tube 316.

In FIG. 21A the front frame section is in "ride" mode. This means that the rear frame components (i.e. rear frame section) described previously are clamped to the front frame components (front frame section) in region K-K of FIG. 21A. The front frame components visible in FIG. 21A and FIG. 21B comprise a front frame tube 306 and a front frame tube bracket 440. In FIG. 21B, the folding frame is in "packed mode" with the front frame section rotated (counterclockwise in this view) by approximately 180 degrees around the folding frame pivot axis 318 from the "ride mode" configuration that was shown in FIG. 21A. One similarity of the embodiment shown in FIG. 21A and FIG. 21B with the embodiment shown in FIG. 13 and FIG. 14, is that in both embodiments the folding frame pivot axis 318 is located above and forward of the bottom bracket shell 338, and more generally speaking the folding frame pivot axis 318 is located above and forward of the point of rotation of the cranks (crank rotation point shown at 323 in FIG. 21A and FIG. 21B) when the rear of the bicycle if viewed in its normal upright orientation.

FIG. 22A shows a perspective view of elements of the hinge module shown in FIG. 21A. Like in FIG. 21A, the hinge module (or connection module) is in a ride configuration. For clarity, the chain stays, lower seat stays, upper seat stays, and front chain ring, and main seat tube clamp that were shown in FIG. 21A are not shown with the hinge/connection module in FIG. 22A. FIG. 22B shows the hinge module of FIG. 22A when the front section has been rotated approximately 30 degrees clockwise. Referring to FIG. 22A and FIG. 22B, the folding frame pivot axis (or hinge section of the connection module) is shown at 318. The folding frame pivot axis 318 connects the front frame section to the rear frame section and allows the front frame section to rotate about a horizontal axis approximately 180 degrees to convert the bicycle frame from a rideable configuration to a folded configuration. A section of the front tube is shown at 306. Two sides of the front frame tube bracket are shown at 440. The front frame tube bracket 440 rigidly, fixedly, and permanently connects the folding frame pivot axis 318 (also known as a front frame pivot element, pivot, or hinge), the front frame tube 306, and the front frame clamp block 446 (also referred to as a front clamp element, a front frame jaw, a front clamp jaw, or a front jaw). The key elements of the rear frame, which are rigidly, fixedly, and permanently connected to the folding frame pivot axis 318 and to each other include the bottom bracket housing 338 (configured to hold the axis of rotation of the cranks), the seat tube 316, the rear frame clamp block 442 (also referred to as a rear clamp element, a rear frame jaw, a rear clamp jaw, or a rear jaw), and the rear frame pivot housing 444. In the embodiment shown in FIG. 22A and FIG. 22B the crankshaft housing 338 comprises a cylindrical bottom bracket housing configured for holding a crankshaft and bearings. In this configuration, the bearings rotationally couple the crankshaft (which can also be called an axle or spindle) to the cylindrical bottom bracket housing.

10. Clamping the Front Frame Section and Rear Frame Section Together

Figure 23A:
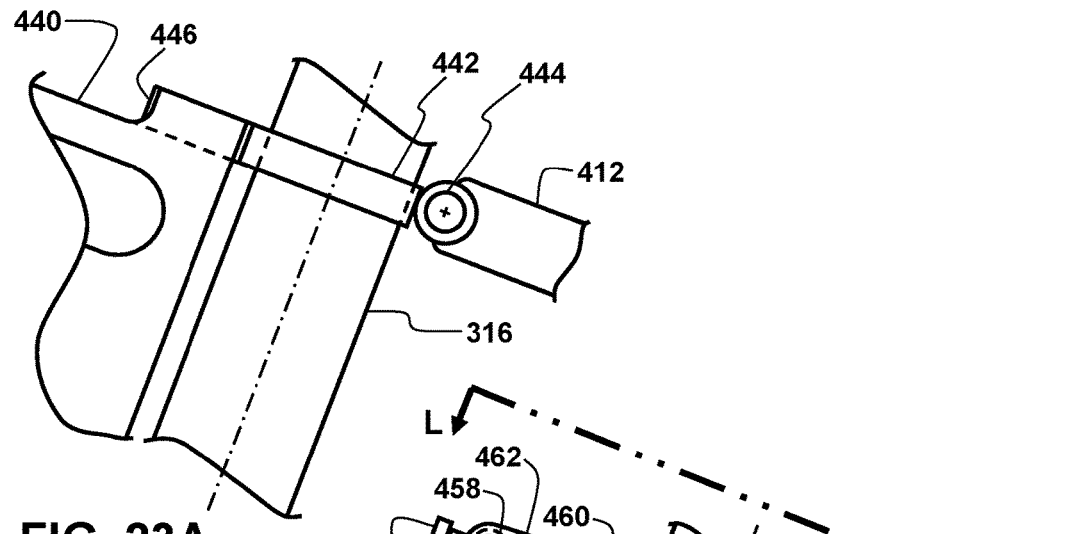
FIG. 23A shows the top of the hinge in region K-K of FIG. 21A.
Figure 23B:
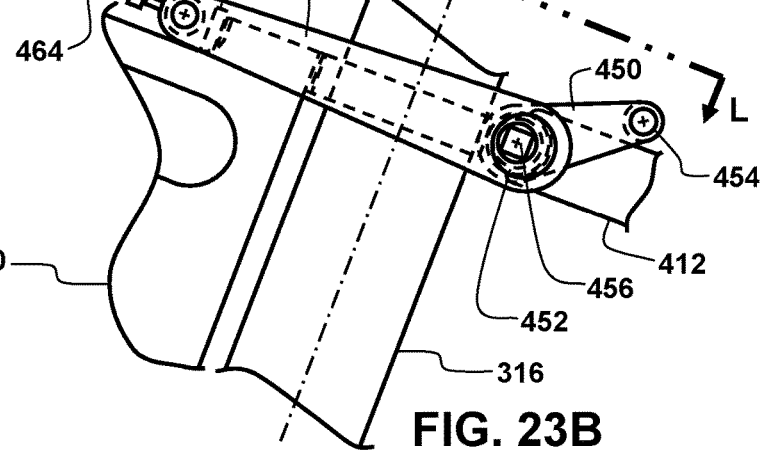
FIG. 23B shows the top of the hinge of FIG. 23A with an eccentric clamp mechanism in a clamped position.
Figure 23C:
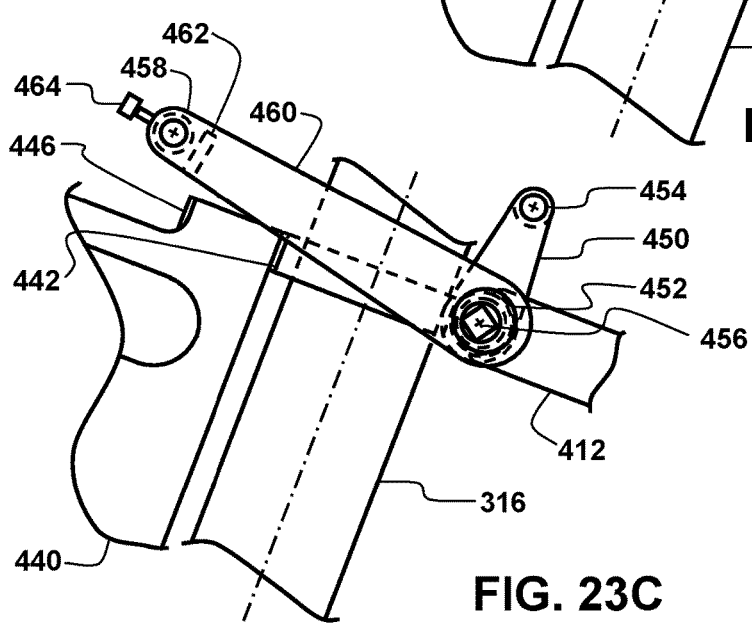
FIG. 23C shows the items shown in FIG. 23B in an unclamped position.

FIG. 23A, FIG. 23B, and FIG. 23C show the top of the hinge in region K-K of FIG. 21A. This region is used for securing the front frame section to the rear frame section by means of a user detachable rigid (immovable) attachment connection that is secured when the bicycle is in a "ride" mode. The rear frame section components identified in FIG. 21A that are also shown in FIG. 23A, FIG. 23B, and FIG. 23C are the seat tube 316, and the upper rear stays 412. The front frame section component identified in FIG. 21A that is also shown in FIG. 23A. FIG. 23B, and FIG. 23C is the front frame tube bracket 440. FIG. 23A shows that the rear frame section further comprises a rear frame clamp block 442 that is rigidly attached to the seat tube 316, and a rear frame clamp pivot housing 444 that is rigidly attached to the rear frame clamp block 442 and the upper rear stays 412. FIG. 23A and FIG. 23C also show that the front frame assembly further comprises a front frame clamp block 446 that is rigidly attached to the front frame tube bracket 440. The front frame clamp block 446 is pressed against the rear frame clamp block 442 when the front frame section and the rear frame section are clamped together in "ride mode."

It should be noted that in normal riding use, the weight of the rider (Fw in FIG. 20A) will cause the rear frame clamp block 442 to press against the front frame clamp block 446 and if these two components are properly designed, no clamp is necessary to provide resistance against bending and torsion between the front frame section and the rear frame section. However, the front frame section would rotate relative to the rear frame section if the center of the bicycle were lifted and there was nothing holding the two frame clamp blocks, 442 and 446, together. Thus, at least some minimal clamping force between the rear frame clamp block 442 and the front frame block 446 is needed for cyclists to have a normal experience the folding system described herein. Such clamping force could be provided by devices as simple as a strap that connects the front frame section to the rear frame section in the region proximate to the rear frame clamp block 442 and the front frame clamp block 446.

FIG. 23B shows the top of the hinge of FIG. 23A with a manually operable clamp mechanism in a position that secures the front frame section to the rear frame section by providing a force that pushes the front frame clamp block (446 in FIG. 23A) against the rear frame block (442 in FIG. 23A). This manually operable clamp mechanism is one example of a type of fastener that could be used detachably attach the front frame section to the rear frame section at the front clamp jaw and rear clamp jaw. FIG. 23C shows the eccentric clamp elements described with reference to FIG. 23B when the eccentric clamp mechanism of FIG. 23A is in an unclamped position. The eccentric clamp mechanism of FIG. 23B and FIG. 23C comprises a pair of wrench arms 450, a pair of clamp arms 460, and an eccentric disk 452 that causes the clamp arms 460 to move rearward when the wrench arms 450 are in the position shown in FIG. 23B and forwards when the wrench arms 450 are in the position shown in FIG. 23C. The wrench arms 450 move about an axis of rotation co-located with the horizontal central axis of the rear frame pivot housing, 444 in FIG. 23A. The clamp arms 460 move about an axis of rotation that is parallel and eccentric to the horizontal central axis of the rear frame pivot housing, 444 in FIG. 23A. A wrench connection bar 454, clamp arm connection bar 458, and clamp load distribution element 462 are shown by hidden lines in FIG. 23B and FIG. 23C. A clamp tightening bolt 464 is partially visible in FIG. 23B and FIG. 23C. There is also a clamp shaft 456 that rotates in the rear frame clamp pivot housing and has a square end as shown in FIG. 23B and FIG. 23C. To further clarify, FIG. 25B shows an isometric view of this clamp shaft 456.

Figure 24B:
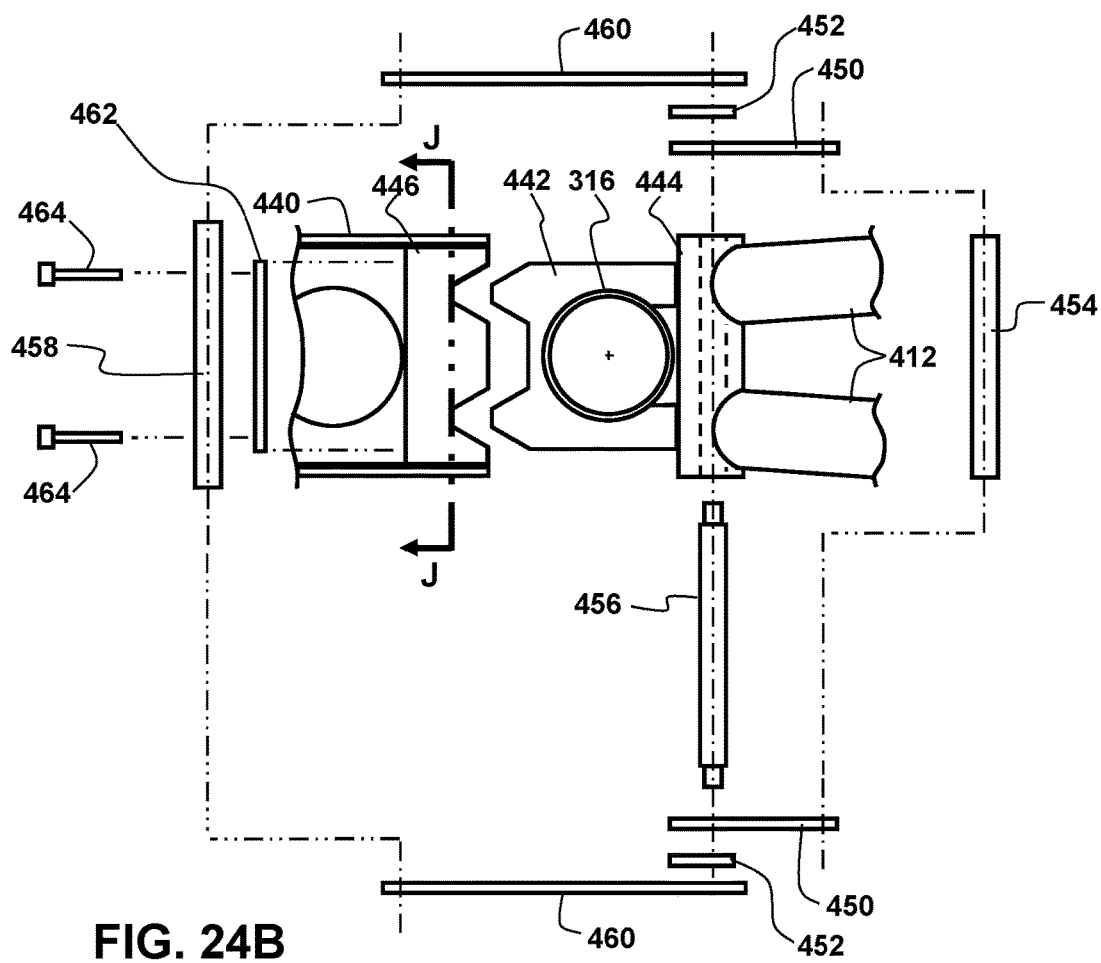
FIG. 24B is an exploded top view of the components shown in FIG. 24A.

FIG. 24A shows view L-L of FIG. 23B, which is a top view of the key components of the top of the hinge and the clamp in its clamped position. FIG. 24B is an exploded top view of the components shown in FIG. 24A. Referring to FIG. 24A and FIG. 24B, the front frame tube bracket is shown at 440 and the front frame clamp block is shown at 446. In the embodiment shown, these two components are rigidly, fixedly, and permanently connected to each other and to the front tube (306 in FIG. 21A and FIG. 21B). These components are part of the front frame section that rotates about the folding frame pivot axis (318 in FIG. 21A and FIG. 21B) when the front frame section and rear frame section are rotated relative to each other. Also shown are the rear frame clamp block 442, the main seat tube 316 (also called a rear frame seat tube), the rear frame clamp pivot housing 444, and the upper rear stays 412. In the embodiment shown, these four components are all rigidly, fixedly, and permanently connected to each other and are all part of the rear frame section that connects to the front frame section at the folding frame pivot axis, 381 in FIG. 21A and FIG. 21B.

As shown in FIG. 24A, the front frame clamp block 446 and the rear frame clamp block 442 comprise a plurality of angular teeth that mate with each other to provide a high resistance to the front frame section moving laterally or rotationally relative to the rear frame section when the front frame clamp block 446 is pressed against the rear frame clamp block 442. This resistance to relative motion improves the torsional stiffness, vertical cross-sectional moment of inertia, and horizontal cross-sectional moment of inertia of the front frame section relative to the rear frame section when the front frame clamp block 446 is pressed against the rear frame clamp block 442, and is important to the overall stiffness of the bicycle in response to torsion and bending forces applied to the bicycle frame.

Figure 25A:
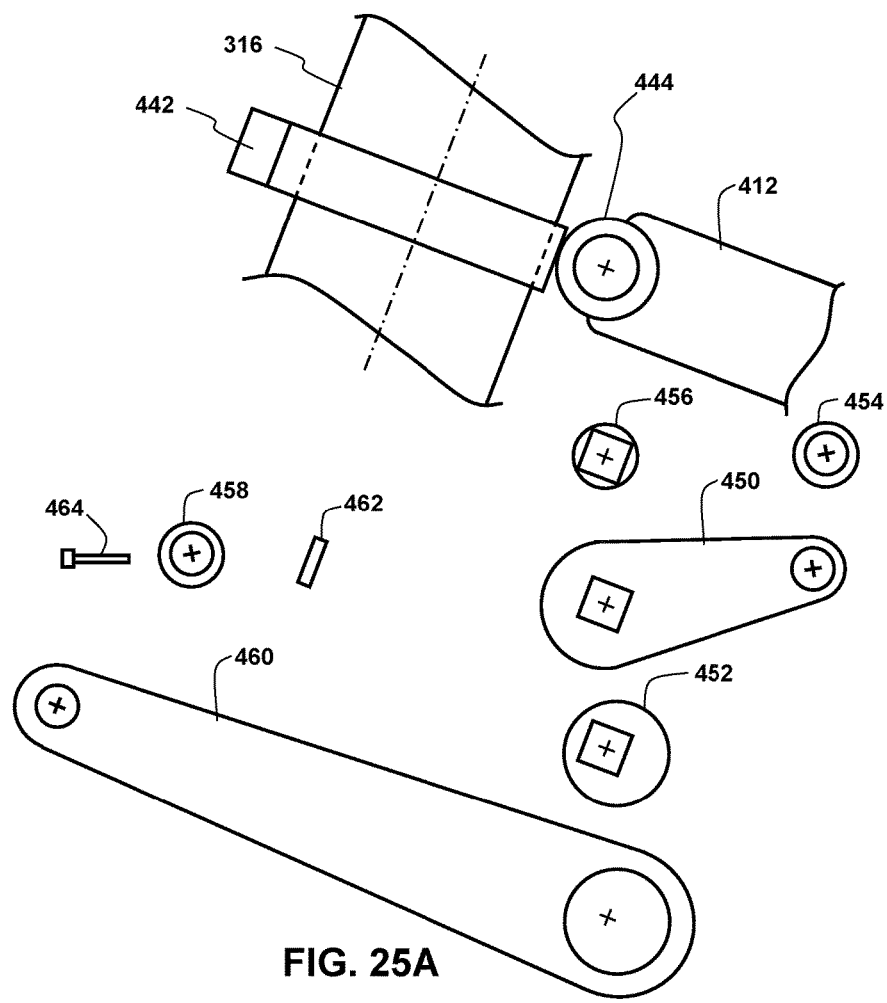
FIG. 25A is a side view of some of the components shown from the top in FIG. 24B.
Figure 25B:
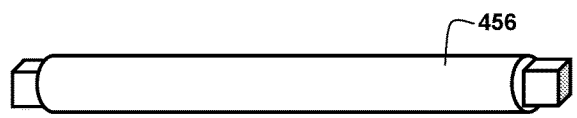
FIG. 25B shows an isometric view of the clamp shaft used in the eccentric cam clamp mechanism shown in FIG. 23B, FIG. 23C, FIG. 24A, FIG. 24B, and FIG. 25A.

FIG. 25A is a side view of the each of the main components of the clamp and the four rear frame section components (the rear frame clamp block 442, the main seat tube 316 also called a rear frame seat tube, the rear frame clamp pivot housing 444, and the upper rear stays 412) that were shown in FIG. 23A and FIG. 23B. Referring to FIG. 24A, FIG. 24B, and FIG. 25A, the clamp in the embodiment shown in these drawings comprises the following components:

(a) the clamp shaft 456 (which is not visible in FIG. 23A because the clamp shaft is inside the frame clamp pivot housing 444 in this view);
(b) the wrench arms 450;
(c) the wrench arm connection bar 454;
(d) the eccentric disks 452 (which are not visible in FIG. 23A because the eccentric disks are inside the clamp arms 460 in this view);
(e) the clamp arms 460;
(f) the clamp arm connection bar 458;
(g) the clamp tightening bolts 464; and
(h) the clamp load distribution element 462.

FIG. 25B shows an isometric view of the clamp shaft 456 used in the eccentric cam clamp mechanism shown in FIG. 23B to FIG. 25A.

Referring to the clamp illustrated in FIG. 23B to FIG. 25A, the clamp shaft 456 can be a cylindrical shaft with square profiles at both ends. These square profiles can be centered on the rotational center of the cylindrical shaft. In the embodiment shown, the clamp shaft 456 rotates inside the rear frame clamp pivot housing 444 and this rotation can be facilitated through the use of bushings, bearings, and/or lubricants between the clamp shaft 456 and rear frame clamp pivot housing 444. The square profile on the end of clamp shaft 456 engages with a square aperture on the wrench arm 450. It is possible to configure the clamp with a single wrench arm 450 that is located on only one end of the clamp shaft 456 or it is possible to have two wrench arms 450 with one wrench arm on each of the two ends of the clamp shaft 456. The wrench arm 450 provides leverage to turn the clamp shaft 456. If two wrench arms 450 are used, the ends of the two wrench arms that are opposite of the square aperture can be connected to each other with a wrench arm connection bar 454. This wrench arm connection bar 454 can facilitate the application of torque to the wrench arms 450.

In the embodiment shown, the eccentric disk 452 comprises a circular disk with a square aperture that engages with the square profiles of the clamp shaft 456 so that the eccentric disk 452 rotates when the clamp shaft rotates. The square aperture in the eccentric disk 452 is offset from the center of the circular perimeter of the eccentric disk, which causes the center point of the eccentric disk to "orbit" around the center point of the square aperture. It should be noted that this eccentric orbit can also be created in other ways capable of being understood by anyone skilled in the art. For example, the square profiles at the ends of the cylindrical clamp shaft 456 could be offset from the rotational center of the cylindrical clamp shaft 456 and the square aperture of the disk 452 could be centered in the disk to produce this orbital motion. A 5-sided, 6-sided, or other profile and aperture combination could be used instead of the square profiles shown here. The wrench arm 450 or the eccentric disk 452 could have the raised profile and the other components could have apertures.

One end of the clamp arm 460 shown in these drawings has a circular aperture that fits around the circular periphery of the eccentric disk 452. Thus, when the wrench arm 450 rotates the clamp shaft 456, the center point of the eccentric disk 452 moves in an orbital path that can be converted to a linear motion of the end of the clamp arm 460 opposite the end that has the circular aperture (i.e. the clamp end of the clamp arm 460). By choosing a small offset and therefore a small orbital radius for the eccentric disk 452 relative to the length of the wrench arm(s) 450 a small force that rotates the wrench arms 450 can create a large clamping force at the clamp end of the clamp arms 460. In the embodiment shown, the clamp ends of the clamp arms 460 are connected together with a clamp arm connection bar 458. The clamp arm connection bar has two clamp tightening bolts 464 threaded through it. These clamp tightening bolts 464 can be hand tightened to approximately the right length for pressing the front frame clamp block 446 against the rear frame clamp block 442 when the clamp is engaged. A clamp load distribution element 462 can be used to spread the point loads from the clamp tightening bolts 464 over a larger area of the front frame clamp block 446. Thus, the clamp shown in this embodiment can be adjusted, tightened, and loosened by a user with no tools, and yet produce a high clamping force. The high clamping force can ensure that the angled teeth on the rear frame clamp block 442 are engaged with the mating angled surfaces of the front frame clamp block 446 to maximize stiffness and strength of the bicycle frame in a region proximate to the bottom bracket and cranks when the front frame section is clamped to the rear frame section and the bicycle is in "ride" mode.

With reference to FIG. 22B to FIG. 25B, it can also be understood that one can use bolts to connect the clamp arms 460 to the clamp arm connection bar 458, bolts to connect the wrench arms 450 to the clamp shaft 456, and bolts and washers to secure the clamp arms 460, eccentric disks 452, the wrench arms 450, the clamp shaft 456, and the rear frame clamp pivot housing to each other. These bolts and washers can be any combination of fasteners and fastening methods capable of being understood by anyone skilled in the art.

11. Bicycle Frames with Bridge Adapters for Motors and/or Gearboxes

Many human-powerable vehicles, including bicycles, comprise a transmission. This transmission can include gears located on the rear wheel. These gears can be external gears that are shifted using a rear derailleur. These gears can be internal gears located in a multi-speed inner hub in the rear wheel. This multi-speed inner hub can be fixed to the spokes. This multi-speed inner hub can be removable from an annulus that uses spokes to attach to a rim. One example of a multi-speed inner hub is the 14-speed rear hub made by Rohloff in Germany. The transmission could also be external gears located in or near the bottom bracket shell or internal gears that attach to the frame and include the crankset.

Figure 26B:
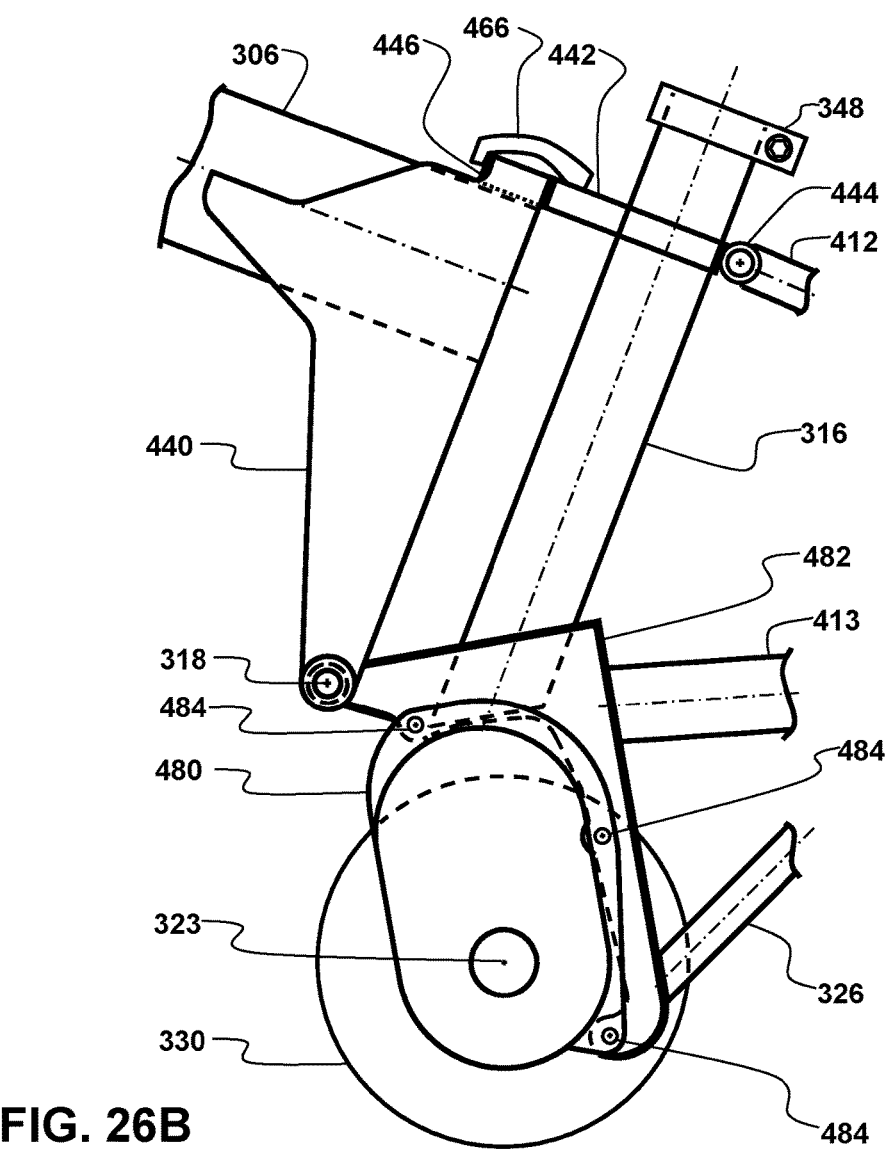
FIG. 26B shows an embodiment of the clamp section shown in FIG. 26A and the hinge shown in FIG. 21A that incorporates a bridge adapter configured for attachment of a motor or gearbox with cranks.

FIG. 26B shows an embodiment of the hinge shown in FIG. 21A that incorporates a bridge adapter 482 configured for the attachment of a motor (or internal gearbox) shown at 480. The attachment of the motor and/or gearbox to the frame can be made at six bridge to motor/gearbox attachment points 484, three of which are visible in the left side view of the frame section shown in FIG. 26B and three of which would be visible from the opposite (right) side. Attachments 484 could be made using bolts or any other fastening system or method capable of being understood by anyone skilled in the art.

In the embodiment shown in FIG. 26B, the crank rotation point 323 (or axis of rotation of the cranks) is part of the motor/gearbox 480. As can also be seen in this diagram, the center of rotation of the hinge (i.e. the folding frame pivot axis or hinge point) 318 is forward and above the axis of rotation of the cranks 323, and is integrated into the bridge adapter 482. The embodiment shown in FIG. 25, can be used as part of a frame similar to the frame and folding system shown and described with reference to FIG. 17A through FIG. 18C. Important benefits of the embodiment shown in FIG. 26B over the embodiment shown in FIG. 21A and FIG. 21B can include, but are not limited to:

(a) The embodiment shown in FIG. 26B does not have a rear derailleur, which tends to stick out and is therefore easily damaged when transporting a packed bicycle;

(b) The embodiment shown in FIG. 26B can easily be configured to use a belt drive, which is cleaner when folding, unfolding, packing, and unpacking a bicycle;

(c) If the embodiment shown in FIG. 26B is used with an internal gearbox mounted to the bridge adapter, the entire gearing system is enclosed, which is easier to pack than a multiple cog rear cassette; and (d) The embodiment shown in FIG. 26B could also be combined with mid-drive motor if a motorized bicycle is desired.

Other elements of the embodiment shown in FIG. 26B are similar to the embodiment shown in FIG. 21A and FIG. 22A and serve the same functions including, but not limited to the front tube 306, the front frame tube bracket 440, the front chain ring 330, the chain stays 326, the lower rear stays 413, the main seat tube 316, the upper rear stays 412, the rear frame clamp pivot housing 444, the main seat tube clamp 348, the rear frame clamp block 442, and the front frame clamp block 446. The eccentric clamp mechanism shown and described with reference to FIG. 22B, FIG. 22C, FIG. 23A, FIG. 23B, and FIG. 24A can also be used with the embodiment shown in FIG. 26B.

FIG. 26B also shows an alternate front frame section to rear frame section fastener 466, hereinafter also referred to as an alternate frame fastener. This alternate frame fastener 466 that can substitute for the eccentric clamp mechanism that was shown in FIG. 23B through FIG. 25A. The alternate frame fastener 466 can be simpler and lighter than the eccentric clamp mechanism shown previously in FIG. 23B, for example. The alternate frame fastener 466 only needs to exert a compression force between a region in a hole (or aperture) in the rear frame clamp block (rear jaw) 442 and the front of the front frame clamp block 446. The hole or aperture in the rear frame clamp block is shown at 443 in FIG. 26A. Examples of alternate frame fasteners can include, but are not limited to:
  (a) A C-clamp;
  (b) A strap;
  (c) An eccentric latch; and
  (d) A hinge clamp with angled surfaces to press the front jaw against the rear jaw similar to the ones used for the frame hinges on a Brompton bicycle in which the hinge clamp has angled surfaces to press the front clamp element against the rear clamp element when the hinge clamp is tightened in a direction perpendicular to the direction of the clamping force between the front clamp element and the rear clamp element.

Referring to the front clamp blocks (front jaws) 442 and rear clamp blocks (rear jaws) 446 shown in FIG. 21A through FIG. 26B, it should be noted that these clamp blocks do not necessarily need to be permanently attached to the front frame section and rear frame section, respectively. These clamp blocks could also be detachably attached and replaceable by the user. For example, these clamp blocks could be bolted into their locations. Having these clamp blocks be detachably attached can provide the following benefits:
  (a) The clamp blocks could be made of a different material than the parts they are attached to. For example, the front and rear frame sections could be steel (or titanium) and the clamp blocks could be aluminum. If the clamp blocks were permanently attached using a manufacturing process such as welding, it would be much more difficult to use a different material for the clamp blocks than the frame sections.
  (b) The use of clamp blocks that can be of a different material makes it easier to make the front frame section and rear frame section from different materials. Since the clamp blocks are optimally made as a matched pair, they are usually made of the same material. There are other reasons such as wear and performance that also mean that it is preferable to make both front clamp block out of the same material as the rear clamp block.
  (c) Having the clamp blocks replaceable allows them to be replaced if they wear with needing to make more expensive repairs to the bike frame.
  (d) With replaceable clamp blocks, it becomes possible to make small adjustments to the height of the center of the bike. This facilitates the optimization of the use of one frame with different crank lengths or different wheel sizes to still give the same pedal clearance.

Referring generally to the embodiments shown in FIG. 10A through FIG. 26B, it should be noted that that the front frame tube 306 does not need to be a circular tube. This tube 306 could also have an over, square, or rectangular tubular cross section, or any other cross section capable of being understood by anyone skilled in the art. In fact, the front frame structural element connecting the head tube 304 to the hinge module (308 in FIG. 10B) or front frame connection bracket (440 in FIG. 21A) could be any structural element or elements that provides sufficient strength and stiffness including, but not limited to a space frame comprising a plurality of structural elements that are rigidly connected to each other in a configuration optimized for high strength, high stiffness, and low weight. This space frame could be made of tubular, flat, bent, and/or angled components, as well as components with special profiles, and/or any combination of any of these components.

12. Rear Rack Module for Foldable Compact Bicycle and Bicycle Frame

Figure 27A:
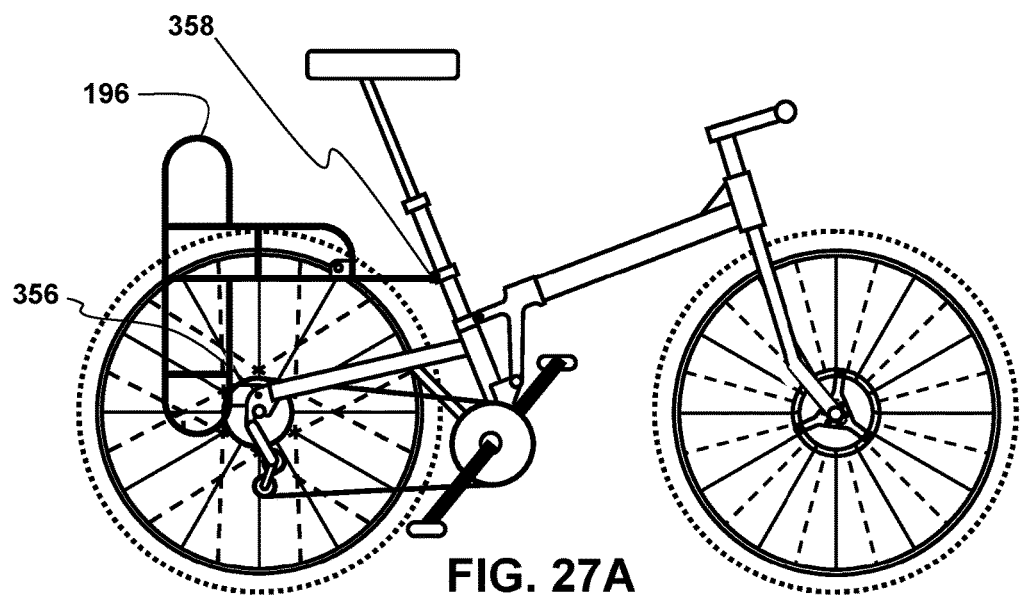
FIG. 27A shows the bicycle of FIG. 10A that further comprises a rear rack.
Figure 27B:
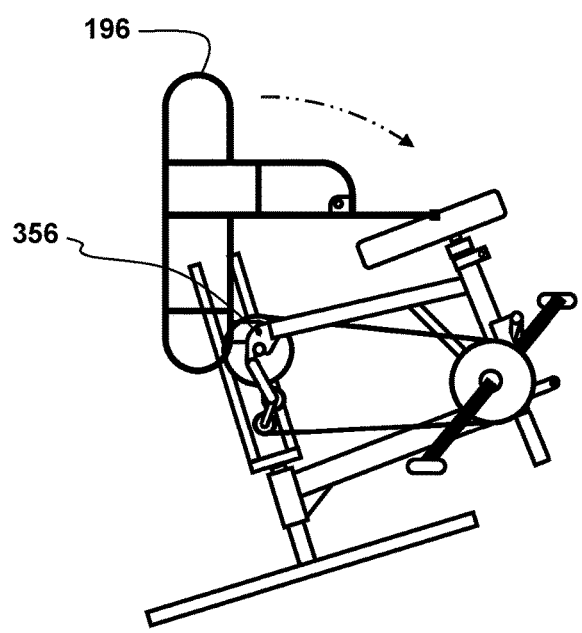
FIG. 27B shows the folded frame of FIG. 11B further comprising the rear rack of FIG. 27A to illustrate how the rear rack folds around the folded frame.

FIG. 27A shows the bicycle of FIG. 10A that further comprises a rear rack module, shown at 196. FIG. 27B shows the folded frame of FIG. 11B with the rear rack module 196 to illustrate how the rear rack module 196 rotationally folds around the folded frame while remaining attached at all times near the rear dropouts. These figures also illustrate that the rear rack module is rotationally attached to the frame a rear dropout attachment point(s) 356 and a seat tube attachment point 358 (which could also be a seat post attachment point and in this case is more specifically a telescoping seat tube attachment point). The seat tube attachment point 358 is used only when the rear rack module 196 is in "ride" mode and is detached when the rear rack module is in "packed" mode. The rear dropout attachment point(s) 356 are used in both "ride" mode and "packed" mode.

Figure 28A:
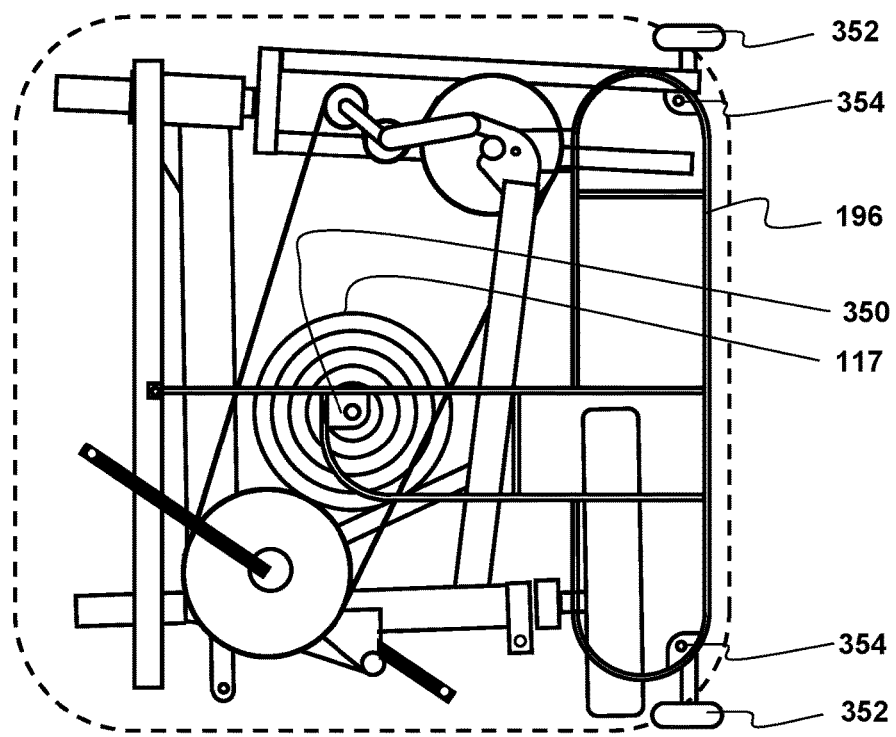
FIG. 28A shows the configuration of FIG. 11C further comprising the rear rack folded around the folded frame, the removable rear hub of FIG. 1E being held by the rear rack, and luggage wheels on the rear rack to aid in rolling the packed assembly.

FIG. 28A shows the configuration of FIG. 11C further comprising the rear rack module 196 folded around the folded frame. This also shows how the user detachable rear hub 117 previously shown in FIG. 1E can be held by rear rack wheel hub mounting features 350 that are part of the rear rack module 196. By providing hub mounting features 350 (that could be used for either a front wheel or a rear wheel), this wheel hub (or any other removable module configured for use in the center of a wheel) can be held in a fixed location, which means that it can be uncovered will not move and damage other packed components in transit, at as long as these other components are also held in a fixed location. Thus, the hub mounting feature 350 reduces the amount of packaging required to store and transport the folded and packed human powerable vehicle, such as the folded bike embodiment described.

Figure 28B:
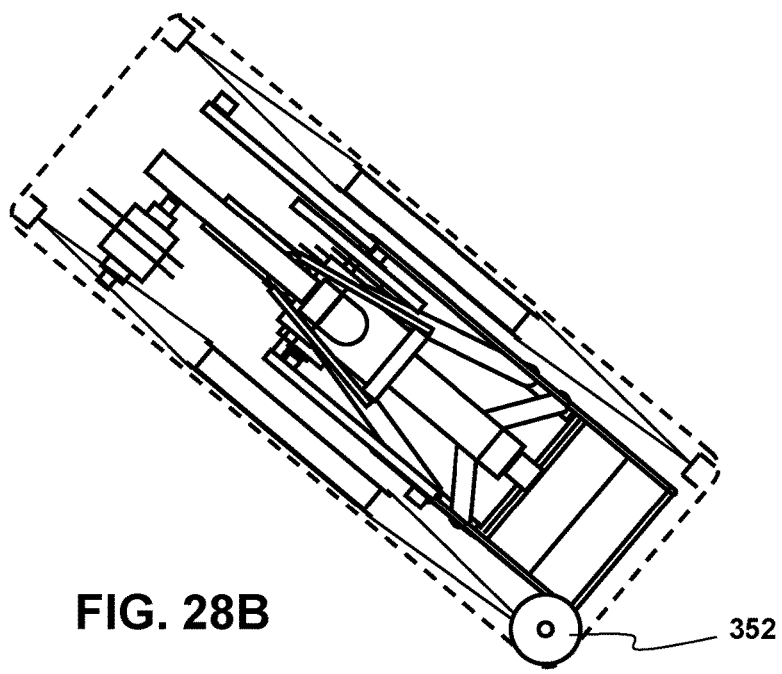
FIG. 28B shows a side view of the assembly of FIG. 28A and the removable hub front and rear wheels of FIG. 1F in a configuration that can be rolled.

FIG. 28B shows a side (or end) view of the assembly of FIG. 27A (which includes the rear rack module 196 when packaged with the removable hub front and rear wheels of FIG. 1F. The configurations shown in FIG. 28A and FIG. 28B also show two luggage wheels at 352. These luggage wheels 352 allow the folded and packed assembly to be rolled, just like other similar luggage. As shown in FIG. 28A, the luggage wheels 352 can be attached at luggage wheel attachment points 354. This attachment could be made using a cam actuated quick release device.

Figure 29A:
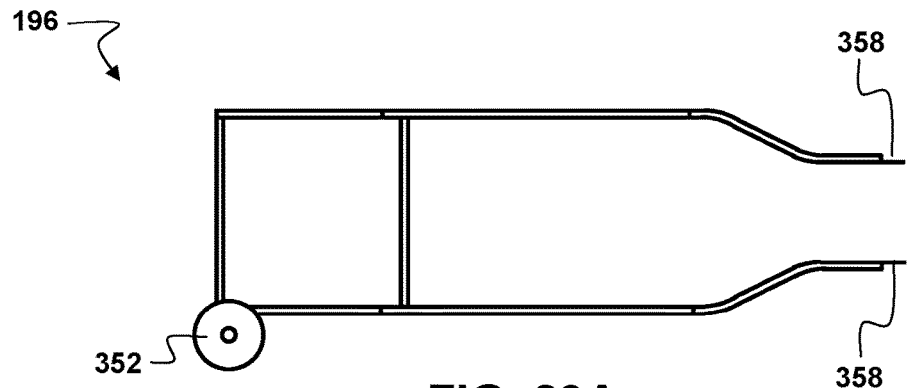
FIG. 29A shows a top view of the rear rack of FIG. 27A.
Figure 29B:
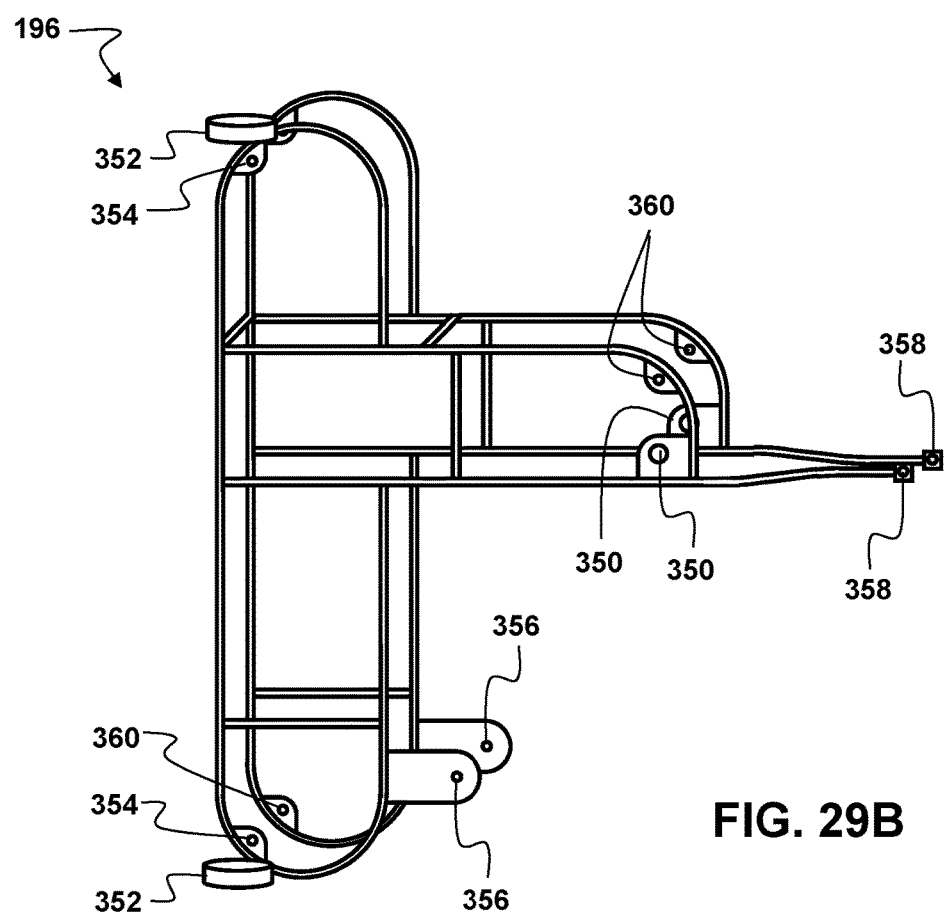
FIG. 29B shows a perspective view of the rear rack of FIG. 29A.

FIG. 29A shows a top view of the rear rack module 196 of FIG. 27A. FIG. 29B shows a perspective view of the rear rack of FIG. 27A. The luggage wheels 352 and luggage wheel attachment points 354 are shown in these figures, but the details of the adapters that connects the luggage wheels 352 to the luggage attachment points 354 have been omitted to more clearly illustrate the location the luggage wheels 352 and attachment points 354. The adapters to connect the wheels 352 to the attachment points can be any configurations using any fastening methods capable of being understood by anyone skilled in the art. The rear dropout attachment points are shown at 356. The rear rack wheel hub mounting features are shown at 350. There can also be additional rear rack module attachment points, such as those shown at 360, which can be used to further secure the parts of the rear rack module to each other or to secure other human-powerable vehicle related components to the rear rack module. The seat tube attachment points are shown at 358. The attachment between the frame and the rear rack module 196 at the seat tube attachment points 358 can be use any system or method capable of being understood by anyone skilled in the art, one example of which is the use of an eccentric cam quick release device 250 that was described with reference to FIG. 12B.

Properly constructed, a packed human powerable vehicle assembly such as that shown in this disclosure could be covered with a bag and that bag could be a suitably sized and structured bicycle pannier or panniers, totally eliminating the need for a suitcase to be carried or disposed of when the bicycle modules are reconfigured to be a ridable bicycle. This is further facilitated by the fact that bicycle panniers often have rigid sidewalls to prevent the panniers from getting pushed into the bike wheel. These rigid sidewalls become excellent penetration protection for the cover of the compacted bicycle when the panniers are reconfigured to be compacted bicycle cover.

In embodiments of the present invention, the frame can comprise any material capable of being understood by anyone skilled in the art. Examples of frame materials can include carbon steel (which comprises iron, carbon, etc and may include molybdenum and vanadium), stainless steel (which comprises nickel, iron, etc), aluminum, magnesium, titanium, glass, cardboard, carbon fiber reinforced composite, glass fiber reinforced composite, wood, plastic, or boron fiber reinforced composite. Examples of frame manufacturing processes can include welding, brazing, soldering, autoclaving, machining, molding, casting, gluing, painting, anodizing; and vacuum forming.

As noted in FIG. 10A, the first wheel and the second wheel can have tires. The tires, 182 and/or 184 can be made using any material and process capable of being understood in the art. For example, one or more of the tires 182 and/or 184, can be made of rubber. One or more of the tires can have a protective layer of an aramid (Kevlar) to help reduce the possibility of punctures One or more of the tires 182 and/or 184, can comprise metal studs. One or more of the tires 182 and/or 184, can comprise an inflatable inner tube. Inflation of the inner tube can be performed using a presta valve or a schrader valve. One or more of the tires can be tubeless. The tires can be inflated when packed. The tires can be deflated when the vehicle (bicycle) is packed.

The alternative features and configurations described in this document can be combined in any way capable of being understood by anyone skilled in the art. A number of variations and modifications of the disclosed embodiments can also be used. The principles described here can also be used for in applications other than bicycles or similar human-powered vehicles, such as motorcycles. While the principles of the disclosure have been described above in connection with specific apparatuses and methods, it is to be clearly understood that this description is made only by way of example and not as limitation on the scope of the disclosure.

What is claimed is:
1. A bicycle system comprising:
a folding bicycle frame, wherein the folding frame comprises a front frame section rotatably connected to a rear frame section, wherein:
    the front frame section comprises:
        a front frame tube;
        a head tube wherein:
            the head tube is permanently attached to a first end of the front frame tube; and
            the head tube is configured for rotatably coupling a front fork wherein the front fork is configured for securing a front wheel and handlebars; and
        a connection module wherein:
            the connection module is permanently attached to a second end of the front frame tube; and
            the connection module comprises a front clamp jaw and a front frame pivot element;
    the rear frame section comprises:
        a drive-side stay with one end having a drive side rear dropout configured for attachment to a drive side of a rear wheel;
        a non-drive side stay with one end having a non-drive side rear dropout configured for attachment of the non-drive side of the rear wheel;
        a crankshaft housing configured for holding a crankshaft in a configuration in which the crankshaft rotates in a horizontal axis parallel to the rotation of the rear wheel, wherein:
            the crankshaft is configured for the attachment of cranks; and
            the cranks are configured for the attachment of pedals;
        a rear frame pivot element wherein:
            the rear frame pivot element is attached to the other end of the drive-side stay, the other end of the non-drive side stay, and the crankshaft housing;
        a rear clamp jaw wherein:
            the rear clamp jaw is located above the rear frame pivot element when the bicycle frame is oriented in a ridable position; and
            the rear clamp jaw is rigidly connected to the rear frame pivot element;
    the rear frame pivot element and the front frame pivot element are connected to form a folding bicycle frame pivot joint configured for:
        rotating the front frame section relative to the rear frame section about an axis that is approximately parallel to the axis of rotation of the crankshaft; and,
        when viewed from the drive side, rotating the front frame section approximately 180 degrees clockwise relative to the rear frame section to convert from a ridable configuration to a folded frame configuration; and
    the front clamp jaw is configured for:
        user detachable attachment to the rear clamp jaw wherein the interface between the front clamp jaw and the rear clamp jaw comprises a plurality of v-shaped features configured to prevent the front frame section from moving relative to the rear frame section in a direction aligned with the axis of rotation of the crankshaft when the front clamp jaw is pressed against the rear clamp jaw; and
        detachment from the rear clamp jaw when the front frame section is to be rotated to convert the bicycle frame from a ridable configuration to a folded configuration.

2. The system of claim 1 wherein:
the front clamp jaw has a horizontal width that is at least two times its vertical thickness when viewed from the rear looking forward;
the system further comprises the front fork, a seat post, a bicycle seat, the handlebars, the front wheel, the rear wheel, bicycle tires, the cranks, and the bicycle pedals;
the front fork, the handlebars, and the cranks remain attached to the folding bicycle frame at all times when the system is in a ridable configuration, when the system is in a packed configuration, and when the system is being converted from a ridable configuration to a packed configuration; and
the system fits into a size that has a length plus width plus height of no more than 62 inches when configured for storage.

3. The system of claim 2 wherein:
the rear frame pivot element is located above and forward of the axis of rotation of the crankshaft when the bicycle system is in a ridable orientation;
the rear frame section further comprises a rear frame seat tube wherein:
the rear frame jaw is rigidly and permanently attached to the rear frame seat tube;
the rear frame seat tube is configured for securing a seat post; and
the seat post is configured for attaching the bicycle seat; and
the drive side stay further comprises an elevated chain stay in a configuration above a looped drive component selected from the group of a bicycle chain and a drive belt whereby the looped drive component can be completely removed from the folding bicycle frame without opening the loop of the looped bicycle drive component and without opening up a part of the rear frame section.

4. The system of claim 3 wherein:
the front clamp jaw is detachably pressed against the rear clamp jaw with a manually operable fastener that comprises an eccentric element;
the front clamp jaw and the rear clamp jaw are user replaceable;
the system further comprises a telescoping seat tube wherein:
at least one part of one end of the telescoping seat tube fits inside the rear frame seat tube; and
the telescoping seat tube is configured for holding at least part of the seat post inside of its other end;
the telescoping seat tube is secured to the rear frame seat tube using an eccentric cam quick release mechanism; and
the seat post is secured to the telescoping seat tube using an eccentric quick release mechanism;
the system further comprises a toothed belt wherein the toothed belt is configured to transmit power from the cranks to the rear wheel;
the front wheel comprises:
a circular front rim comprising an outer dimension greater than a dimension selected from the group of 477 millimeters, 533 millimeters, 585 millimeters, 610 millimeters, and 648 millimeters;
a front wheel annular module comprising a front wheel central aperture and a front hub attachment feature;
a plurality of steel spokes in tension that connect the front rim to the front wheel annular module; and
a front hub configured for:
placement inside at least part of the central aperture of the front wheel inner annular module;
removable attachment to the front wheel annular module using the front hub attachment feature; and
attachment to the front fork;
the system further comprises a rear rack wherein:
the rear rack is rotationally attached to the drive side stay and the non-drive side stay in a region proximate to the rear dropouts when the bicycle frame is in a ridable configuration when the frame is in a packed configuration, and when the fame is being converted from a ridable configuration to a packed configuration;
at least part of the front fork is between the rear stays when the system is configured for storage;
the system fits into a 26×26×10 inch size when configured for storage.

5. The system of claim 1 wherein:
the front clamp jaw has a horizontal width that is at least two times its vertical thickness when viewed from the rear looking forward.

6. The system of claim 1 wherein:
the front clamp jaw is detachably pressed against the rear clamp jaw with a manually operable fastener that comprises an eccentric element.

7. The system of claim 1 wherein:
the rear frame section further comprises a rear frame seat tube wherein:
the rear frame jaw is rigidly and permanently attached to the rear frame seat tube;
the rear frame seat tube is configured for securing a seat post; and
the seat post is configured for attaching a bicycle seat.

8. The system of claim 1 wherein:
the rear frame pivot element is located above and forward of the axis of rotation of the crankshaft when the bicycle system is in a ridable orientation.

9. The system of claim 1 wherein:
the system further comprises the front fork, the front wheel, and the rear wheel;
the front wheel and the rear wheel comprise a rim having an outer dimension greater than a dimension selected from the group of 477 millimeters, 533 millimeters, 585 millimeters, 610 millimeters, and 648 millimeters;
at least one wheel selected from the group of the front wheel and the rear wheel further comprise:
an annular module comprising a central aperture and a hub attachment feature;
a plurality of steel spokes in tension that connect the rim to the annular module; and
a hub configured for:
placement inside at least part of the central aperture of the wheel inner annular module;
removable attachment to the wheel annular module using the hub attachment feature; and
attachment to a bicycle frame component selected from the group of the front fork and the rear dropouts.

10. The system of claim 1 wherein:
the crankshaft housing comprises a cylindrical bottom bracket housing configured for holding a crankshaft and bearings wherein the bearings rotationally couple the crankshaft to the cylindrical bottom bracket housing.

11. The system of claim 1 wherein:
the rear frame section further comprises a crankshaft housing bridge adapter;

the crankshaft housing bridge adapter is configured to detachably secure the crankshaft housing to the other parts of the rear frame section;

the crankshaft housing further comprises a power conversion device selected from the group of an electric motor and a transmission; and the crankshaft is coupled to the power conversion device.

12. The system of claim 1 wherein:

the system further comprises a toothed belt, the rear wheel, and the cranks; and the toothed belt is configured to transmit power from the cranks to the rear wheel.

13. The system of claim 1 wherein:

the drive side stay further comprises an elevated chain stay in a configuration above a looped drive component selected from the group of a bicycle chain and a drive belt whereby the looped drive component can be completely removed from the folding bicycle frame without opening the loop of the looped bicycle drive component and without opening up a part of the rear frame section.

14. The system of claim 1 wherein:

the system further comprises a rear rack wherein:
the rear rack is rotationally attached to the drive side stay and the non-drive side stay in a region proximate to the rear dropouts when the bicycle frame is in a ridable configuration when the frame is in a packed configuration, and when the fame is being converted from a ridable configuration to a packed configuration.

15. A connection module for a bicycle frame, wherein:

the connection module is configured for rotatably connecting a front bicycle frame section to a rear bicycle frame section;

the connection module comprises a hinge section and a clamp section wherein:
the hinge section is below the clamp section when the bicycle frame is in a ridable orientation; and
the clamp section is secured when the frame is in a ridable configuration;

the connection module hinge section is configured for:
rotating the front frame section relative to the rear frame section about a horizontal axis;
rotating the front frame section approximately 180 degrees downwards and rearwards relative to the rear frame section to convert the bicycle frame from a ridable configuration to a folded configuration;

the connection module clamp section comprises:
a front clamp element configured for attachment to the front frame section wherein the front clamp element has a horizontal width that is at least two times its vertical thickness when viewed from the rear of the looking forward;
a rear clamp element configured for attachment to the rear frame section; and
a fastening device wherein:
the fastening device is configured for securing the front clamp element to the rear clamp element when the bicycle frame is in a ridable configuration; and
the fastening device is configured for releasing the front clamp element from the rear clamp element to rotate the front frame section relative to the rear frame section to convert the bicycle frame from a rideable configuration to a folded configuration; and the interface between the front clamp element and the rear clamp element comprises a at least one v-shaped feature configured to prevent the front clamp element from moving laterally relative to the rear clamp element when the front clamp element is pressed against the rear clamp element.

16. The connection module of claim 15 wherein:

the front bicycle frame section further comprises:
a front frame tube;
a head tube wherein:
the head tube is permanently attached to a first end of the front frame tube; and
the head tube is configured for rotatably coupling a front fork wherein the front fork is configured for securing a front wheel and handlebars; and the rear bicycle frame section further comprises:
a drive-side stay with one end having a drive side rear dropout configured for attachment to a drive side of a rear wheel;
a non-drive side stay with one end having a non-drive side rear dropout configured for attachment of the non-drive side of the rear wheel; and
a crankshaft housing configured for holding a crankshaft in a configuration in which the crankshaft rotates in a horizontal axis parallel to the rotation of the rear wheel.

17. The connection module of claim 15 wherein:

the fastening device is configured for pressing the front clamp element against the rear clamp element;

at least part of the fastening device sits inside an opening in the rear clamp element;

at least part of the fastening device is in front of the front clamp element when the fastening device secures the front clamp element against the rear clamp element; and the fastening device is a device selected from the group of a C-clamp, a strap, an eccentric latch, and a hinge clamp wherein the hinge clamp comprises angled surfaces to press the front clamp element against the rear clamp element when the hinge clamp is tightened in a direction perpendicular to the direction of the clamping force between the front clamp element and the rear clamp element.

18. The connection module of claim 15 wherein:

the front clamp element and the rear clamp element are user replaceable.

19. A method for folding a bicycle comprising:

establishing a connection module wherein:
the connection module rotatably connects a front bicycle frame section to a rear bicycle frame section;
the connection module comprises a hinge section and a clamp section wherein:
the hinge section is below the clamp section when the folding bicycle frame is in a ridable configuration; and
the clamp section is secured when the folding bicycle frame is in a ridable configuration;
the connection module clamp section comprises:
a front clamp block configured for attachment to the front bicycle frame section;
a rear clamp block configured for attachment to the rear bicycle frame section; and
a fastening device wherein:
the fastening device is configured for securing the front clamp block to the rear clamp block when the clamp section is secured and in a ridable configuration; and the fastening device is configured for releasing the front clamp block from the rear clamp block to rotate the front bicycle frame section relative to the rear bicycle frame section to convert the bicycle frame from a rideable configuration to a folded configuration; and the interface between the front clamp block and the rear clamp block comprises a plurality of v-shaped features configured to prevent the front clamp block from moving laterally relative to the rear clamp block when the front clamp block is pressed against the rear clamp block;

rotating the front bicycle frame section relative to the rear bicycle frame section about a horizontal axis; and rotating the front bicycle frame section approximately 180 degrees downwards and rearwards relative to the rear bicycle frame section to convert the bicycle frame from a ridable configuration to a folded configuration.

20. The method of claim 19 wherein:
the front bicycle frame section further comprises:
  a front frame tube; and
  a head tube wherein:
    the head tube is permanently attached to a first end of the front frame tube; and
    the head tube is configured for rotatably coupling a front fork wherein the front fork is configured for securing a front wheel and handlebars; and
the rear bicycle frame section further comprises:
  a drive-side stay with one end having a drive side rear dropout configured for attachment to a drive side of a rear wheel;
  a non-drive side stay with one end having a non-drive side rear dropout configured for attachment of the non-drive side of the rear wheel; and
  a crankshaft housing configured for holding a crankshaft in a configuration in which the crankshaft rotates in a horizontal axis parallel to the rotation of the rear wheel.

\* \* \* \* \*